United States Patent
Hermanek et al.

(10) Patent No.: US 12,530,357 B2
(45) Date of Patent: *Jan. 20, 2026

(54) SYSTEMS AND METHODS FOR MATCHING ELECTRONIC ACTIVITIES WITH WHITESPACE DOMAINS TO RECORD OBJECTS IN A MULTI-TENANT SYSTEM

(71) Applicant: People.ai, Inc., Redwood City, CA (US)

(72) Inventors: Stefan Hermanek, San Francisco, CA (US); Andrii Cherednychenko, Kyiv (UA); Andrey Kvachov, Kyiv (UA); Armine Seropyan, Marina del Rey, CA (US); Ostap Korkuna, San Carlos, CA (US); Volodymyr Nykytiuk, San Francisco, CA (US); Eric Jeske, Tiburon, CA (US)

(73) Assignee: People.ai, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/630,209

(22) Filed: Apr. 9, 2024

(65) Prior Publication Data

US 2024/0256548 A1 Aug. 1, 2024

Related U.S. Application Data

(63) Continuation of application No. 17/520,051, filed on Nov. 5, 2021, now Pat. No. 12,072,883.

(Continued)

(51) Int. Cl.
*G06F 16/21* (2019.01)
*G06F 16/2455* (2019.01)

(52) U.S. Cl.
CPC .......... *G06F 16/2455* (2019.01); *G06F 16/21* (2019.01)

(58) Field of Classification Search
CPC .............................. G06F 16/2455; G06F 16/21
(Continued)

(56) References Cited

U.S. PATENT DOCUMENTS

| 8,406,745 | B1 | 3/2013 | Upadhyay et al. |
| 8,412,847 | B2 * | 4/2013 | Longo ..................... H04L 61/50 709/224 |

(Continued)

OTHER PUBLICATIONS https://pages.clari.com/rs/866-BBG-005/images/Clari-SB-AI-Applications-for-Sales-0917.pdf, Feb. 5, 2018. (9 pages).

(Continued)

*Primary Examiner* — Hanh B Thai
(74) *Attorney, Agent, or Firm* — Foley & Lardner LLP

(57) ABSTRACT

The present disclosure relates to linking record objects between systems of record based on a comparison of object field-value pairs to a ground truth. A domain name may be identified from an electronic activity. It may be determined that the electronic activity does not match with any first record objects. A second record object including the domain name as a value may be identified. Object field-value pairs of the second record object may be identified. It may be determined that a third record object matches with the second record object. The electronic activity may be matched to the third second record object or a fourth record object. An association between the electronic activity and the third record object or the fourth record object may be stored.

20 Claims, 15 Drawing Sheets

Related U.S. Application Data

(60) Provisional application No. 63/110,123, filed on Nov. 5, 2020.

(58) Field of Classification Search
USPC .......................................................... 707/769
See application file for complete search history.

(56) References Cited

U.S. PATENT DOCUMENTS

| | | | |
|---|---|---|---|
| 8,448,072 | B1 | 5/2013 | Lai et al. |
| 10,235,685 | B2 | 3/2019 | Sun et al. |
| 11,056,219 | B2* | 7/2021 | Fidone .................. G16H 50/70 |
| 11,651,032 | B2 | 5/2023 | Jayaraman |
| 2004/0260776 | A1* | 12/2004 | Starbuck ............... H04L 51/212 709/206 |
| 2005/0065980 | A1* | 3/2005 | Hyatt .................... G06F 16/951 |
| 2005/0289148 | A1* | 12/2005 | Dorner .................. H04L 63/168 |
| 2007/0067394 | A1* | 3/2007 | Adams ................. G06Q 10/107 709/206 |
| 2007/0299869 | A1* | 12/2007 | Clary ................... H04L 41/5083 |
| 2008/0005127 | A1* | 1/2008 | Schneider ............. H04L 61/30 |
| 2009/0172035 | A1* | 7/2009 | Lessing ................. G06Q 30/02 |
| 2010/0046505 | A1 | 2/2010 | Saw et al. |
| 2011/0078150 | A1 | 3/2011 | Rashad et al. |
| 2011/0106920 | A1* | 5/2011 | Longo ..................... H04L 61/50 709/220 |
| 2013/0085932 | A1* | 4/2013 | Waldron .............. H04L 61/4511 705/40 |
| 2013/0117287 | A1 | 5/2013 | Jagota et al. |
| 2014/0066044 | A1* | 3/2014 | Ramnani ............... H04L 67/306 455/418 |
| 2014/0172872 | A1 | 6/2014 | Hyatt et al. |
| 2015/0019537 | A1* | 1/2015 | Neels ................... G06F 16/9535 707/722 |
| 2016/0217429 | A1 | 7/2016 | Lau |
| 2017/0032042 | A1* | 2/2017 | Rykowski ............. G06F 16/282 |
| 2017/0039527 | A1 | 2/2017 | Rangan |
| 2018/0024901 | A1* | 1/2018 | Tankersley ....... G06Q 10/06393 707/694 |
| 2018/0060122 | A1 | 3/2018 | Tang et al. |
| 2018/0150783 | A1 | 5/2018 | Xu et al. |
| 2018/0219818 | A1* | 8/2018 | Kramer ................. H04L 51/18 |
| 2018/0268416 | A1 | 9/2018 | Ponnusamy et al. |
| 2018/0322461 | A1 | 11/2018 | Subedi et al. |
| 2019/0057339 | A1 | 2/2019 | Ponnusamy et al. |
| 2019/0066021 | A1 | 2/2019 | Tang et al. |
| 2019/0164179 | A1 | 5/2019 | Sun et al. |
| 2019/0236199 | A1 | 8/2019 | Mahalingam et al. |
| 2019/0236516 | A1 | 8/2019 | Ponnusamy |
| 2020/0387819 | A1* | 12/2020 | Rogynskyy ............ G06N 20/00 |
| 2021/0126901 | A1* | 4/2021 | Rodriguez ............. G06N 20/20 |

OTHER PUBLICATIONS

Non-Final Office Action on U.S. Appl. No. 17/520,051 DTD Mar. 16, 2023.
Notice of Allowance on U.S. Appl. No. 17/520,051 DTD Aug. 29, 2023.
Notice of Allowance on U.S. Appl. No. 17/520,051 DTD Dec. 28, 2023.
*People.ai* v *Clari*—complaint ND Cal.
*People.ai* v *Clari*—document 19 Answering brief.
*People.ai* v *Clari*—document 21 first amended complaint.
*People.ai* v *Clari*—document 24 reply brief.
*People.ai* v *Clari*—document 27 answer to amended complaint.
*People.ai* v *Clari*—document 30 answer by plaintiff.
*People.ai* v *Clari*—document 45 statement of co-pending proceedings.
*People.ai* v *Clari*—document 53 Defendant 12c motion.
*People.ai* v *Clari*—document 56 Joint stipulation to extend briefing schedule for Defendant's motion for judgement on the pleadings.
*People.ai* v *Clari*—document 58 Plaintiff's response to Defendant's motion for judgement on the pleadings.
*People.ai* v *Clari*—document 58-01 Exhibit A.
*People.ai* v *Clari*—document 61 Defendant's reply in support of motion for judgement on the pleadings.
*People.ai* v *Clari*—document 64 Plaintiff's motion for leave to file second amended complaint.
*People.ai* v *Clari*—document 64-01 Plaintiff's brief in support of motion for leave to file second amended complaint.
*People.ai* v *Clari*—document 64-02 Declaration of L.Silva in support of Plaintiff's motion for leave to file a second amended complaint.
*People.ai* v *Clari*—document 64-03 Exhibit 1.
*People.ai* v *Clari*—document 64-04 Exhibit 2.
*People.ai* v *Clari*—document 8 Motion to dismiss.
*People.ai* v *Clari*—document 9 opening brief.
*People.ai* v *SetSail*—document 1 complaint ND Cal.
*People.ai* v *SetSail*—document 100 plaintiff's response to defendant's motion for judgement on the pleadings.
*People.ai* v *SetSail*—document 101-00 Declaration of Lucas Silva in support of plaintiff's opposition to defendant's motion for judgement on the pleadings.
*People.ai* v *SetSail*—document 101-01 Exhibit A.
*People.ai* v *SetSail*—document 102 Defendant's reply supporting its motion for judgement on the pleadings pursuant to FRCP12.
*People.ai* v *SetSail*—document 105 Letter from People.ai to Judge.
*People.ai* v *SetSail*—document 112 Plaintiff's motion to file certain documents under seal.
*People.ai* v *SetSail*—document 112-01 Declaration of L.Silva in support of Plaintiff's motion to file certain documents under seal.
*People.ai* v *SetSail*—document 112-19 Plaintiff's "Patent Showdown" motion for summary judgment.
*People.ai* v *SetSail*—document 114-00 Defendant's motion for partial summary judgement.
*People.ai* v *SetSail*—document 114-01 Declaration of S.Chatterjee in support of Defendant's motion for partial summary judgement.
*People.ai* v *SetSail*—document 114-02 Chatterjee Declaration Exhibit A.
*People.ai* v *SetSail*—document 114-03 Chatterjee Declaration Exhibit B1.
*People.ai* v *SetSail*—document 114-04 Chatterjee Declaration Exhibit B2.
*People.ai* v *SetSail*—document 114-05 Chatterjee Declaration Exhibit B3.
*People.ai* v *SetSail*—document 114-06 Chatterjee Declaration Exhibit C.
*People.ai* v *SetSail*—document 114-08 Chatterjee Declaration Exhibit E.
*People.ai* v *SetSail*—document 114-09 Chatterjee Declaration Exhibit F.
*People.ai* v *SetSail*—document 114-10 Chatterjee Declaration Exhibit G.
*People.ai* v *SetSail*—document 114-11 Chatterjee Declaration Exhibit H.
*People.ai* v *SetSail*—document 114-12 Declaration of B.Lui in support of Defendant's motion of partial summary judgement.
*People.ai* v *SetSail*—document 114-13 Lui Declaration Exhibit A.
*People.ai* v *SetSail*—document 114-14 Declaration of H.Levi in support of Defendant's motion for partial summary judgement.
*People.ai* v *SetSail*—document 117-07 Chatterjee Declaration Exhibit D.
*People.ai* v *SetSail*—document 36 first amended complaint.
*People.ai* v *SetSail*—document 43 Defendant motion to dismiss.
*People.ai* v *SetSail*—document 46 response to motion to dismiss first amended complaint.
*People.ai* v *SetSail*—document 47 reply in support of motion to dismiss first amended complaint.
*People.ai* v *SetSail*—document 50 opposition response.
*People.ai* v *SetSail*—document 59 notice of motion for leave.
*People.ai* v *SetSail*—document 66 opposition response.
*People.ai* v *SetSail*—document 68 reply brief in support of motion for leave.

(56) References Cited

OTHER PUBLICATIONS

*People.ai* v *SetSail*—document 73 Order re Judgement on the Pleadings.
*People.ai* v *SetSail*—document 74 second amended complaint.
*People.ai* v *SetSail*—document 79 answer to second amended complaint.
*People.ai* v *SetSail*—document 88 answer to counterclaims.
*People.ai* v *SetSail*—document 90 motion for judgement on the pleadings.
*People.ai* v *SetSail*—US Court of Appeals for the Federal Circuit (Apr. 7, 2023).

* cited by examiner

SYSTEMS AND METHODS FOR MATCHING ELECTRONIC ACTIVITIES WITH WHITESPACE DOMAINS TO RECORD OBJECTS IN A MULTI-TENANT SYSTEM

CROSS-REFERENCE TO RELATED APPLICATIONS

The present application claims the benefit of and priority to U.S. Non-Provisional patent application Ser. No. 17/520, 051, filed Nov. 5, 2021, which claims the benefit of and priority to U.S. Provisional Patent Application No. 63/110, 123, filed Nov. 5, 2020, the disclosure of which is incorporated herein in its entirety.

BACKGROUND

An organization may attempt to manage or maintain a system of record associated with electronic communications at the organization. The system of record can include information such as contact information, logs, and other data associated with the electronic activities. Data regarding the electronic communications can be transmitted between computing devices associated with one or more organizations using one or more transmission protocols, channels, or formats, and can contain various types of information. For example, the electronic communication can include information about a sender of the electronic communication, a recipient of the electronic communication, and content of the electronic communication. The information regarding the electronic communication can be input into a record being managed or maintained by the organization. However, due to the large volume of heterogeneous electronic communications transmitted between devices and the challenges of manually entering data, inputting the information regarding each electronic communication into a system of record can be challenging, time consuming, and error prone.

SUMMARY

One aspect of the present disclosure relates to a method for matching electronic activities with whitespace domains to record objects in a multi-tenant system. The method may identifying, by one or more processors, a domain name from data of an electronic activity accessed from a data source provider; determining, by the one or more processors, that the electronic activity does not match with any first record objects of a first system of record corresponding to the data source provider responsive to a determination that the electronic activity does not satisfy a first match policy; responsive to the determination that the electronic activity does not match with any first record objects, identifying, by the one or more processors, from a plurality of second record objects included in at least one second system of record of at least one second data source provider accessible to the one or more processors, a second record object that includes the domain name as a value of an object field of the second record object; identifying, by the one or more processors and from the second record object, one or more second object field-value pairs of the second record object; determining, by the one or more processors, that a third record object from the first system of record matches with the second record object responsive to the third record object satisfying a second match policy based on comparing one or more third object field-value pairs of the third record object with corresponding one or more second object field-value pairs of the second record object; matching, by the one or more processors, the electronic activity to the third record object or a fourth record object linked to the third record object responsive to the determination that the third record object from the first system of record matches with the second record object; and storing, by the one or more processors, in one or more data structures, an association between the electronic activity and the third record object or the fourth record object.

In some embodiments, the one or more second object field-value pairs comprise a company name object field-value pair.

In some embodiments, the third record object is of a first record object type and the fourth record object is of a second record object type having a field-value pair identifying a stage of a process of the fourth record object.

In some embodiments, the method further comprises identifying, by the one or more processors, a second domain name from data of a second electronic activity accessed from the data source provider; determining, by the one or more processors, that the second electronic activity does not match with any first record objects of the first system of record corresponding to the data source provider responsive to a determination that the second electronic activity does not satisfy the first match policy; identifying, by the one or more processors, responsive to the determination that the second electronic activity does not match with any first record objects, from at least one fifth record object included in at least one third system of record of at least one third data source provider accessible to the one or more processors, a fifth record object that includes the second domain name as a value of an object field of the fifth record object; identifying, by the one or more processors and from the fifth record object, one or more fifth object field-value pairs of the fifth record object; determining, by the one or more processors and from the first system of record, that there are not any first record objects that satisfy the second match policy for the fifth record object based on comparing the one or more fifth object field-value pairs of the fifth record object with corresponding one or more object field-value pairs of first record objects of the first system of record; and responsive to the determination that there are not any record objects that satisfy the second match policy for the fifth record object, generating, by the one or more processors, a sixth record object that includes the second domain name as a value of a domain name field of the sixth record object.

In some embodiments, the method further comprises determining, by the one or more processors, a domain type of the domain name, wherein determining, by the one or more processors, that the electronic activity does not match with any first record objects of the first system of record is performed responsive to the determination, by the one or more processors, that the domain type for the domain name is not a personal domain type.

In some embodiments, identifying, by the one or more processors, from the plurality of second record objects included in the at least one second system of record of the at least one second data source provider accessible to the one or more processors, the second record object that includes the domain name as the value of the object field of the second record object comprises determining, by the one or more processors, that the second record object satisfies a third match policy; and identifying, by the one or more processors, the second record object based on the second record object satisfying the third match policy.

In some embodiments, identifying, by the one or more processors, from the plurality of second record objects included in the at least one second system of record of the at least one second data source provider accessible to the one or more processors, the second record object that includes the domain name as the value of the object field of the second record object comprises comparing, by the one or more processors, one or more fourth object field-value pairs of the second record object with corresponding one or more fifth object field-value pairs of at least one fifth record object of the at least one second system of record that have matching domain name values to the domain name of the electronic activity; determining, by the one or more processors, a matching confidence score based on the comparison; determining, by the one or more processors, that the matching confidence score satisfies a threshold; and identifying, by the one or more processors, the second record object based on the determination that the matching confidence score satisfies the threshold.

In some embodiments, identifying, by the one or more processors, from the plurality of second record objects included in the at least one second system of record of the at least one second data source provider accessible to the one or more processors, the second record object that includes the domain name as the value of the object field of the second record object comprises determining, by the one or more processors, most common values of corresponding fifth object field-value pairs of at least one fifth record object of the at least one second system of record that have matching values for a company name field; determining, by the one or more processors, most common values of corresponding fifth object field-value pairs of at least one fifth record object of the at least one second system of record that have matching domain name values to the domain name of the electronic activity; comparing, by the one or more processors, one or more fourth object field-value pairs of the second record object with the most common values of the corresponding one or more fifth object field-value pairs, determining, by the one or more processors, a matching confidence score that is proportional to a number of the one or more fourth object field-value pairs that match the most common values of the corresponding one or more fifth object field-value pairs; and identifying, by the one or more processors, the second record object based on the matching confidence score.

In some embodiments, the one or more fourth object field-value pairs are associated with one or more of a postal code or the company name.

In some embodiments, identifying, by the one or more processors, from the plurality of second record objects included in the at least one second system of record of the at least one second data source provider accessible to the one or more processors, the second record object that includes the domain name as the value of the object field of the second record object comprises determining, by the one or more processors, most common values of corresponding fifth object field-value pairs of at least one fifth record object of the at least one second system of record that have matching domain name values to the domain name of the electronic activity by determining, by the one or more processors, a fifth record object that has a matching value to a company name prefix by applying, by the one or more processors, characters of the value of the company name field of the fifth record object to a data structure; and determining, by the one or more processors, that the fifth record object has a matching value to the company name prefix based on a portion of the characters of the company name field of the fifth record object matching each character of the company name prefix; and responsive to the determination that the fifth record object has a matching value to the company name prefix, incrementing, by the one or more processors, a counter associated with the company name prefix. In some embodiments, the portion of the characters has a number of characters that is equal to the number of characters of the value of the company name field of the fifth record object.

In some embodiments, identifying, by the one or more processors, from the plurality of second record objects included in the at least one second system of record of the at least one second data source provider accessible to the one or more processors, the second record object that includes the domain name as the value of the object field of the second record object comprises determining, by the one or more processors, most common values of corresponding fifth object field-value pairs of at least one fifth record object of the at least one second system of record that have matching values for a company name field by applying, by the one or more processors, the value of the company name field of the second record object and the values of the company name fields of sixth record objects to a data structure; and excluding, by the one or more processors, the sixth record objects from the at least one fifth record object based on the value of the company name field of the second record object ending on a different node than the values of the company name fields of the sixth record objects In some embodiments, the method further comprises updating, by the one or more processors, the third record object or a fourth record object linked to the third record object to include the domain name as a domain name value of a domain name field of the third record object or the fourth record object.

Another aspect of the present disclosure relates to a system for matching electronic activities with whitespace domains to record objects in a multi-tenant system. The system may comprise one or more processors configured to execute machine-readable instructions to identify a domain name from data of an electronic activity accessed from a data source provider; determine that the electronic activity does not match with any first record objects of a first system of record corresponding to the data source provider responsive to a determination that the electronic activity does not satisfy a first match policy; responsive to the determination that the electronic activity does not match with any first record objects, identify, from a plurality of second record objects included in at least one second system of record of at least one second data source provider accessible to the one or more processors, a second record object that includes the domain name as a value of an object field of the second record object; identify, from the second record object, one or more second object field-value pairs of the second record object; determine, that a third record object from the first system of record matches with the second record object responsive to the third record object satisfying a second match policy based on comparing one or more third object field-value pairs of the third record object with corresponding one or more second object field-value pairs of the second record object; match the electronic activity to the third record object or a fourth record object linked to the third record object responsive to the determination that the third record object from the first system of record matches with the second record object; and store, in one or more data structures, an association between the electronic activity and the third record object or the fourth record object.

In some embodiments, the one or more second object field-value pairs comprise a company name object field-value pair.

In some embodiments, the third record object is of a first record object type and the fourth record object is of a second record object type having a field-value pair identifying a stage of a process of the fourth record object.

In some embodiments, the one or more processors are further configured to identify a second domain name from data of a second electronic activity accessed from the data source provider; determine that the second electronic activity does not match with any first record objects of the first system of record corresponding to the data source provider responsive to a determination that the second electronic activity does not satisfy the first match policy; responsive to the determination that the second electronic activity does not match with any first record objects, identify, from at least one fifth record object included in at least one third system of record of at least one third data source provider accessible to the one or more processors, a fifth record object that includes the second domain name as a value of an object field of the fifth record object; identify, from the fifth record object, one or more fifth object field-value pairs of the fifth record object; determine, from the first system of record, that there are not any first record objects that satisfy the second match policy for the fifth record object based on comparing the one or more fifth object field-value pairs of the fifth record object with corresponding one or more object field-value pairs of first record objects of the first system of record; and responsive to the determination that there are not any record objects that satisfy the second match policy for the fifth record object, generate a sixth record object that includes the second domain name as a value of a domain name field of the sixth record object.

In some embodiments, the one or more processors are further configured to determine a domain type of the domain name, wherein determining, by the one or more processors, that the electronic activity does not match with any first record objects of the first system of record is performed responsive to the determination, by the one or more processors, that the domain type for the domain name is not a personal domain type.

In some embodiments, the one or more processors are configured to identify, from the plurality of second record objects included in the at least one second system of record of the at least one second data source provider accessible to the one or more processors, the second record object that includes the domain name as the value of the object field of the second record object by determining that the second record object satisfies a third match policy; and identifying the second record object based on the second record object satisfying the third match policy.

Yet another aspect of the present disclosure relates to a non-transitory computer-readable storage medium having instructions embodied thereon, the instructions being executable by one or more processors for matching electronic activities with whitespace domains to record objects in a multi-tenant system. The instructions may cause the one or more processors to identify a domain name from data of an electronic activity accessed from a data source provider; determine that the electronic activity does not match with any first record objects of a first system of record corresponding to the data source provider responsive to a determination that the electronic activity does not satisfy a first match policy; responsive to the determination that the electronic activity does not match with any first record objects, identify, from a plurality of second record objects included in at least one second system of record of at least one second data source provider accessible to the one or more processors, a second record object that includes the domain name as a value of an object field of the second record object; identify, from the second record object, one or more second object field-value pairs of the second record object; determine, that a third record object from the first system of record matches with the second record object responsive to the third record object satisfying a second match policy based on comparing one or more third object field-value pairs of the third record object with corresponding one or more second object field-value pairs of the second record object; match the electronic activity to the third record object or a fourth record object linked to the third record object responsive to the determination that the third record object from the first system of record matches with the second record object; and store, in one or more data structures, an association between the electronic activity and the third record object or the fourth record object.

BRIEF DESCRIPTIONS OF THE DRAWINGS

DETAILED DESCRIPTION

The present disclosure relates to systems and methods for matching electronic activities with whitespace domains to record objects in a multi-tenant system. In brief overview, an electronic activity may be identified from a data source of a data source provider. The domain name of the electronic account that transmitted the electronic activity may be identified. The identified domain name may be compared to the domain names of first record objects (e.g., account record objects) of a first system of record of the data source provider. Responsive to identifying a first record object with a matching domain name, the electronic activity may be matched to the first record object. Responsive to not identifying a first record object with a matching domain name, second record objects from second systems of record of other data source providers may be identified. A subset of the second record objects with a matching domain name may be identified. The most common values (e.g., the ground truth) of the fields of the subset of the second record objects may be identified. A second record object of the subset of the second record objects may be identified based on the second record object having matching values to the most common values. Values of the first record objects of the first system of record may be compared to the identified second record object or the most common values. A third record object of the first record objects may be identified based on the third record object having matching values (e.g., a matching company name and/or postal code) to the second record object or to the most common values. The electronic activity may be matched to the third record object or a fourth record object (e.g., an opportunity record object) linked to the third record object.

Figure 1:
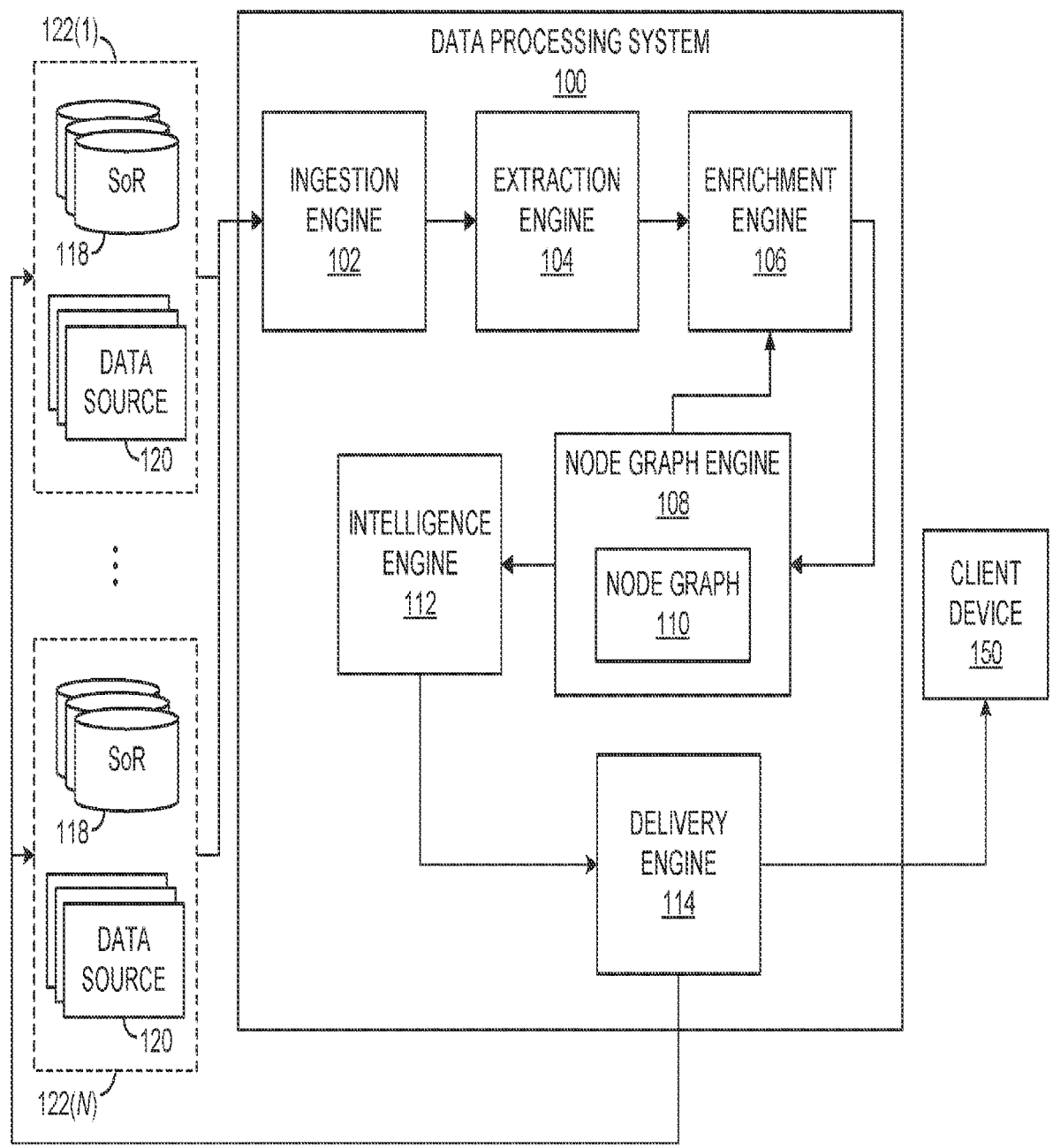
FIG. 1 illustrates a data processing system for aggregating electronic activities and synchronizing the electronic activities to one or more systems of record according to embodiments of the present disclosure.
Figure 2:
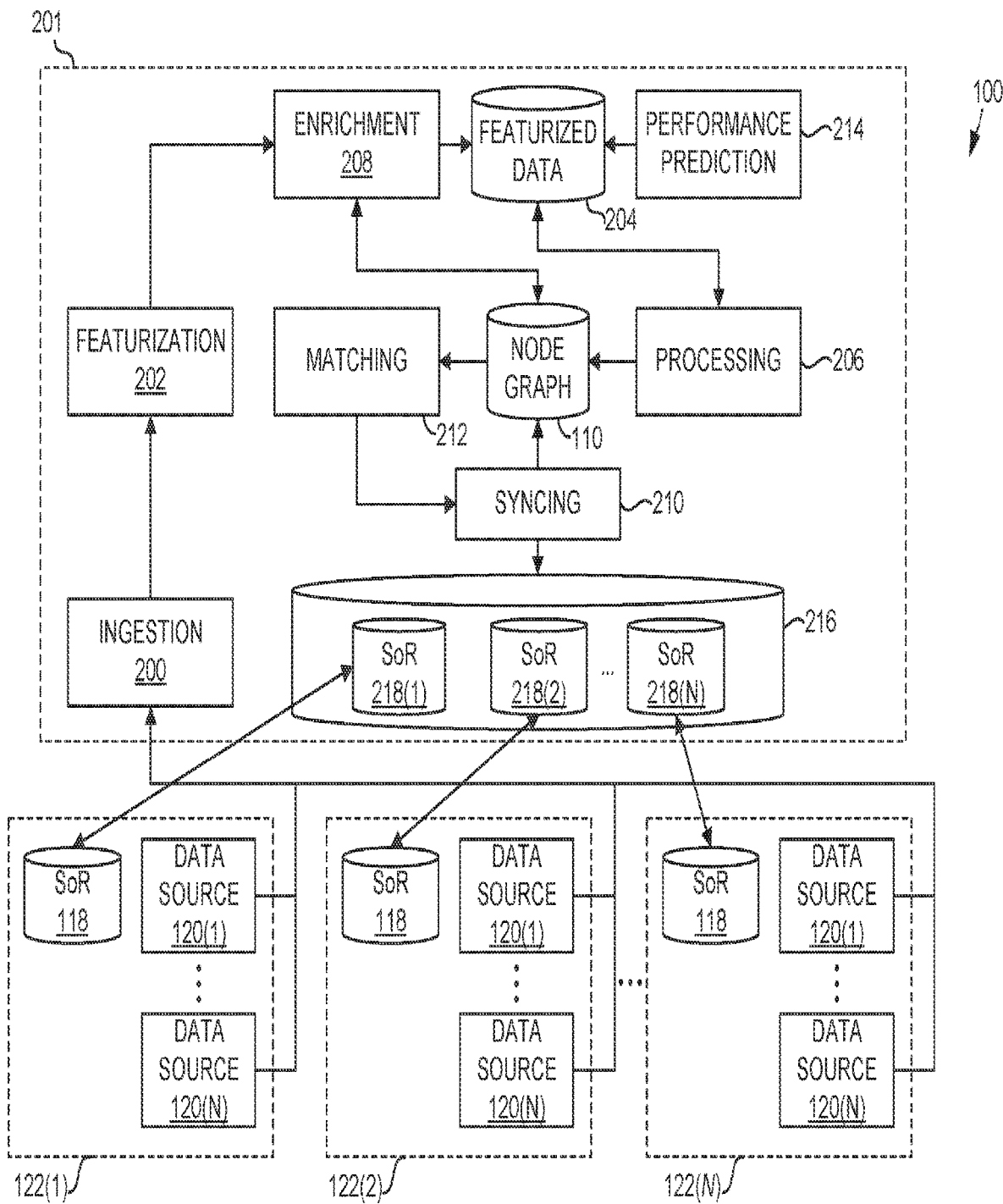
FIG. 2 illustrates a process flow diagram for constructing a node graph based on one or more electronic activities according to embodiments of the present disclosure.

FIGS. 1 and 2 illustrate a data processing system 100 and process flow 201 for aggregating electronic activities, processing the electronic activities to update node profiles of entities and to construct a node graph 110, and synchronizing the electronic activities and data to one or more systems of record 118. As a brief overview, the data processing system 100 may include an ingestion engine 102, an extraction engine 104, an enrichment engine 106, a node graph engine 108, an intelligence engine 112, and a delivery engine 114, among others. The ingestion engine 102 can be configured to ingest electronic activities associated with an entity, as described in greater detail below with reference to FIG. 3A. The entity can be a person, company, group of people, among others. In some embodiments, the entity can be any entity that is assigned an identifier configured to receive or transmit electronic activities. The extraction engine 104 can be configured to extract data from electronic activities, record objects, systems of record, and/or any other item or system that is ingested by ingestion engine 102, as described in greater detail below with reference to FIG. 3B. The enrichment engine 106 can be configured to configured to identify data extracted from electronic activities and update node graph 110 based on the extracted data, as described in greater detail below with reference to FIG. 3C. The node graph engine 108 can be configured to configured to generate, manage and update the node graph 110, as described in greater detail below with reference to FIG. 3D. The intelligence engine 112 can be configured to determine insights for a company, as described in greater detail below with reference to FIG. 3E.

A process flow 201 can be executed by the data processing system 100 that can receive electronic activities and other data from the data sources 120 a plurality of data source providers 122(1)-122(N). Each data source provider 122 can include one or more data sources 120(1)-120(N) and/or one or more system of record 118. Examples of data source providers 122 can include companies, universities, enterprises, or other group entities which enroll with or subscribe to one or more services provided by the data processing system 100. Each of the data source providers 122 can include one or more data sources 120 such as, for example electronic mail servers (e.g., electronic mail data sources 120) which store or include data corresponding to electronic mail (such as an exchange server), telephone log servers (e.g., telephone log data sources 120) which store or include data corresponding to incoming/outgoing/missed telephone calls, contact servers (e.g., contact data sources 120) which store or include data corresponding to contacts, other types of servers and end-user applications that are configured to store or include data corresponding to electronic activities (also referred to as "electronic activity data") or profile data relating to one or more nodes.

At step 200, the data processing system 100 can ingest electronic activity. The data processing system 100 can ingest electronic activities from the data sources 120 of the data source providers 122 (e.g., via the ingestion engine 102. At step 202, the data processing system 100 can featurize the ingested electronic activities. The data processing system 100 can featurize the ingested electronic activities by parsing and tagging the electronic activities. At step 204, and following featurizing the electronic activities at step 202, the data processing system 100 can store the featurized data. In some embodiments, the data processing system 100 can store the featurized data in a featurized data store. At step 206, the data processing system 100 can process the featurized data to generate a node graph 110 including a plurality of node profiles. The data processing system 100 can store the node graph(s) 110 in one or more databases or other data stores as shown in FIG. 2. The node graph 110 can include a plurality of nodes and a plurality of edges between the nodes indicating activity or relationships that are derived from a plurality of data sources that can include one or more types of electronic activities. The plurality of data sources 120 can further include systems of record 118, such as customer relationship management systems, enterprise resource planning systems, document management systems, applicant tracking systems, or other sources of data that may maintain electronic activities, activities, or records.

In some embodiments, at step 208, upon featurizing an ingested electronic activity, the data processing system 100 can enrich an existing node graph 110 to include any features that were extracted from the electronic activity. In other words, the data processing system 100 can update, revise, or otherwise modify (e.g., enrich) the node graph 110 based on newly ingested and featurized electronic activities. In some embodiments, the data processing system 100 can further maintain a plurality of shadow system of record 218(1)-(N) corresponding to systems of record 118 of the data source providers 122(1)-(N). The shadow systems of record 218(1)-(N) may be maintained in a shadow system of record database 216. In some embodiments, at step 210, the data processing system 100 can synchronize data stored in the shadow system of record 218 to augment the node profiles. For instance, the data processing system 100 can utilize the shadow system of record 218 to augment the node profiles of the node graph 110 by synchronizing data stored in the shadow system of record 218 maintained by the data processing system 100. In some embodiments, at step 212, responsive to the data processing system 100 can further match the ingested electronic activities to one or more record objects maintained in one or more systems of record 118 of the data source provider 122 from which the electronic activity was received (e.g., via a data source 120) or the shadow system of records 218. The data processing system 100 can further synchronize the electronic activity matched to record objects to update the system of record 118 of the data source provider 122. In some embodiments, at step 214, the data processing system 100 can use the featurized data to provide performance predictions and generate other business process related outputs, insights, and recommendations.

The data processing system 100 may communicate with a client device 150 (e.g., a mobile device, computer, tablet, desktop, laptop, or other device communicably coupled to the data processing system 100). In some embodiments, the data processing system 100 can be configured to communicate with the client device 150 via the delivery engine 114. The delivery engine 114 can be or include any script, file, program, application, set of instructions, or computer-executable code that is configured to transmit, receive, and/or exchange data with one or more external sources. The delivery engine 114 may be or include, for instance, an API, communications interface, and so forth. In some embodiments, the delivery engine 114 may be configured to generate and transmit content, notifications, instructions, or other deliverables to the client device 150, to a system of record 118, and so forth. For instance, the delivery engine 114 may be configured to generate instructions for updating a system of record 118, notifications or prompts to a client device 150 associated with a node, and the like.

As described herein, electronic activity can include any type of electronic communication that can be stored or logged. Examples of electronic activities can include electronic mail messages, telephone calls, calendar invitations, social media messages, mobile application messages, instant messages, cellular messages such as SMS, MMS, among others, as well as electronic records of any other activity, such as digital content, such as files, photographs, screenshots, browser history, internet activity, shared documents, among others. Electronic activities can include electronic activities that can be transmitted or received via an electronic account, such as an email account, a phone number, an instant message account, among others.

Figures 4A, 4B, 4C:
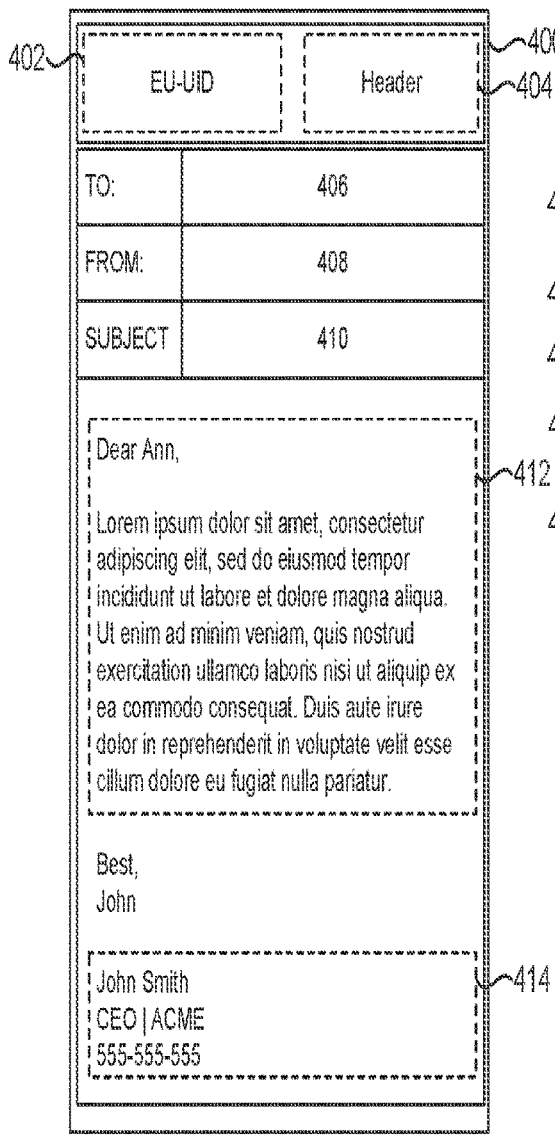
FIGS. 4A-4C illustrate various types of example electronic activities according to embodiments of the present disclosure.

Referring now to FIG. 4A, FIG. 4A illustrates an example electronic message 400. Each electronic message 400 may include an electronic activity unique identifier 402 and a message header 404. The message header 404 can include additional information relating to the transmission and receipt of the email message, including a time at which the email was sent, a message identifier identifying a message, an IP address associated with the message, a location associated with the message, a time zone associated with the sender, a time at which the message was transmitted, received, and first accessed, among others. Additionally, each electronic message 400 can identify one or more recipients 406, one or more senders 408. The electronic message 400 also generally includes a subject line 410, an email body 412, and an email signature 414 corresponding to the sender 408. The electronic message 400 can include additional data in the electronic message 400 or in the header or metadata of the electronic message 400.

Referring now to FIG. 4B, FIG. 4B illustrates an example call entry 425 representing a phone call or other synchronous communication (e.g., video call). The call entry 425 can identify a caller 420, a location 422 of the caller, a time zone 424 of the caller, a receiver 426, a location 428 of the receiver, a time zone 430 of the receiver, a start date and time 432, an end date and time 434, a duration 436 and a list of participants 538. In some embodiments, the times at which each participant joined and left the call can be included. Furthermore, the locations from which each of the callers called can be determined based on determining if the user called from a landline, cell phone, or voice over IP call, among others. The call entry 425 can also include fields for phone number prefixes (e.g., 800, 866, and 877), phone number extensions, and caller ID information.

Referring now to FIG. 4C, FIG. 4C illustrates an example calendar entry 450. The calendar entry 450 can identify a sender 452, a list of participants 454, a start date and time 456, an end date and time 458, a duration 460 of the calendar entry, a subject 462 of the calendar entry, a body 464 of the calendar entry, one or more attachments 466 included in the calendar entry and a location of event, described by the calendar entry 468. The calendar entry can include additional data in the calendar entry or in the header or metadata of the calendar entry 450.

The electronic activity can be stored on or at one or more data sources 120 for the data source providers 122. For example, the electronic activities can be stored on servers. The electronic activity can be owned or managed by one or more data source providers 122, such as companies that utilize the services of the data processing system 100. The electronic activity can be associated with or otherwise maintained, stored or aggregated by a data source 120, such as Google G Suite, Microsoft Office365, Microsoft Exchange, among others. In some embodiments, the electronic activity can be real-time (or near real-time) electronic activities, asynchronous electronic activity (such as emails, text messages, among others) or synchronous electronic activities (such as meetings, phone calls, video calls), or other activity in which two parties are communicating simultaneously.

A. Electronic Activity Ingestion

Figure 3A:
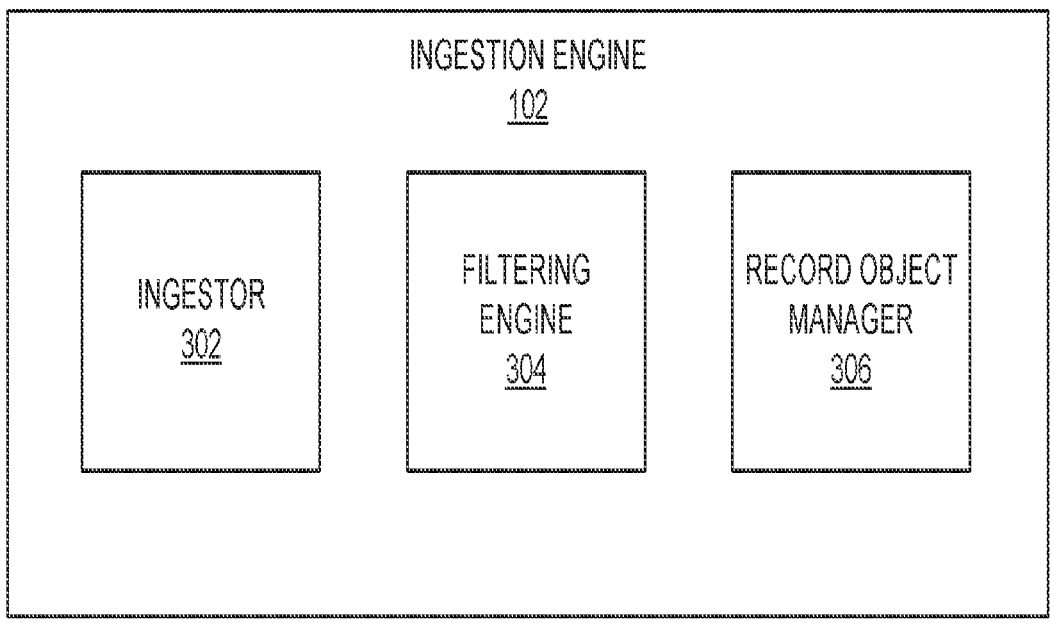
FIGS. 3A-3E illustrate detailed block diagrams of the components of the data processing system of FIG. 1 according to embodiments of the present disclosure.

Referring now to FIG. 3A, FIG. 3A illustrates a detailed block diagram of the ingestion engine 102. The ingestion engine 102 may be configured to ingest electronic activities and record objects. The ingestion engine 102 can include an ingestor 302, a filtering engine 304, and a record object manager 306. The ingestion engine 102 and each of the components of the ingestion engine 102 can be any script, file, program, application, set of instructions, or computer-executable code.

The ingestor 302 can be any script, file, program, application, set of instructions, or computer-executable code that is configured to enable a computing device on which the ingestor 302 is executed to perform one or more functions of the ingestor 302 described herein. The ingestor 302 can be configured to ingest electronic activities from the plurality of data source providers. The electronic activities may be received or ingested in real-time or asynchronously as electronic activities are generated, transmitted, or stored by the one or more data source providers.

The data processing system 100 or the ingestor 302 can ingest electronic activity from a plurality of different source providers. In some embodiments, the data processing system 100 or the ingestor 302 can be configured to manage electronic activities and one or more systems of record for one or more enterprises, organizations, companies, businesses, institutions or any other group associated with a plurality of electronic activity accounts. The data processing system 100 or the ingestor 302 can ingest electronic activities from one or more servers that hosts, processes, stores or manages electronic activities. In some embodiments, the one or more servers can be electronic mail or messaging servers. The data processing system 100 or the ingestor 302 can ingest all or a portion of the electronic activities stored or managed by the one or more servers. In some embodiments, the data processing system 100 or the ingestor 302 can ingest the electronic activities stored or managed by the one or more servers once or repeatedly on a periodic basis, such as daily, weekly, monthly or any other frequency.

The data processing system 100 or the ingestor 302 can further ingest other data that may be used to generate or update node profiles of one or more nodes maintained by the data processing system 100. The other data may also be stored by the one or more servers that hosts, processes, stores or manages electronic activities. This data can include contact data, such as names, addresses, phone numbers, company information, titles, among others.

The data processing system 100 can further ingest data from one or more systems of record. The systems of record can be hosted, processed, stored or managed by one or more servers of the systems of record. The systems of record can be linked or otherwise associated with the one or more servers that host, process, store or manage electronic activities. In some embodiments, both the servers associated with the electronic activities and the servers maintaining the systems of record may belong to the same organization or company.

The ingestor 302 can receive electronic activities and assign each electronic activity an electronic activity unique identifier (e.g., electronic activity unique identifier) to enable the data processing system 100 to uniquely identify each electronic activity. In some embodiments, the electronic activity unique identifier can be the same identifier as a unique electronic activity identifier included in the electronic activity. In some embodiments, the electronic activity unique identifier is included in the electronic activity by the source of the electronic activity or any other system.

The ingestor 302 can be configured to format the electronic activity in a manner that allows the electronic activity to be parsed or processed. In some embodiments, the ingestor 302 can identify one or more fields of the electronic activity and apply one or more normalization techniques to normalize the values included in the one or more fields. In some embodiments, the ingestor 302 can format the values of the fields to allow content filters to apply one or more policies to identify one or more regex patterns for filtering the content, as described herein.

The ingestor 302 can be configured to ingest electronic activities on a real-time or near real-time basis for accounts of one or more enterprises, organizations, companies, businesses, institutions or any other group associated with a plurality of electronic activity account with which the data processing system 100 has integrated. When an enterprise client subscribes to a service provided by the data processing system 100, the enterprise client provides access to electronic activities maintained by the enterprise client by going through an onboarding process. That onboarding process allows the data processing system 100 to access electronic activities owned or maintained by the enterprise client from one or more electronic activities sources. This can include the enterprise client's mail servers, one or more systems of record, one or more phone services or servers of the enterprise client, among other sources of electronic activity. The electronic activities ingested during an onboarding process may include electronic activities that were generated in the past, perhaps many years ago, that were stored on the electronic activities sources. In addition, in some embodiments, the data processing system 100 can be configured to ingest and re-ingest the same electronic activities from one or more electronic activities sources on a periodic basis, including daily, weekly, monthly, or any reasonable frequency.

The ingestor 302 can be configured to receive access to each of the electronic activities from each of these sources of electronic activity including the systems of record of the enterprise client. The ingestor 302 can establish one or more listeners, or other mechanisms to receive electronic activities as they are received by the sources of the electronic activities enabling real-time or near real-time integration.

As more and more data is ingested and processed as described herein, the node graph 110 generated by the data processing system 100 can continue to store additional information obtained from electronic activities as electronic activities are accessed by the data processing system 100. The additional information, as will be described herein, can be used to populate missing fields or add new values to existing fields, reinforce field values that have low confidence scores and further increase the confidence score of field values, adjust confidence scores of certain data points, and identify patterns or make deductions based on the values of various fields of node profiles of nodes included in the graph.

As more data is ingested, the data processing system 100 can use existing node graph data to predict missing or ambiguous values in electronic activities such that the more node profiles and data included in the node graph 110, the better the predictions of the data processing system 100, thereby improving the processing of the ingested electronic activities and thereby improving the quality of each node profile of the node graph 110, which eventually will improve the quality of the overall node graph 110 of the data processing system 100.

The data processing system 100 can be configured to periodically regenerate or recalculate the node graph 110. The data processing system 100 can do so responsive to additional data being ingested by the data processing system 100. When new electronic activities or data is ingested by the data processing system 100, the data processing system 100 can be configured to recalculate the node graph 110 as the confidence scores (as will be described later) can change based on the information included in the new electronic activities. In some embodiments, the ingestor 302 may re-ingest previously ingested data from the one or more electronic activity sources or simply ingest the new electronic activity not previously ingested by the data processing system 100.

B. Filtering Engine

The filtering engine 304 can be any script, file, program, application, set of instructions, or computer-executable code that is configured to enable a computing device on which the filtering engine 304 is executed to perform one or more functions of the filtering engine 304 described herein.

The filtering engine 304 can use information identified, generated or otherwise made available by a tagging engine 312 (described below). The filtering engine 304 can be configured to block, remove, redact, delete, or authorize electronic activities tagged or otherwise parsed or processed by the tagging engine 312. For example, the tagging engine 312 can be configured to assign tags to electronic activities, node profiles, systems of record 118, among others. The filtering engine 304 can be configured with a policy or rule that prevents ingestion of an electronic activity having a specific tag or any combination of tags, such as a personal tag, a credit card tag or a social security tag. By applying filtering rules or policies to tags assigned to electronic activities, node profiles, or records from the one or more systems of record, among others, the data processing system 100 can be configured to block, delete, redact or authorize electronic activities at the ingestion step or redact out parts or whole values of any of the fields in the ingested electronic activities.

C. Record Object Manager

The record object manager 306 can be any script, file, program, application, set of instructions, or computer-executable code that is configured to enable a computing device on which the record object manager 306 is executed to perform one or more functions of the record object manager 306 described herein. The record object manager 306 can be configured to maintain data regarding record objects of multiple systems of record and can be configured to augment information for a record object by extracting information from multiple record objects across a plurality of systems of record. The record object manager 306 can function as a system of record object aggregator that is configured to aggregate data points (e.g., electronic activities, record objects, etc.) from many systems of record, calculate the contribution score of each data point, and generate a timeline of the contribution score of each of those data points. The record object manager 306 or the data processing system 100 in general can then enrich the node graph 110 generated and maintained by the data processing system 100 by updating node profiles using the data points and their corresponding contribution scores. In certain embodiments, the record object manager 306 can be further configured to utilize the data from the node graph to update or fill in missing data in a target system of record provided the data in the node graph satisfies a predetermined confidence value.

Figure 3B:
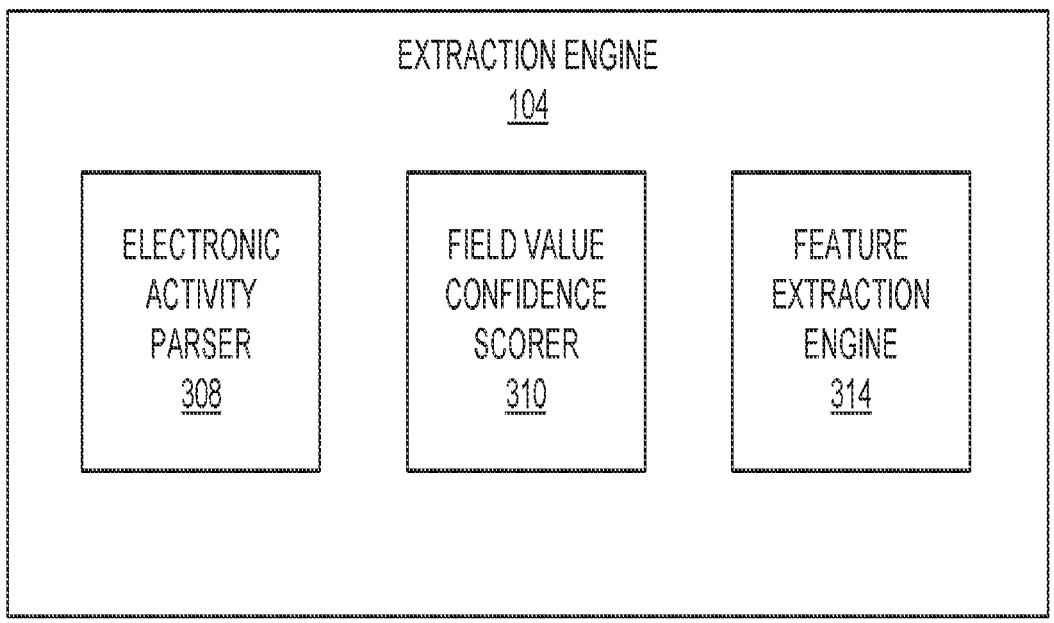

Referring now to FIG. 3B, FIG. 3B illustrates a detailed block diagram of the extraction engine 104. The extraction engine 104 may include electronic activity parser 308, field value confidence scorer 310, and/or feature extraction engine 314. Extraction engine 104 may be configured to extract data from electronic activities, record objects, systems of record, and/or any other item or system that is ingested by ingestion engine 102. The extraction engine 104 and each of the components of the extraction engine 104 can be any script, file, program, application, set of instructions, or computer-executable code.

D. Electronic Activity Parsing

The electronic activity parser 308 can be any script, file, program, application, set of instructions, or computer-executable code, which is configured to enable a computing device on which the electronic activity parser 308 is executed to perform one or more functions of the electronic activity parser 308 described herein.

The electronic activity parser 308 can be configured to parse the electronic activity to identify one or more values of fields to be used in generating node profiles of one or more nodes and associate the electronic activities between nodes for use in determining the connection and connection strength between nodes. The node profiles can include fields having name-value pairs. The electronic activity parser 308 can be configured to parse the electronic activity to identify values for as many fields of the node profiles of the nodes with which the electronic activity is associated.

The electronic activity parser 308 can be configured to identify each of the nodes associated with the electronic activity. In some embodiments, the electronic activity parser 308 can parse the metadata of the electronic activity to identify the nodes. The metadata of the electronic activity can include a To field, a From field, a Subject field, a Body field, a signature within the body and any other information included in the electronic activity header that can be used to identify one or more values of one or more fields of any node profile of nodes associated with the electronic activity. In some embodiments, non-email electronic activity can include meetings or phone calls. The metadata of such non-email electronic activity can include one or more participants of the meeting or call. In some embodiments, nodes are associated with the electronic activity if the node is a sender of the electronic activity, a recipient of the electronic activity, a participant of the electronic node, or identified in the contents of the electronic activity. The node can be identified in the contents of the electronic activity or can be inferred based on information maintained by the data processing system 100 and based on the connections of the node and one or more of the sender or recipients of the electronic activity.

The electronic activity parser 308 can be configured to parse the electronic activity to identify fields, attributes, values, or characteristics of the electronic activity. In some embodiments, the electronic activity parser 308 can apply natural language processing techniques to the electronic activity to identify regex patterns, words or phrases, or other types of content that may be used for sentiment analysis, filtering, tagging, classifying, deduplication, effort estimation, and other functions performed by the data processing system 100.

In some embodiments, the electronic activity parser 308 can be configured to parse an electronic activity to identify values of fields or attributes of one or more nodes. For instance, when an electronic mail message is ingested into the data processing system 100, the electronic activity parser 308 can identify a FROM field of the electronic mail message. The FROM field can include a name and an email address. The name can be in the form of a first name and a last name or a last name, first name. The electronic activity parser 308 can extract the name in the FROM field and the email address in the FROM field to determine whether a node is associated with the sender of the electronic mail message.

E. Node Field Value Confidence Scoring

The field value confidence scorer 310 can be any script, file, program, application, set of instructions, or computer-executable code, that is configured to enable a computing device on which the field value confidence scorer 310 is executed to perform one or more functions of the field value confidence scorer 310 described herein. The field value confidence scorer 310 can be configured to determine a confidence of each value of an attribute of a node profile. The confidence of a value is determined based in part on a number of electronic activities or sources that contribute to the value, time since each electronic activity provided support or evidence of the value, time since the field value in the source system of record was last modified or confirmed by a human operator, as well as the source of the electronic activity. Electronic activity that is received from mail servers or another source that does not involve manual entry may be assigned a greater weight (or trust/health score) than a source that involves manual entry, such as a customer relationship management tool.

The field value confidence scorer 310 can be configured to determine a confidence of each value of an attribute of a node profile. An attribute or field can have multiple candidate values and the value with the highest confidence score can be used by the data processing system 100 for confirming or validating the value of the field. The field value confidence scorer 310 can apply one or more scoring algorithms to determine the likelihood that each value is a correct value of the field. It should be appreciated that a value does not need to be current to be correct. In some embodiments, as new entities are onboarded into the system, electronic activities and systems of record corresponding to systems of record of the new entities can be processed by the data processing system 100. In processing these electronic activities and systems of record, some electronic activities can be associated with dates many years in the past. Such electronic activities are not discarded. Rather, the data processing system 100 processes such electronic activities and information extracted from these electronic activities are used to populate values of fields of node profiles. Since each data point is associated with a timestamp, the data point may provide evidence for a certain value even if that value is not a current value. One example of such a value can be a job title of a person. The person many years ago may simply have been an associate at a law firm. However, that person is now a partner at the firm. If emails sent from this person's email account are processed by the data processing system 100, more recently sent emails can have a signature of the person indicating he's a partner, while older emails will have a signature of the person indicating he's an associate. Both values, partner and associate are correct values except only partner is the current value for the job title field. The job title field can include one or more fields, for instance, a seniority field and a department field. A confidence score of the current value may be higher in some embodiments as data points that are more recent may be assigned a higher contribution score than data points that are older. Additional details about contribution scores and confidence scores are provided below.

In some embodiments, a node profile can correspond to or represent a person. As will be described later, such node profiles can be referred to as member node profiles. The node profile can be associated with a node profile identifier that uniquely identifies the node profile. Each node profile can include a plurality of attributes or fields, such as First name, Last name, Email, job title, Phone, LinkedIn URL, Twitter handle, among others. In some embodiments, a node profile can correspond to a company. As will be described later, such node profiles can be referred to as group node profiles. The group node profile can be similar to the member node profile of a person except that certain fields may be different, for example, a member node profile of a person may include a personal cell phone number while a group node of a company may not have a personal cell phone number but may instead have a field corresponding to parent company or child company or fields corresponding to CEO, CTO, CFO, among others. As described herein, member node profiles of people and group node profiles of companies for the most part function the same and as such, descriptions related to node profiles herein relate to both member node profiles and group node profiles. Each field or attribute can itself be a 3-dimensional array. For instance, the First name field can have two values: first name_1|first name_2, one Last name value and three email address values email_A|email_B|email_C. Each value can have an Occurrence (counter) value, and for each occurrence that contributes to the Occurrence value, there is an associated Source (for example, email or System of record) value and an associated timestamp (for example, today, 3:04 pm PST) value. In this way, in some embodiments, each value of a field or attribute can include a plurality of arrays, each array identifying a data point or an electronic activity, a source of the data point or electronic activity, a time associated with the data point or electronic activity, a contribution score of the data point or electronic activity and, in some embodiments, a link to a record of the data point or electronic activity. It should be appreciated that the data point can be derived from a system of record. Since systems of records can have varying levels of trust scores, the contribution score of the data point can be based on the trust score of the system of record from which the data point was derived. Stated in another way, in addition to each field being a 3-dimensional array, in some embodiments, each value of an field can be represented as a plurality of arrays. Each array can identify an electronic activity that contributed to the value of the field, a time associated with the electronic activity and a source associated with the electronic activity. In certain embodiments, the sub-array of occurrences, sources and times can be a fully featured sub-array of data with linkage to where the data came from.

F. Feature Extraction

The feature extraction engine 314 of the extraction engine 104 can be any script, file, program, application, set of instructions, or computer-executable code, that is configured to enable a computing device on which the feature extraction engine 314 is executed to extract or identify features from one or more electronic activities and/or corresponding node profiles maintained by the data processing system 100 and use the extracted or identified features to generate corresponding feature vectors for the one or more electronic activities.

The feature extraction engine 314 can be a component of the electronic activity parser 308 or otherwise interface with the electronic activity parser 308 to parse electronic activities and extract features from electronic activities. For example, the electronic activity parser 308 can parse ingested electronic activities, such as, emails, calendar meetings, and phone calls. The feature extraction engine 314 can, for each electronic activity, extract various features from the electronic activity and in some embodiments, from one or more node profiles corresponding to the electronic activity that an electronic activity linking engine 328 (described below) can use to link the electronic activity to one or more record objects of the one or more systems of record. In some embodiments, before an electronic activity can be linked to a record object of a system of record, the electronic activity can be matched to one or more node profiles in the node graph. In this way, the feature extraction engine 314 can generate, based on the parsed data from the electronic activity parser 308, a feature vector for the electronic activity that can be used to link the electronic activity to a record object based on features extracted from the electronic activity as well as one or more node profiles of the node graph.

The feature vector can be an array of feature values that is associated with the electronic activity. The feature vector can include each of the features that were extracted or identified in the electronic activity by the feature extraction engine 314. For example, the feature vector for an email can include the sending email address, the receiving email address, and data parsed from the email signature. Each feature value in the array can correspond to a feature or include a feature-value pair. For example, the contact feature "John Smith" can be stored in the feature vector as "John Smith" or "name: John Smith" or "first name: John" "last name: Smith." As described herein, a matching engine 316 (described below) can use the feature vector to match or link the electronic activity to a record object. The feature vector can include information extracted from an electronic activity and also include information inferred from one or more node profiles of the data processing system 100. The feature vector can be used to link an electronic activity to at least particular record object of a system of record by matching the feature values of the feature vector to a record object. For instance, if the feature vector includes the values "John" for first name and "Smith" for last name, the matching engine 316 can link the electronic activity to a record object, such as a lead record object that includes the name "John Smith" assuming other matching conditions are also met.

Figure 3C:
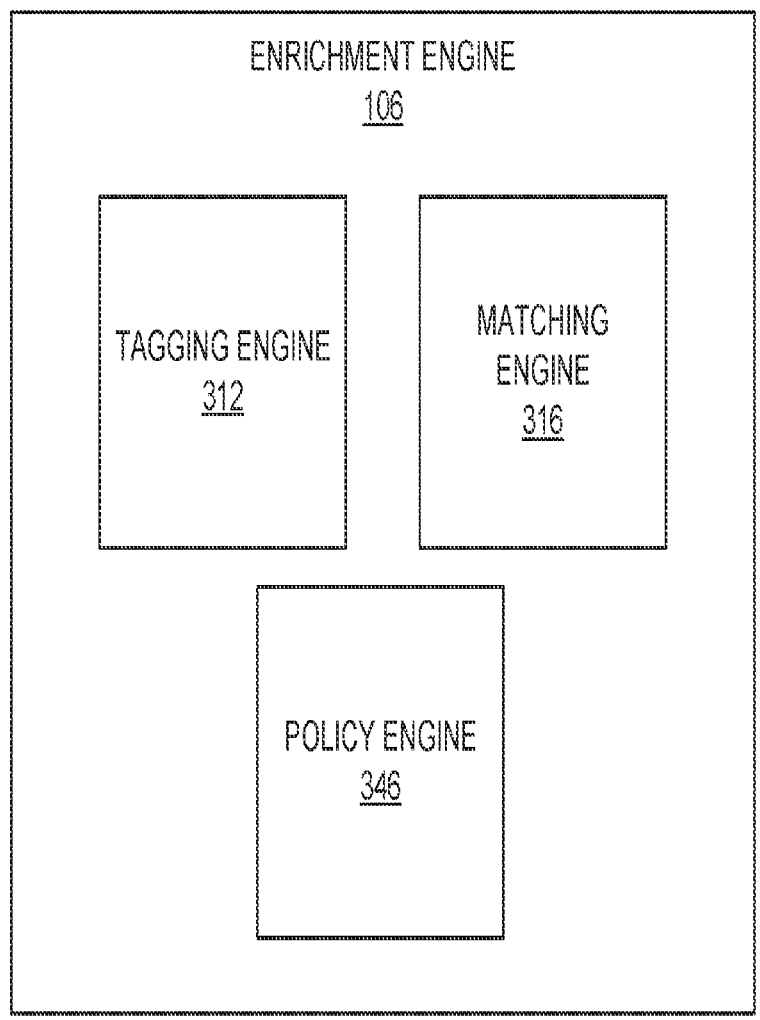

Referring now to FIG. 3C, FIG. 3C illustrates a detailed block diagram of the enrichment engine 106. The enrichment engine 106 may be configured to identify data extracted from electronic activities and update node graph 110 based on the extracted data. The enrichment engine 106 may include a tagging engine 312, matching engine 316, and/or a policy engine 346. The enrichment engine 106 and each of the components of the enrichment engine 106 can be any script, file, program, application, set of instructions, or computer-executable code.

G. Electronic Activity Tagging

The tagging engine 312 can be any script, file, program, application, set of instructions, or computer-executable code that is configured to enable a computing device on which the tagging engine 312 is executed to perform one or more functions of the tagging engine 312 described herein.

The tagging engine 312 can use information identified, generated or otherwise made available by the electronic activity parser 308. The tagging engine 312 can be configured to assign tags to electronic activities, node profiles, systems of record, among others. By having tags assigned to electronic activities, node profiles, records ingested from one or more systems of record, among others, the data processing system 100 can be configured to better utilize the electronic activities to more accurately identify nodes, and determine types and strengths of connections between nodes, among others. In some embodiments, the tagging engine 312 can be configured to assign a confidence score to one or more tags assigned by the tagging engine 312. The tagging engine 312 can periodically update a confidence score as additional electronic activities are ingested, re-ingested and analyzed. Additional details about some of the types of tags are provided herein.

The tagging engine 312 can assign one or more tags to electronic activities. The tagging engine 312 can determine, for each electronic activity, a type of electronic activity. Types of electronic activities can include meetings, electronic messages, and phone calls. For meetings and electronic messages such as emails, the tagging engine 312 can further determine if the meeting or electronic message is internal or external and can assign an internal tag to meetings or emails identified as internal or an external tag to meetings and emails identified as external. Internal meetings or emails may be identified as internal if each of the participants or parties included in the meeting or emails belong to the same company as the sender of the email or host of the meeting. The tagging engine 312 can determine this by parsing the email addresses of the participants and determining that the domain of the email addresses map to the domain name or an array of domain names, belonging to the same company or entity. In some embodiments, the tagging engine 312 can determine if the electronic activity is internal by parsing the email addresses of the participants and determining that the domain of the email addresses map to the same company or entity after removing common (and sometimes free) mail service domains, such as gmail.com and yahoo.com, among others. The tagging engine 312 may apply some additional logic to determine if emails belong to the same entity and use additional rules for determining if an electronic activity is determined to be internal or external. The tagging engine 312 can also identify each of the participants and determine whether a respective node profile of each of the participants is linked to the same organization. In some embodiments, the tagging engine 312 can determine if the node profiles of the participants are linked to a common group node (such as the organization's node) to determine if the electronic activity is internal. For phone calls, the tagging engine 312 may determine the parties to which the phone numbers are either assigned and determine if the parties belong to the same entity or different entities.

In some embodiments, the electronic activities are exchanged between or otherwise involve nodes (or the entities represented by the nodes). For example, the nodes can be representative of people or companies. In some embodiments, nodes can be member nodes or group nodes. A member node may refer to a node representative of a person that is part of a company or other organizational entity. A group node may refer to a node that is representative of the company or other organizational entity and is linked to multiple member nodes. The electronic activity may be exchanged between member nodes in which case the system is configured to identify the member nodes and the one or more group nodes associated with each of the member nodes.

The data processing system 100 can be configured to assign each electronic activity a unique electronic activity identifier. This unique electronic activity identifier can be used to uniquely identify the electronic activity. Further, each electronic activity can be associated with a source that provides the electronic activity. In some embodiments, the data source can be the company or entity that authorizes the data processing system 100 to receive the electronic activity. In some embodiments, the source can correspond to a system of record, an electronic activity server that stores or manages electronic activity, or any other server that stores or manages electronic activity related to a company or entity. As will be described herein, the quality, health or hygiene of the source of the electronic activity may affect the role the electronic activity plays in generating the node graph. The data processing system 100 can be configured to determine a time at which the electronic activity occurred. In some embodiments, the time may be based on when the electronic activity was transmitted, received or recorded. As will be described herein, the time associated with the electronic activity can also affect the role the electronic activity plays in generating the node graph.

H. Record Object Matching

The policy engine 346 can be any script, file, program, application, set of instructions, or computer-executable code that is configured to enable a computing device on which the policy engine 346 is executed to manage, store, and select matching strategies. The policy engine 346 can generate, manage, and store one or more matching strategy policies for each of the data source providers. For example, the policy engine 346 can generate matching strategy and restriction strategy policies for each division or group of users within a data source provider.

In some embodiments, a matching policy can include a data structure that indicates which matching strategies to apply to an electronic activity for a given data source provider. For example, the matching policy can include a list of matching strategies that are used to select record objects. The list of matching strategies can be manually created by a user or automatically generated or suggested by the system. In some embodiments, the policy engine 346 can learn one or more matching strategies based on observing how one or more users previously matched electronic activities to record objects. These matching strategies can be specific to a particular user, group, account, company, or across multiple companies. In some embodiments, the policy engine 346 can detect a change in linkages between one or more electronic activities and record objects in the system of record (for example, responsive to a user linking an electronic activity to another object inside a system of record manually). The policy engine 346 can, in response to detecting the change, learn from the detected change and update the matching strategy or create a new matching strategy within the matching policy. The policy engine 346 can be configured to then propagate the learning from that detected change across multiple matching strategies corresponding to one or more users, groups, accounts, and companies. The system can also be configured to find all past matching decisions that would have changed had the system detected the user-driven matching change before, and update those matching decisions retroactively using the new learning.

In some embodiments, the matching policy can also identify which restriction strategies to apply to an electronic activity for a given data source provider. For example, the matching policy can include a list of restriction strategies that are used to restrict record objects. The list of restriction strategies can be manually created by a user or automatically generated or suggested by the system. In some embodiments, the policy engine 346 can learn one or more restriction strategies based on observing how one or more users previously matched or unmatched electronic activities to record objects. These restriction strategies can be specific to a particular user, group, account, company, or across multiple companies. In some embodiments, the policy engine 346 can detect a change in linkages between one or more electronic activities and record objects in the system of record (for example, responsive to a user linking or unlinking an electronic activity to another object inside a system of record manually). The policy engine 346 can, in response to detecting the change, learn from the detected change and update the restriction strategy or create a new restriction strategy within the matching policy. The policy engine 346 can be configured to then propagate the learning from that detected change across multiple restriction strategies corresponding to one or more users, groups, accounts, and companies. The system can also be configured to find past matching decisions that would have changed had the system detected the user-driven restriction change before, and update those matching decisions retroactively using the new learning.

The policy engine 346 can update the matching policy with input or feedback from the data source provider with which the matching policy is associated. For example, the data source provider can provide feedback when an electronic activity is incorrectly linked and the matching policy can be updated based on the feedback. Updating a matching policy can include reordering the matching strategies, adding matching or restriction strategies, adjusting individual matching strategy behavior, removing matching strategies, or adding restriction strategies.

Figure 3D:
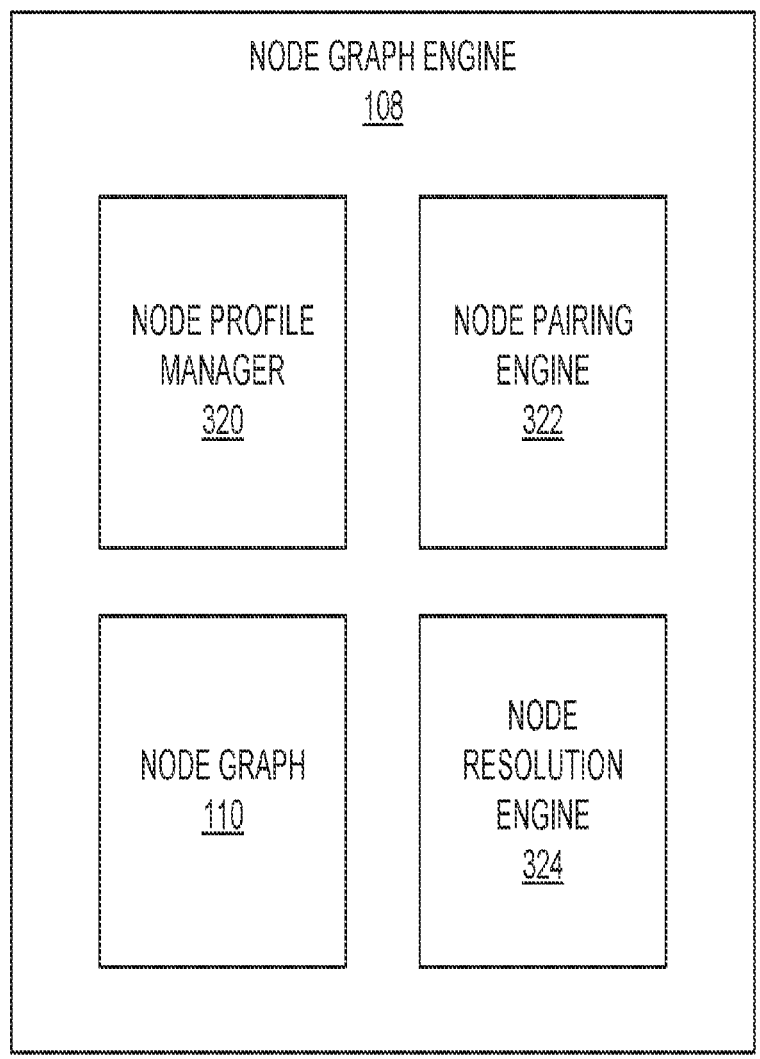

Referring now to FIG. 3D, FIG. 3D illustrates a detailed block diagram of the node graph engine 108. The node graph engine 108 may be configured to store and manage the node graph 110 and node profiles that are associated with the node graph 110. Node graph engine 108 may include a node profile manager 320, a node pairing engine 322, and a node resolution engine 324. The node graph engine 108 and each of the components of the node graph engine 108 can be any script, file, program, application, set of instructions, or computer-executable code designed or implemented to generate, modify, update, revise, and store node graph 110 (e.g., in one or more databases or data structures).

I. Node Profiles

The node profile manager 320 can be any script, file, program, application, set of instructions, or computer-executable code that is configured to enable a computing device on which the node profile manager 320 is executed to perform one or more functions of the node profile manager 320 described herein. The node profile manager 320 is configured to manage node profiles associated with each node. Node profiles of nodes are used to construct a node graph that includes nodes linked to one another based on relationships between the nodes that can be determined from electronic activities parsed and processed by the data processing system 100 as well as other information that may be received from one or more systems of record.

Figure 5:
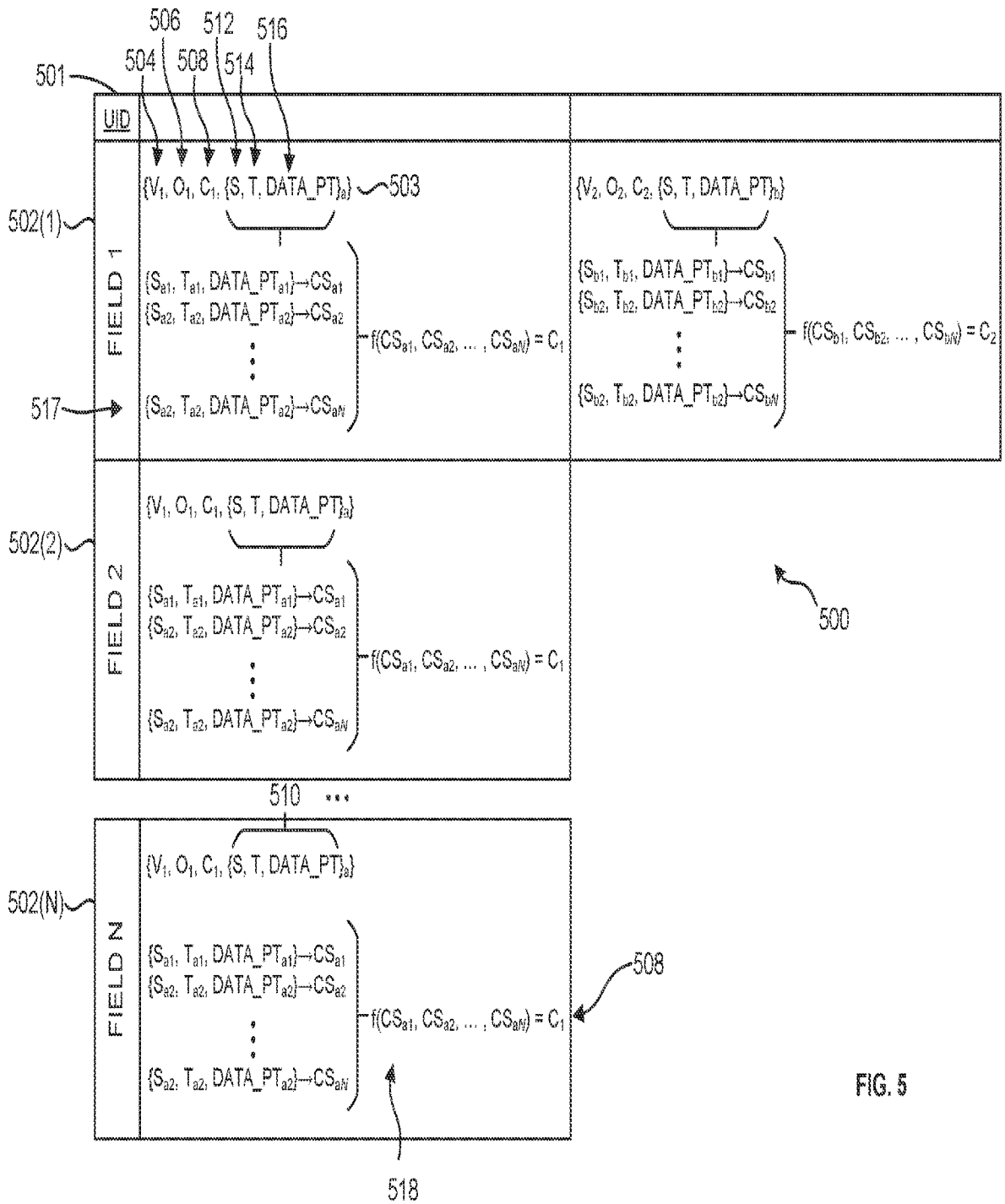
FIG. 5 illustrates a representation of a node profile of a node according to embodiments of the present disclosure.

Referring briefly to FIG. 5, depicted is a representation of a node profile 500 of a node. The node profile 500 may be generated by the node profile manager 320 (e.g., based on electronic activities). The node profile 500 can include a unique node identifier 501 and one or more fields 502(1)-502(N) (generally referred to as fields 502). Each field 502 can include one or more value data structures 503. Each value data structure 503 can include a value (V) 504, an occurrence metric (O) 506, a confidence score (C) 508, and an entry 510 corresponding to the electronic activity which was used for identifying the value 504. Each entry 510 can identify a data source (S) 512 from which the value 504 was identified (for instance, a data source 120 corresponding to a system of record or a data source 120 of an electronic activity), a number of occurrences of the value that appear in the electronic activity, a time 512 associated with the electronic activity, and a data point identifier 514 (e.g., identifying the electronic activity, such as an electronic activity unique identifier).

In some embodiments, the node profile manager 320 can be configured to compute the occurrence metric 506 based on the number of times a particular value 504 is identified in a group of electronic activities or systems of record. Hence, the occurrence metric 506 can identify or correspond to a number of times that value is confirmed or identified from electronic activities or systems of record. The node profile manager 320 can be configured to update the occurrence metric each time the value is confirmed. In some embodiments, the electronic activity can increase the occurrence metric of a value more than once. For instance, for a field such as name, the electronic activity parser 308 can parse multiple portions of an electronic activity. In some embodiments, parsing multiple portions of the electronic activity can provide multiple confirmations of, for example, the name associated with the electronic activity. In some embodiments, the occurrence metric is equal to or greater than the number of electronic activities or systems of record that contribute to the value. The node profile manager 320 further maintains an array including the plurality of entries 517.

The node profile manager 320 can be configured to maintain a node profile for each node that includes a time series of data points for value data structures 503 that is generated based on electronic activities identifying the respective node. The node profile manager 320 can maintain, for each field of the node profile, one or more value data structures 503. The node profile manager 320 can maintain a confidence score 508 for each value of the field. As described herein, the confidence score of the value can be determined using information relating to the electronic activities or systems of record that contribute to the value. The confidence score for each value can also be based on the below-described health score of the data source from which the value was received. As more and more electronic activities and data from more systems of record are ingested by the data processing system 100, values of each of the fields of node profiles of nodes will become more enriched thereby further refining the confidence score of each value.

In some embodiments, the node profile can include different types of fields for different types of nodes. Member node profiles and group node profiles may have some common fields but may also include different fields. Further, member node profiles may include fields that get updated more frequently than group nodes. Examples of some fields of member node profiles can include i) First name; ii) Last name; iii) Email; iv) job title; v) Phone; vi) Social media handle; vii) LinkedIn URL; viii) website; among others. Each of the fields can be a 3-dimensional array. In some embodiments, each field corresponds to one or more name value pairs, where each field is a name and each value for that field is a value. Examples of some fields of group nodes can include i) Company or Organization name; ii) Address of Company; iii) Phone; iv) Website; v) Social media handle; vi) LinkedIn handle; among others. Each of the fields can be a 3-dimensional array. In some embodiments, each field corresponds to one or more name value pairs, where each field is a name and each value for that field is a value.

The node profile manager 320 can maintain, for each field of each node profile, a field data structure that can be stored as a multidimensional array. The multidimensional array can include a dimension relating to data points that identify a number of electronic activities or system of records that contribute to the field or the value of the field. Another dimension can identify the source, which can have an associated trust score that can be used to determine how much weight to assign to the data point from that source. Another dimension can identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. These dimensions can be used to determine a confidence score of the value as will be described herein.

In some embodiments, the node profile manager 320 can be configured to compute the confidence score 508 as a function 518 of a number of occurrences of the value 504 included in an electronic activity. For example, the confidence score 508 of the value 504 may increase as the number of occurrences of the value 504 included in the electronic activity increases. In some embodiments, the node profile manager 320 can assign a contribution score (CS) to each entry 510 corresponding to a particular value (e.g., a data point). The contribution score can be indicative of the data point's contribution towards the confidence score 508 of the value. In some embodiments, the contribution score of an entry 510 can decay over time as the data point becomes staler. The contribution scores of each of the data points derived from electronic activities and systems of record can be used to compute the confidence score 508 of the value 504 of a field 502 of the node profile 500.

Each of the values 504 included in the node profile 500 can be supported by one or more data points or entries 510. Data points can be pieces of information or evidence that can be used to support the existence of values of fields of node profiles. A data point can be an electronic activity, a record object of a system of record, or other information that is accessible and processable by the data processing system 100. In some embodiments, a data point can identify an electronic activity, a record object of a system of record, or other information that is accessible and processable by the data processing system 100 that serves as a basis for supporting a value in a node profile. Each data point can be assigned its own unique identifier. Each data point can be associated with a source of the data point identifying an origin of the data point. The source of the data point can be a mail server, a system of record, among others. Each of these data points can also include a timestamp. The timestamp of a data point can identify when the data point was either generated (in the case of an electronic activity such as an email) or the record object that serves as a source of the data point was last updated (in the case when the data point is extracted from a system of record). Each data point can further be associated with a trust score of the source of the data point. The trust score of the source can be used to indicate how trustworthy or reliable the data point is. The data point can also be associated with a contribution score that can indicate how much the data point contributes towards a confidence score of the value associated with the data point. The contribution score can be based on the trust score of the source (which can be based in part on a health score of the source) and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

The table below illustrates various values for various fields and includes an array of data points that contribute to the respective value. As shown in the table, the same electronic activity can serve as different data points for different values. Further, the table illustrates a simplified form for the same of convenience and understanding. Different values can be supported by different number of data points. As will be described below, it can be challenging to match electronic activities to node profiles.

|  | DP # | DP ID | TimeStamp | ActivityID | Source | Trust Score | Contribution Score |
|---|---|---|---|---|---|---|---|
| Field: First Name | | | Value: John [Confidence Score] = 0.8 | | | | |
| | DP 1: | DP ID101 | 2/1/2016 4 pm ET | EA-003 | Email | 100 | 0.6 |
| | DP 2: | DP ID225 | 2/18/2017 2 pm ET | SOR-012 | CRM | 70 | 0.4 |
| | DP 3: | DP ID343 | 3/1/2018 1 pm ET | EA-017 | Email | 100 | 0.7 |
| | DP 4: | DP ID458 | 7/1/2018 3 pm ET | EA-098 | Email | 100 | 0.8 |
| | DP 5: | DP ID576 | 9/12/2015 3 pm ET | SOR-145 | Talend | 20 | 0.2 |

-continued

| | DP # | DP ID | TimeStamp | ActivityID | Source | Trust Score | Contribution Score |
|---|---|---|---|---|---|---|---|
| Field: First Name | | Value: Johnathan [Confidence Score] = 0.78 | | | | | |
| | DP 1: | DP ID101 | 2/1/2016 4 pm ET | EA-003 | Email | 100 | 0.6 |
| | DP 2: | DP ID225 | 2/18/2017 2 pm ET | SOR-012 | CRM | 70 | 0.4 |
| | DP 3: | DP ID343 | 3/1/2018 1 pm ET | EA-017 | Email | 100 | 0.7 |
| | DP 4: | DP ID458 | 7/1/2018 3 pm ET | EA-098 | Email | 100 | 0.8 |
| | DP 5: | DP ID576 | 9/12/2015 3 pm ET | SOR-145 | Talend | 20 | 0.2 |
| Field: Title | | Value: Director [Confidence Score] = 0.5 | | | | | |
| | DP 1: | DP ID101 | 2/1/2016 4 pm ET | EA-003 | Email | 100 | 0.6 |
| | DP 2: | DP ID225 | 2/18/2017 2 pm ET | SOR-012 | CRM | 70 | 0.4 |
| | DP 3: | DP ID243 | 3/1/2017 1 pm ET | EA-117 | Email | 100 | 0.65 |
| | DP 4: | DP ID243 | 3/1/2018 1 pm ET | SOR-087 | CRM | 5 | 0.05 |
| Field: Title | | Value: CEO [Confidence Score] = 0.9 | | | | | |
| | DP 1: | DP ID343 | 3/1/2018 1 pm ET | EA-017 | Email | 100 | 0.7 |
| | DP 2: | DP ID458 | 7/1/2018 3 pm ET | EA-098 | Email | 100 | 0.8 |
| | DP 3: | DP ID225 | 3/18/2018 2 pm ET | SOR-015 | CRM | 65 | 0.54 |
| Field: Company | | Value: Acme [Confidence Score] = 0.6 | | | | | |
| | DP 1: | DP ID101 | 2/1/2016 4 pm ET | EA-003 | Email | 100 | 0.6 |
| | DP 2: | DP ID225 | 2/18/2017 2 pm ET | SOR-012 | CRM | 70 | 0.4 |
| | DP 3: | DP ID343 | 3/1/2018 1 pm ET | EA-017 | Email | 100 | 0.7 |
| Field: Company | | Value: NewCo [Confidence Score] = 0.9 | | | | | |
| | DP 1: | DP ID458 | 7/1/2018 3 pm ET | EA-098 | Email | 100 | 0.8 |
| | DP 2: | DP ID654 | 7/18/2018 2 pm ET | EA-127 | Email | 100 | 0.85 |
| | DP 3: | DP ID876 | 8/1/2018 1 pm ET | EA-158 | Email | 100 | 0.9 |
| Field: Cell Phone | | Value: 617-555-2000 [Confidence Score] = 0.95 | | | | | |
| | DP 1: | DP ID101 | 2/1/2016 4 pm ET | EA-003 | Email | 100 | 0.6 |
| | DP 2: | DP ID225 | 2/18/2017 2 pm ET | SOR-012 | CRM | 70 | 0.4 |
| | DP 3: | DP ID343 | 3/1/2018 1 pm ET | EA-017 | Email | 100 | 0.7 |
| | DP 4: | DP ID458 | 7/1/2018 3 pm ET | EA-098 | Email | 100 | 0.8 |
| | DP 5: | DP ID576 | 9/12/2015 3 pm ET | SOR-145 | Talend | 20 | 0.2 |
| | DP 6: | DP ID654 | 7/18/2018 2 pm ET | EA-127 | Email | 100 | 0.85 |
| | DP 7: | DP ID876 | 8/1/2018 1 pm ET | EA-158 | Email | 100 | 0.9 |

As a result of populating values of fields of node profiles using electronic activities, the node profile manager 320 can generate a node profile that is unobtrusively generated from electronic activities that traverse networks. In some embodiments, the node profile manager 320 can generate a node profile that is unobtrusively generated from electronic activities and systems of record.

J. Matching Electronic Activity to Node Profiles

The node profile manager 320 can be configured to manage node profiles by matching electronic activities to one or more node profiles. Responsive to the electronic activity parser 308 parsing the electronic activity to identify values corresponding to one or more fields or attributes of node profiles, the node profile manager 320 can apply an electronic activity matching policy to match electronic activities to node profiles. In some embodiments, the node profile manager 320 can identify each of the identified values corresponding to a sender of the electronic activity to match the electronic activity to a node profile corresponding to the sender.

Using an email message as an example of an electronic activity, the node profile manager 320 may first determine if the parsed values of one or more fields corresponding to the sender of the email message match corresponding values of fields. In some embodiments, the node profile manager 320 may assign different weights to different fields based on a uniqueness of values of the field. For instance, email addresses may be assigned greater weights than first names or last names or phone numbers if the phone number corresponds to a company.

In some embodiments, the node profile manager 320 can use data from the electronic activity and one or more values of fields of candidate node profiles to determine whether or not to match the electronic activity to one or more of the candidate node profiles. The node profile manager 320 can attempt to match electronic activities to one or more node profiles maintained by the node profile manager 320 based on the one or more values of the node profiles. The node profile manager 320 can identify data, such as strings or values from a given electronic activity and match the strings or values to corresponding values of the node profiles. In some embodiments, the node profile manager 320 can compute a match score between the electronic activity and a candidate node profile by comparing the strings or values of the electronic activity match corresponding values of the candidate node profile. The match score can be based on a number of fields of the node profile including a value that matches a value or string in the electronic activity. The match score can also be based on different weights applied to different fields. The weights may be based on the uniqueness of values of the field, as mentioned above. The node profile manager 320 can be configured to match the electronic activity to the node with the best match score. For example, the best match score can be the highest or greatest match score. In some embodiments, the node profile manager 320 can match the electronic activity to each candidate node that has a match score that exceeds a predetermined threshold. Further, the node profile manager 320 can maintain a match score for each electronic activity to that particular node profile, or to each value of the node profile to which the electronic activity matched. By doing so, the node profile manager 320 can use the match score to determine how much weight to assign to that particular electronic activity. Stated in another way, the better the match between the electronic activity and a node profile, the greater the influence the electronic activity can have on the values (for instance, the contribution scores of the data point on the value and as a result, in the confidence scores of the values) of the node profile. In some embodiments, the node profile manager 320 can assign a first weight to electronic activities that have a first match score and assign a second weight to electronic activities that have a second match score. The first weight may be greater than the second weight if the first match score is greater than the second match score. In some embodiments, if no nodes are found to match the electronic activity or the match score between the email message and any of the candidate node profiles is below a threshold, the node profile manager 320 can be configured to generate a new node profile to which the node profile manager assigns a unique node identifier 501. The node profile manager 320 can then populate various fields of the new node profile from the information extracted from the electronic activity parser 308 after the electronic activity parser 308 parses the electronic activity.

In addition to matching the electronic activity to a sender node, the node profile manager 320 is configured to identify each of the nodes to which the electronic activity can be matched. For instance, the electronic activity can be matched to one or more recipient nodes using a similar technique except that the node profile manager 320 is configured to look at values extracted from the TO field or any other field that can include information regarding the recipient of the node. In some embodiments, the electronic activity parser 308 can be configured to parse a name in the salutation portion of the body of the email to identify a value of a name corresponding to a recipient node. In some embodiments, the node profile manager 320 can also match the electronic activity to both member nodes as well as the group nodes to which the member nodes are identified as members.

In some embodiments, the electronic activity parser 308 can parse the body of the electronic activity to identify additional information that can be used to populate values of one or more node profiles. The body can include one or more phone numbers, addresses, or other information that may be used to update values of fields, such as a phone number field or an address field. Further, if the contents of the electronic activity includes a name of a person different from the sender or recipient, the electronic activity parser 308 can further identify one or more node profiles matching the name to predict a relationship between the sender and/or recipient of the electronic activity and a node profile matching the name included in the body of the electronic activity.

The node profile manager 320 can be configured to identify a node that has fields having values that match the values included in the node profile of the node.

K. Node Profile Value Prediction and Augmentation

The node profile manager 320 can be configured to augment node profiles with additional information that can be extracted from electronic activities or systems of record or that can be inferred based on other similar electronic activities or systems of record. In some embodiments, the node profile manager 320 can determine a pattern for various fields across a group of member nodes (such as employees of the same company). For instance, the node profile manager 320 can determine, based on multiple node profiles of member nodes belonging to a group node, that employees of a given company are assigned email addresses following a given regex pattern. For instance, [first name].[last name]@[company domain].com. As such, the node profile manager 320 can be configured to predict or augment a value of a field of a node profile of an employee of a given company when only certain information or limited of the employee is known by the node profile manager 320.

As described herein, the node profile manager 320 can be configured to use information from node profiles to predict other values. In particular, there is significant interplay between dependent fields such as phone numbers and addresses, and titles and companies, in addition to email addresses and names, among others.

Figure 6:
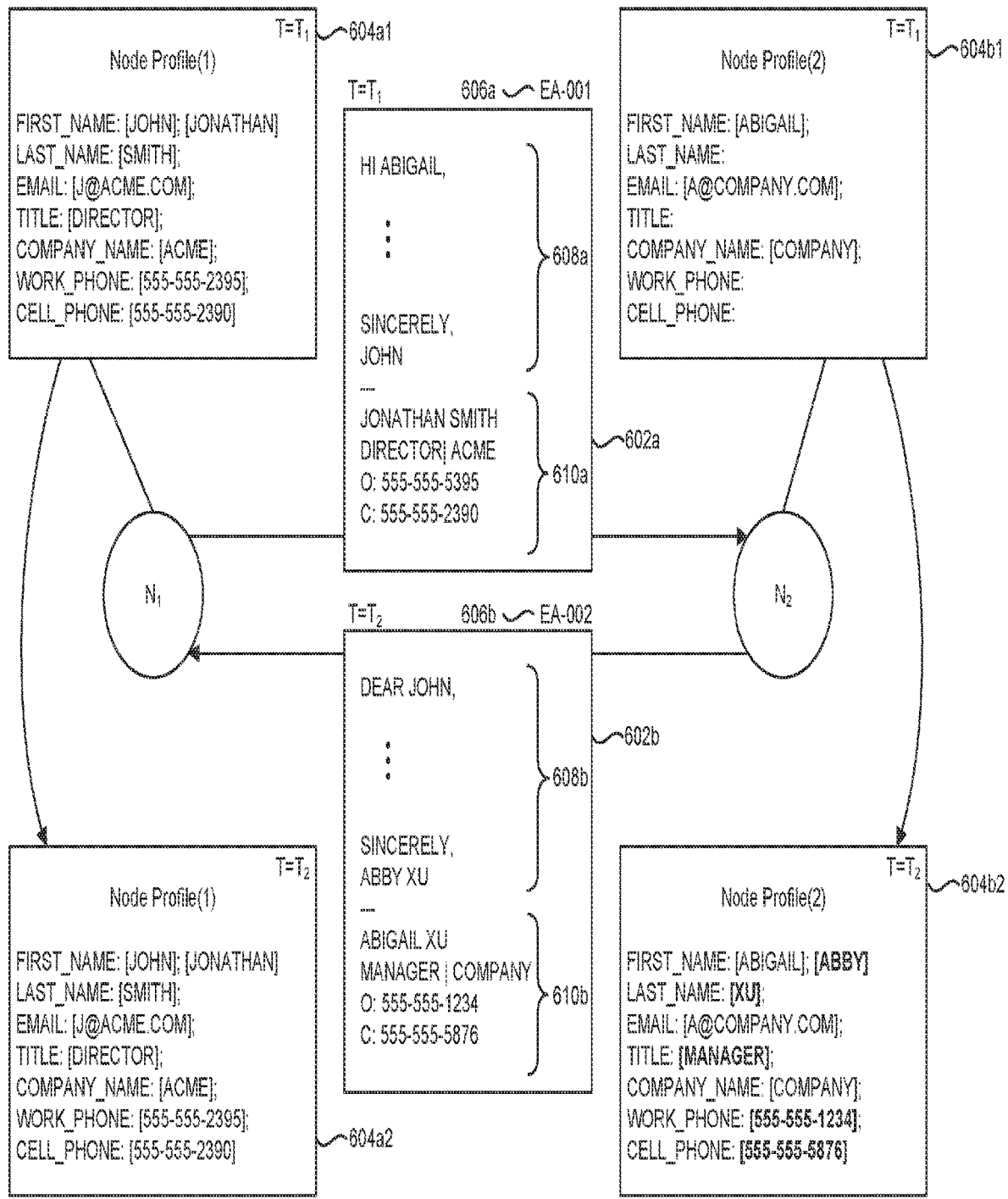
FIG. 6 illustrates a block diagram of a series of electronic activities between two nodes according to embodiments of the present disclosure.

For example, referring now to FIG. 6, FIG. 6 illustrates a series of electronic activities between two nodes. As described herein, a first node N1 and a second node N2 may exchange a series of electronic activities 602. FIG. 6 also shows a representation of two electronic activities 602a, 602b and representations of two node profiles 604a, 604b of the two nodes at two different states (e.g., 604a1, 604a2, 604b1, 604b2) according to embodiments of the present disclosure.

In FIG. 6, a first electronic activity 602a sent at a first time, T=T1, and a second electronic activity 602b sent at a second time, T=T2, are shown. The first electronic activity 602a includes or is associated with a first electronic activity identifier 606a ("EA-001"). The second electronic activity 602b includes or is associated with a second electronic activity identifier 606b ("EA-002"). The data processing system 100 can assign the first electronic activity identifier 606a to the first electronic activity 602a and the second electronic activity identifier 606b to the second electronic activity 602b. In some embodiments, the data processing system 100 can assign the first and the second electronic activities unique electronic activity identifiers to allow the data processing system 100 to uniquely identify each electronic activity processed by the data processing system 100.

Collectively, the first and second electronic activities can be referred to herein as electronic activities 602 or individually as electronic activity 602. Each electronic activity can include corresponding metadata, as described above, a body 608a and 608b, and a respective signature 610a and 610b. The signatures 610a and/or 610b may be included in the body 608 of the respective electronic activity 602.

The second electronic activity 602b can be sent as a response to the first electronic activity 602a. The data processing system 100 can determine that the second electronic activity 602b is a response to the first electronic activity 602a using one or more response detection techniques based on, for example, signals included in the electronic activity 602 including the metadata of the electronic activity, the subject line of the electronic activity, the participants of the electronic activity 602, and the body of the electronic activity 602. For instance, the data processing system 100 can determine that the second electronic activity 602b has a timestamp after the first electronic activity 602a. The data processing system 100 can determine that the second electronic activity 602b identifies the sender of the first electronic activity 602a as a recipient of the second electronic activity 602b. The data processing system 100 can determine that the second electronic activity 602b includes a subject line that matches one or more words of the subject line of the first electronic activity 602a. In some embodiments, the data processing system 100 can determine that the second electronic activity 602b includes a subject line that includes a string of characters of the subject line of the first electronic activity 602a and the string of characters is preceded by "RE:" or some other predetermined set of characters indicating that the second electronic activity 602b is a reply. In some embodiments, the data processing system 100 can determine that the body of the second electronic activity 602b includes the body of the first electronic activity 602a. The data processing system 100 can also determine that the second electronic activity 602b is a response to the first electronic activity 602a based on the participants included in both the electronic activities 602a, 602b. Furthermore, in some embodiments, the data processing system 100 can determine if the second electronic activity 602b is a forward of the first electronic activity 602a or a reply all of the first electronic activity 602a.

FIG. 6 also includes representations of two node profiles 604a, 604b associated with the first node N1 and the second node N2 at two different times, T=T$_1$ and T=T$_2$. The node profile 604a corresponds to the first node N1, who is the sender of the first electronic activity 602a and recipient of the second electronic activity 602b. Similarly, the node profile 604b corresponds to the second node N2, who is the recipient of the first electronic activity 602a and the sender of the second electronic activity 602b. The node profile manager 320 may update the node profiles 604a, 604b at a first time instance (e.g., node profile 604a1, node profile 604b1) following ingestion of the first electronic activity 602a. Similarly, the node profile manager 320 may update the node profiles 604a, 604b at a second time instance (node profile 604a2, node profile 604b2) after the first and second electronic activities 602a and 602b were ingested by the data processing system 100.

In some embodiments, as described herein, the node profile manager 320 of the data processing system 100 can maintain, for each value of each field of each node profile, a value data structure that can be stored as a multidimensional array. The multidimensional array can include a list of entries identifying data points that identify electronic activities or systems of record that contribute to the value of the field. Each data point can be associated with a source. For emails or other electronic activities, the source can be a mail server of a data source provider. For record objects, the source of the record object can be a system of record of the data source provider. Each source of a respective data point can have an associated trust score that can be used to determine how much weight to assign to the data point from that source. Each data point can also identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. The source of the data point and the time the data point was generated, last accessed, updated or modified, can be used to determine a contribution score of the data point, which can be used to determine the confidence score of the value. In some embodiments, the node profile manager 320 can generate, compute or assign a contribution score to each data point. The contribution score can be indicative of the data point's contribution towards the confidence score of the value. The contribution score of a data point can decay over time as the data point becomes staler. The contribution scores of each of the data points derived from electronic activities and systems of record can be used to compute the confidence score of the value of a field of the node profile.

Each of the node profiles 604 can include fields and corresponding values. For example, in the first node profile 604a, the field "First Name" is associated with the value "JOHN" and "JONATHAN," since the node ended the body 608a as "JOHN" but includes "JONATHAN" in the signature block 610. The first node profile 604a also includes the field "Title" which is associated with the value "Director." As shown in FIG. 6, the values of the first and last name and cell phone number remain the same at both time instances T$_1$ and T$_2$ for the node profile 604a (e.g., node profile 604a1 and 604a2 are the same).

On the other hand, and in another example, in the second node profile 604b, the field "First Name" is associated with the value Abigail. The second node profile 604b does not include the field "Title" as that information may not have been available to the data processing system 100. It should be appreciated that in the event the value was already associated with the field, the data processing system 100 can update the value data structure of the value by adding an entry identifying the electronic activity. In this way, the electronic activity serves as a data point that supports the value and can increase the confidence score of the value, which can further improve the accuracy of the information included in the node profile. At the second time instance T$_2$, the second node profile 604b2 was updated after the first and second electronic activities 602a and 602b were ingested. For example, the field "First Name" is associated with the value "ABAGAIL" based on the first electronic activity 602a and now includes "ABBY," since the node ended the body 608a as "ABBY." Additionally, the field "Title" is now associated with the value "Manager." The values of the "Work Phone No" and "Cell Phone No" fields have new values associated with them.

The value data structure of the value J@acme.com corresponding to the email field of the first node profile can be updated to include an entry identifying the second electronic activity 602b. The data processing system 100 can be configured to update the field-value pair of the first node profile 604a corresponding to email: J@acme.com, even though J@acme.com is a value previously associated with the email field of the first node profile 604a. The data processing system 100 can use the second electronic activity 602b to update the node profile 604a by not only adding new values, but also by updating the value data structures of existing values of the first node profile 604a to include entries identifying the second electronic activity 602b. By doing so, the data processing system 100 can continuously maintain the accuracy of the data included in the node profiles 604 and identify which values are still current and which values are now stale based on the last time a data point supported the particular value. As described herein, the data processing system 100 can be configured to generate respective contribution scores to each entry included in the value data structure of a value and use the respective contribution scores of each entry of the value data structure to determine a confidence score of the value of the field of the node profile. The data processing system 100 can further be configured to dynamically update the contribution scores and the confidence score based on a current time as the contribution scores of data points can change with time. In some embodiments, the contribution scores of data points can decrease with time as the data point becomes older.

L. Node Profile Inferences

Certain information about a node can be inferred by the data processing system 100 based on information included in electronic activities ingested by the data processing system 100. For instance, the node profile manager 320 or the tagging engine 312 can infer if a person has left a job or switched jobs if the occurrence counter for a first value stops increasing or the frequency at which the occurrences of the first value appear has been reduced and the occurrence counter for a second value is increasing or the occurrences are more recent or are received from a source that has a higher trust score indicating that the person has changed email addresses, which can indicate that the person has switched jobs. In certain embodiments, the data processing system 100 can determine if the second value corresponds to an email address corresponding to another employer or another company. In some embodiments, the data processing system 100 can determine if the domain name of the email address corresponds to a list of known domain names corresponding to personal, non-work email addresses (for instance, gmail.com, outlook.com), among others. In some embodiments, the data processing system 100 can determine if the domain name is associated with a predetermined minimum number of accounts with the same domain name. The node profile manager 320 can look at relevancy of Source, recency of time and Occurrences to determine whether to update the email field from the first email (Email_A) to the second email (Email_B).

In some embodiments, the field value confidence scorer 310 described herein can provide mechanisms to confirm validity of data using multiple data sources. For instance, each electronic activity can be a source of data. As more electronic activities are ingested and increase the occurrence of a value of a data field, the system can confirm the validity of the value of the field based on the number of occurrences. As such, the system described herein can compute a validity score of a value of a field of a node profile based on multiple data sources. For instance, the system can determine how many data sources indicate that the job title of the person is VP of Sales and can use the health score of those sources to compute a validity score or confidence score of that particular value. In addition, the timestamp associated with each electronic activity can be used to determine the validity score or confidence score of that particular value. More recent electronic activities may be given greater weight and therefore may influence the validity score of the particular value more than electronic activity that is much older.

The electronic activity that is generated and ingested in real-time or near real-time can be assigned a greater weight as the electronic activity has no bias, whereas data input manually into a system of record may have some human bias. In certain embodiments in which data is imported from systems of records, the weight the data has on a confidence score of the value is based on a trust score of the system of record from which the data is imported.

In some embodiments, the field value confidence scorer 310 can determine a confidence score of a data point based on the data sources at any given time. A data point can be a value of a field. For example, "VP, product" can be a value for a job title of a node profile. The field value confidence scorer 310 can utilize the electronic activities ingested in the system to determine how many electronic activities have confirmed that the value for the job title is VP of Product for that node in the email signatures present in those electronic activities. In some embodiments, the field value confidence scorer 310 can take into account a recency of the activity data and the source type or a health score of the source type to determine the confidence score of the value of the field. In some embodiments, the node profile manager 320 can determine a current value of a field based on the value of the field having the highest confidence score.

M. Node Connections

The node pairing engine 322 can be any script, file, program, application, set of instructions, or computer-executable code that is configured to enable a computing device on which the node pairing engine 322 is executed to perform one or more functions of the node pairing engine 322 described herein. The node pairing engine 322 can compute a connection strength between nodes based on one or more electronic activities associated with both of the nodes. More of the recent electronic activity between the two nodes will indicate a greater connection strength. Moreover, with different tags assigned to those electronic activities, the node pairing engine 322 can further determine the relationship between the two nodes and the context in which the two nodes are connected. For instance, two nodes may be connected through their work on one or more opportunities or one node may report to the second node, among others. The context behind the relationships can be derived from the electronic activity associated with the two nodes as well as other electronic activity associated with each node independent of the other node. In certain embodiments, the node pairing engine 322 can use metadata from the electronic activities to infer connection strength or relationships. For instance, the node pairing engine 322 can compute an average time a node takes to respond to another node and use the average time to respond to determine a connection strength. In some embodiments, the average time to respond is inversely proportional to the strength of the connection. Furthermore, the node pairing engine 322 can look at other information relating to the electronic activities to infer connection strengths. If a node responds to another node outside of business hours can be an indicator of connection strength or connection relationships.

The node pairing engine 322 can determine a connection strength between nodes at a given point in time across a timeline. As the nodes exchange further electronic activity, the connection strength can increase. The system is configured to determine the connection strength at a particular time period by filtering the electronic activities based on their respective times. In certain embodiments, the node pairing engine 322 can recalculate a connection strength between nodes responsive to a trigger. In some embodiments, the trigger can be based on a confidence score falling below a predetermined threshold indicating that the confidence in a particular value is unstable or unusable. For instance, the trigger can be satisfied or actuated when the node pairing engine 322 determines that the confidence score of a particular value of a field, such as a current employer of a person is below a predetermined confidence score (indicating that the person may no longer be at a particular company). In certain embodiments, certain changes to values in fields can trigger recalculating a connection strength irrespective of activity volume, for instance, when a new value under the employer field is added in the node.

In some embodiments, the node pairing engine 322 can determine a connection strength between two nodes by identifying each of the electronic activities that associate the nodes to one another. In contrast to other systems that may rely on whether a node has previously connected with another node, the node pairing engine 322 can determine a connection strength at various time periods based on electronic activities that occur before that time period. In particular, the node pairing engine 322 can determine staleness between nodes and take the staleness to determine a current connection strength between nodes. As such, the node pairing engine 322 can determine a temporally changing connection strength. For instance, the node pairing engine 322 can determine how many interactions recently between the two nodes. The node pairing engine 322 can determine whether the connection between the two nodes is cold or warm based on a length of time since the two nodes were involved in an electronic activity or an amount of electronic activity between two nodes. For instance, the node pairing engine 322 can determine that the connection strength between two nodes is cold if the two nodes have not interacted for a predetermined amount of time, for instance a year. In some embodiments, the predetermined amount of time can vary based on previous electronic activity or past relationships by determining additional information from their respective node profiles. For instance, former colleagues at a company may not have a cold connection strength even if they do not communicate for more than a year.

N. Node Resolution

The node resolution engine 324 can be any script, file, program, application, set of instructions, or computer-executable code that is configured to enable a computing device on which the node resolution engine 324 is executed to perform one or more functions of the node resolution engine 324 described herein.

The node resolution engine 324 is configured to resolve nodes to which electronic activities are to be linked or otherwise associated. The node resolution engine 324 can use the parsed information from the electronic activity to identify values included in node profiles to determine a match score between the electronic activity and a given node profile. The node resolution engine 324 can match the electronic activity to one or more node profiles based on a match score between the electronic activity and each of the node profiles exceeding a certain threshold. Different fields are assigned different weights based on the uniqueness of each value. In some embodiments, the uniqueness of each value can be determining how many node profiles include the same value for the given field relative to the total number of node profiles.

In some embodiments, the node resolution engine 324 may match the electronic activity to the nodes between which the electronic activity occurred. The node resolution engine 324 or the node pairing engine can establish an edge between the two nodes corresponding to the electronic activity.

In some embodiments, the node resolution engine 324 may not be able to determine if the electronic activity matches any of the existing node profiles maintained by the node profile manager 320.

In some embodiments, the node resolution engine 324 can perform identity resolution or deduplication based on one or more unique identifiers associated with a node profile. For instance, if one system of record provides a first email address, uniquename@example1.com and another system of record provides a second email address, uniquename@example2.com, while there is not a direct match, the node resolution engine 324 can resolve the two identifiers if there is a statistically significant number of matching or near matching fields, tags, or other statistical resemblances.

Figure 3E:
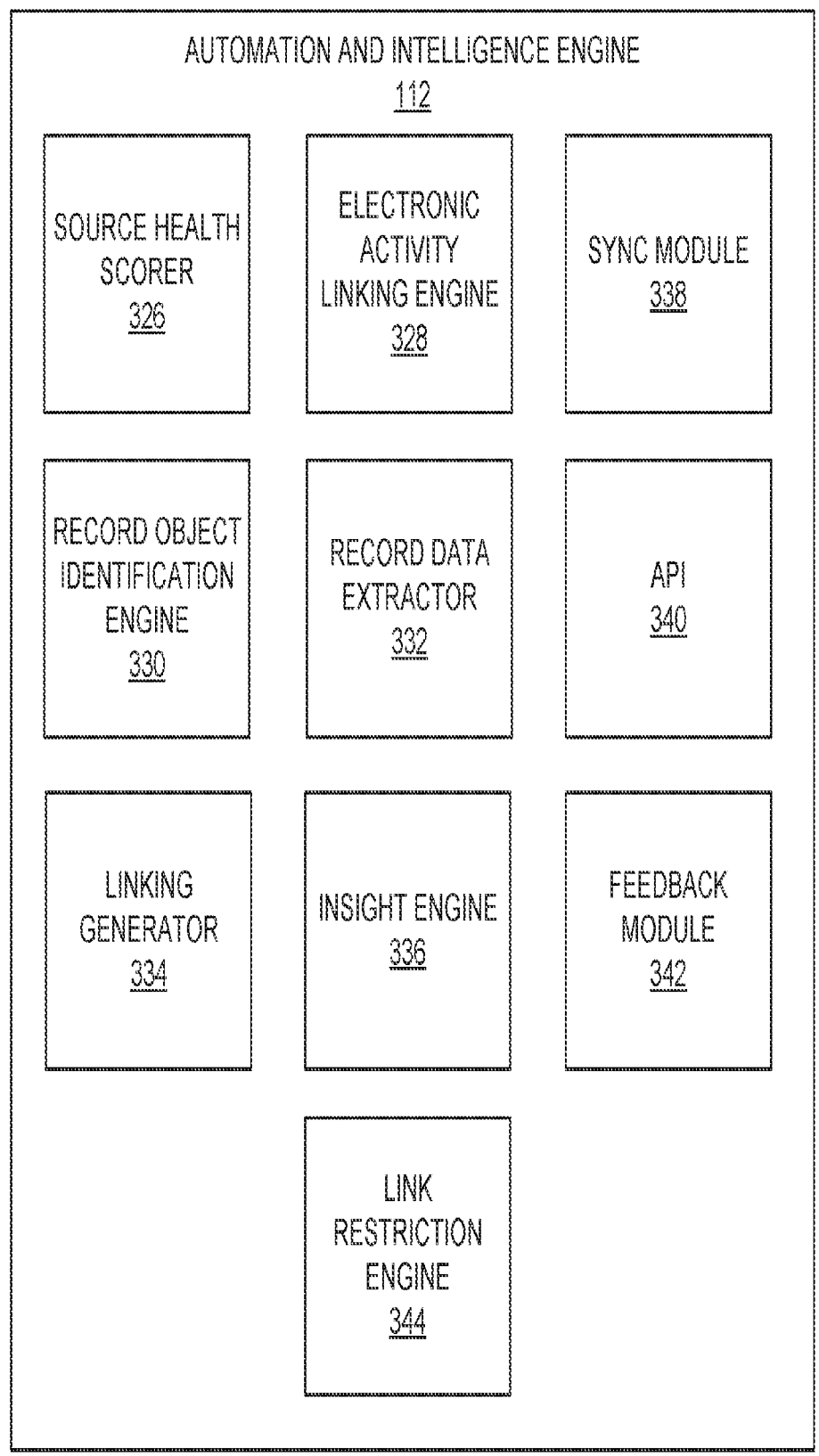

Referring now to FIG. 3E, FIG. 3E illustrates a detailed block diagram of the automation and intelligence engine 112. The automation and intelligence engine 112 may include a source health scorer 326, an electronic activity linking engine 328, a record object identification engine 330, record data extractor 332, a linking generator 334, and an insight engine 336, and a link restriction engine 344. The automation and intelligence engine 112 can further include a sync module 338, an API 340, and a feedback module 342. In some embodiments, the automation and intelligence engine 112 can further include or be communicably coupled to the record object manager 306. The automation and intelligence engine 112 and each of the components of the automation and intelligence engine 112 can be any script, file, program, application, set of instructions, or computer-executable code. The insight engine 336 can be any script, file, program, application, set of instructions, or computer-executable code that is configured to determine insights for a company. For instance, the data processing system 100 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others.

O. Source Health Scores Including Field-Specific Health Scores, Overall Health Scores and Determining Trust Scores Based on Health Scores The source health scorer 326 can be any script, file, program, application, set of instructions, or computer-executable code that is configured to enable a computing device on which the source health scorer 326 is executed to perform one or more functions of the source health scorer 326 described herein. The source health scorer 326 is configured to access a system of record and retrieve data stored in the system of record. The source health scorer 326 can then identify each record object stored in the system of record and determine, for each record object, a number of missing values of fields. The source health scorer 326 can then generate a field-specific score for each field indicating a health or quality of each field of the system of record. The source health scorer 326 can further determine an overall health score for the source based on the field-specific scores of each field. In some such embodiments, the overall health score is based on missing field values.

The source health scorer 326 can further be configured to determine if the values of fields of record objects are accurate by comparing the values to node profiles maintained by the node profile manager 320 or to record objects maintained by the record object manager 306. Based on the number of values that are inconsistent with the values maintained by data processing system 100, the source health scorer 326 can generate a health score for the system of record.

The source health scorer 326 can similarly generate a health score for each system of record. The source health scorer 326 can then compare the health score of a given system of record to the aggregate health scores of a plurality of systems of record to determine a relative trust score of the system of record. In some embodiments, the source health scorer 326 can assign different weights or scores to different types of systems of record. The source health scorer 326 may assign lower health scores to data included in a system of record that is generated using manual entry relative to node profiles that are automatically populated or generated by the data processing system 100 based on electronic activities.

Further, different types of sources can include emails, or email signatures within an email, one or more systems of record, among many other source types. The trust score of a source can be determined based on the health score of the source, at least in the case of a system of record. In some embodiments, the trust score assigned to electronic activity such as an email can be greater than a trust score assigned to a data point derived from a system of record as the system of record can be manually updated and changed. Additional details regarding the health score of a system of record are described below.

In some embodiments, the health score of a system of record maintained by a data source provider can be determined by comparing the record objects of the system of record with data that the system has identified as being true. For instance, the data processing system 100 can identify, based on confidence scores of values (as described below) of fields, that certain values of fields are true. For instance, the system may determine that a value is true or correct if multiple data points provide support for the same value. In some embodiments, the multiple data points may for example, be at least 5 data points, at least 10 data points, or more. The data processing system 100 can then, for a value of a field of a record object of the system of record, compare the value of the system of record to the value known to the system to be true. The system can repeat this for each field of a record object to determine if any values of a record object are different from the values the system knows to be true. In some embodiments, when determining the health score, the system may only compare those values of fields of record objects of the system of record that the system has a corresponding value that the system knows is true. For instance, the system may know that a phone number of a person "John Smith" is 617-555-3131 and may identify such a number as true based on multiple data points. However, the system may not know an address of the person John Smith. In such an instance, the system may only compare the phone number of the record object corresponding to John Smith to determine the health score of the system of record but not compare the address of the person John Smith as the system does not know the address of John Smith. Furthermore, even if the node profile of John Smith had an address but the confidence score of the address was below a predetermined threshold, the system would not compare the address from the system of record to the address of the node profile since the system does not have enough confidence or certainty that the address is true. As such, the system can be configured to determine the health score of a system of record by comparing certain values of record objects of the system of record to values the system knows as true or above a predetermined confidence score. In this way, in some embodiments, the health score of the system of record is based on an accuracy of the data included in the system of record rather than how complete the system of record is not.

The health score of a system of record can be an overall health score that can be based on aggregating individual field-specific health scores of the system of record. It should be appreciated that the data processing system 100 can assign different weights to each of the field-specific health scores based on a volume of data corresponding to the respective field, a number of values that does not match values the data processing system 100 knows to be true, among others.

The data processing system 100 can compute trust scores for data points based on the health score of a system of record. In some embodiments, the data processing system 100 can compute the trust score based on the overall health score of the system of record that is the source of the data point. However, in some embodiments, it may be desirable to configure the data processing system 100 to provide more granularity when assigning a trust score to a system of record that is the source of the data point. For instance, a company may meticulously maintain phone numbers of record objects but may not be so meticulous in maintaining job titles of record objects such that the field-specific health score for the phone number field of the system of record is much better than the field-specific health score for the job title field and also better than the overall health score of the system of record determined based on the aggregate of the respective field-specific health scores of fields of the system of record. In some embodiments, as will be described herein, if a data point supporting a phone number of a node profile is provided by the system of record, the data processing system 100 may be configured to determine a trust score for the data point based on the field-specific health score of the field "phone number" for the system of record rather than the overall health score of the system of record, which is lower because the field-specific health score of the field "job title" of the system of record is much lower than the field-specific health score of the field "phone number." By determining trust scores based on the field-specific health scores of systems of record, the data processing system 100 may be able to more accurately rely on the data point and provide a more accurate contribution score of the data point as will be described herein.

P. Linking Electronic Activity to Systems of Record Data

Enterprises and other companies spend significant amount of resources to maintain and update one or more systems of records. Examples of systems of records can include customer relationship management (CRM) systems, enterprise resource planning (ERP) systems, document management systems, applicant tracking systems, among others. Typically, these systems of records are manually updated, which can result in multiple issues. First, the information that is updated into the systems of records can be incorrect either due to human error or in some cases, malicious intent. Second, the information may not be updated in a timely manner. Third, employees may not be motivated enough to even update the systems of records, resulting in systems of records that include outdated, incorrect, or incomplete information. To the extent that enterprises rely on the data included in their systems of records to make projections or predictions, such projections and predictions may also be inaccurate as the data relied upon is also inaccurate. The present disclosure aims to address these challenges that enterprises face with their existing systems of records. In particular, the present disclosure describes systems and methods for linking electronic activities to record objects included in one or more systems of record. Electronic activities, such as electronic mail, phone calls, calendar events, among others, can be used to populate, update, and maintain states of record objects of systems of record. As electronic activities are exchanged between users, these electronic activities can be parsed to not only update a node graph as described above, but further update shadow record objects for one or more systems of records of enterprises that have provided access to such systems of record to the data processing system 100. As described herein, the shadow record objects can be synced with the record objects of the one or more systems of records of the enterprises. In some embodiments, the electronic activities can be used to directly update the one or more systems of records of the enterprises without first updating a shadow record object. As described herein, and also referring to FIG. 3E, the updating of record objects with electronic activity can refer to updating record objects within systems of record 118 and/or shadow record objects within the shadow systems of record 218. By way of the present disclosure, the data processing system 100 can use the electronic activities to populate, maintain, and update states of record objects of systems of record 118 and/or shadow systems of record 218.

The data processing system 100 can include the electronic activity linking engine 328, which is configured to link electronic activities to record objects of one or more systems of record. By linking the electronic activities to such record objects, the electronic activity linking engine 328 can be configured to update states of one or more record objects based on the electronic activities. The electronic activity linking engine 328 can be any script, file, program, application, set of instructions, or computer-executable code, that is configured to enable a computing device on which the electronic activity linking engine 328 is executed to perform one or more functions of the electronic activity linking engine 328 described herein.

Linking electronic activities to record objects can also be referred to as matching or mapping the electronic activities to record objects. Linking the electronic activities to the record objects can provide context to the electronic activities. The linked electronic activities can be stored in association with one or more record objects to which the electronic activity is linked in a system of record. Linking an electronic activity to a record object can provide context to the electronic activity by indicating what happened in the electronic activity or record object, who was involved in the electronic activity or record object, and to what contact, node, person or business process, the electronic activity or record object should be assigned. Linking the electronic activity to the record object can indirectly provide context as to why the electronic activity occurred. In some embodiments, linking an electronic activity to or with a record object of a system of record can include storing, in one or more data structures, an association between the electronic activity and the record object.

Although the description provided herein may refer to record objects and business processes corresponding to customer relationship management systems, it should be appreciated that the present disclosure is not intended to be limited to such systems of records but can apply to many types of systems of record including but not limited to enterprise resource planning systems, document management systems, applicant tracking systems, among others. For the sake of clarity, the electronic activities can be matched to record objects directly without having to link the electronic activities to node profiles. In some embodiments, the electronic activities can be matched to node profiles and those links can be used to match some of the electronic activities to record objects.

The electronic activity linking engine 328 can use metadata to identify a data source provider associated with an ingested electronic activity and identify a corresponding system of record. The electronic activity linking engine 328 can match the electronic activity to a record object of the corresponding system of record. The electronic activity linking engine 328 can include, or otherwise use, a tagging engine, such as the tagging engine 312 described above, to determine and apply tags to the ingested electronic activities. The electronic activity linking engine 328 can include the feature extraction engine 314 to extract features from the electronic activities that can be used to link electronic activities with one or more record objects of systems of records. In some embodiments, some of the features can include values corresponding to values stored in one or more node profiles maintained by the data processing system 100. The features, however, can include other information that may be used in conjunction with information also included in node profiles to link the electronic activity to one or more record objects included in one or more systems of record.

The electronic activity linking engine 328 can include the record object identification engine 330 to identify which record object or objects within a system of record to match a given electronic activity. In some embodiments, the electronic activity linking engine 328 can include the policy engine 346. The policy engine 346 can maintain policies that include strategies for matching the electronic activities to the record objects. The electronic activity linking engine 328 can include a link restriction engine 344 that can apply one or more policies from the policy engine 346 when linking electronic activities to record objects. The link restriction engine 344 can limit which record objects can be linked with each other. The electronic activity linking engine 328 can link the electronic activity to the record object identified by the record object identification engine 330. The record object identification engine 330 can determine or select one or more record objects to which an electronic activity should be linked or matched.

Figure 7:
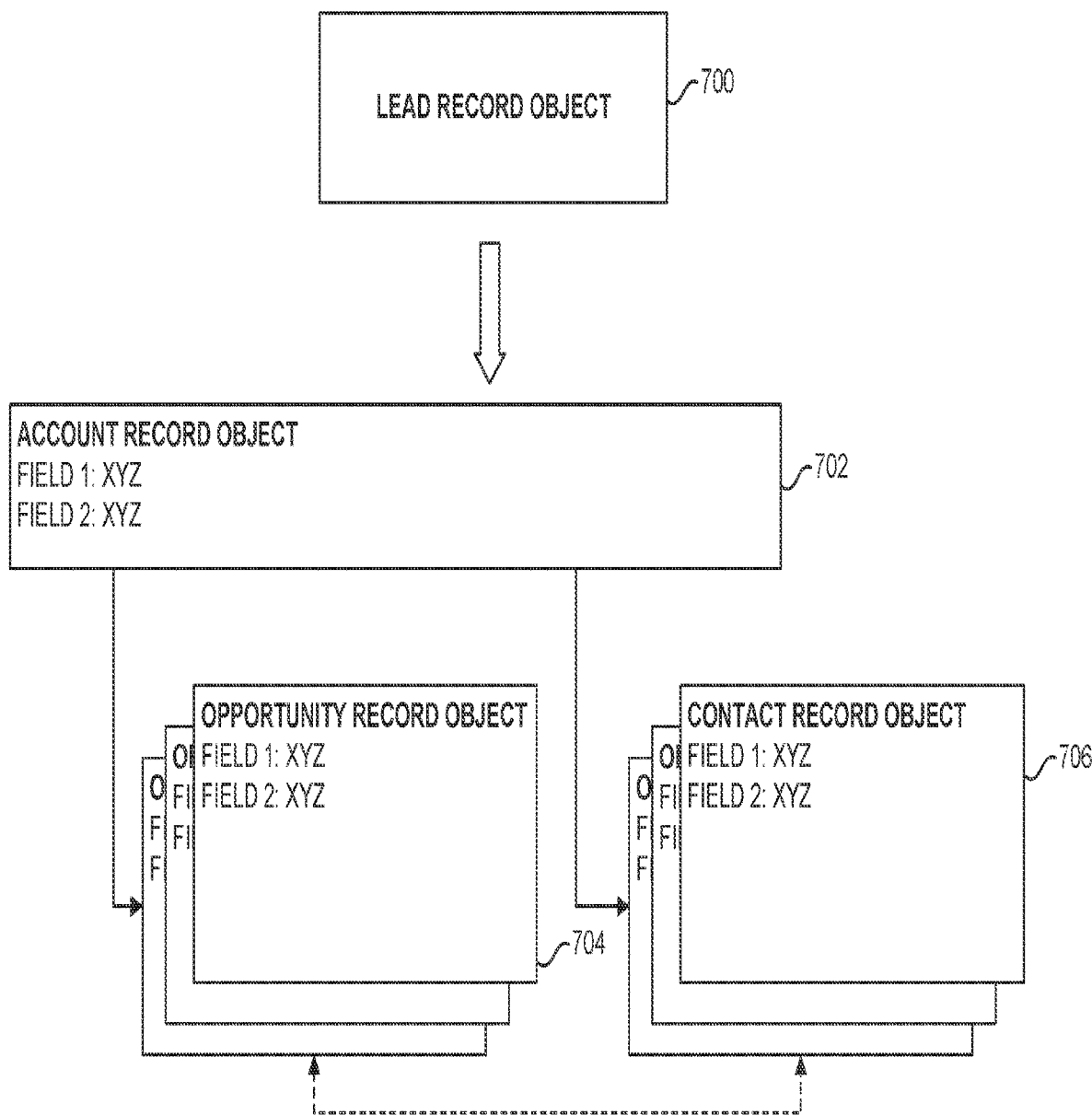
FIG. 7 illustrates a plurality of example record objects, and their interconnections according to embodiments of the present disclosure.

Referring further FIG. 3E and also to FIG. 7, the data processing system 100 can operate various record objects, such as the record objects illustrated in FIG. 7, and their interconnections. The record objects shown in FIG. 7 can be record objects or data records of a system of record, such as a customer relationship management (CRM) system. It should be appreciated that other types of systems of records and record objects may exist and can be integrated with the data processing system 100. For instance, other systems of records can include Applicant Tracking Systems (ATS), such as Lever, located in San Francisco, CA or Talend by Talend Inc., located in Redwood City, CA, enterprise resource planning (ERP) systems, customer success systems, such as Gainsight located in Redwood City, CA, Document Management Systems, among others.

The systems of record can be one or more of shadow systems of record of the data processing system 100 or the systems of record of the data source providers. Additional details relating to the shadow systems of record of the data processing system 100 are provided below. As illustrated in FIG. 7, the record objects can include a lead record object 700, an account record object 702, an opportunity record object 704, or a contact record object 706. Each of the different types of record objects can generally be referred to as record objects.

Each record object can be a data structure or data file into which data is stored or associated. The lead record object 700 can be a low quality object that includes unqualified contact information typically received through a web inquiry. A lead record object can correspond to one or more stages. Upon reaching a final "Converted" stage, a lead record object can be converted in a one-to-many relationship into a Contact record object (person), an Account record object (company, if new, or added to existing account) and an Opportunity record object (if there is an opportunity for a deal here or added as contact role into existing opportunity).

For example, the lead record object 700 can include the contact information for a lead or prospective buyer. The lead record object 700 can include fields, such as, Address, City, Company, CompanyDunsNumber, Description, Email, Industry, NumberOfEmployees, Phone, job title, and Website, among others.

The account record object 702 can be a data structure that includes fields associated with an account that is held with the data source provider. The fields can include AccountNumber, BillingAddress, Description, Industry, Fax, DunsNumber, LastActivityDate, MasterRecordId, Name, NumberOfEmployees, Ownership, Website, YearStarted, and IsPersonAccount, among others. A system of record can include an account record object 702 for each of the data provider's customers. The system of record can include multiple account record objects 702 for a given customer. For example, the system of record can include an account record object 702 for each division of a given customer. The account record object 702 can be stored with one or more opportunity record objects 704.

In some embodiments, the CRM can include partner record objects, which can also be referred to as partner account record objects. A partner account record object can be similar to an account record object. The partner account record object can include an additional field to designate the record object as a partner account record object rather than a standard account record object. The partner account record object can be an account record object that is associated with a partner to the data source provider. For example, the partner account record object can be an account record object for a distributor of the data source provider that distributes goods to the company of the account record object.

The opportunity record objects 704 can be data structures that include a plurality of fields for a given opportunity. The opportunity can indicate a possible or planned deal with a customer for which an account record object is already stored in the system of record. The opportunity record objects 704 can include fields such as AccountId, Amount, CampaignId, CloseDate, Description, ExpectedRevenue, Fiscal, HasOpenActivity, IsClosed, IsWon, LastActivityDate, Name, OwnerId, StageName, Territory2Id, and Type, among others. One or more contact record objects 706 can be associated with the account record object 702. The contact record objects 706 can be data structures that include fields associated with a contact. The contact record object 706 can include fields such as FirstName, LastName, AccountId, Department, Email, Fax, WorkPhone, HomePhone, MobilePhone. StreetAddress, City, State, Country, DoNotCall, and HasOptedOutOfEmail, among others.

One or more contact record objects 706 can be associated with an opportunity record object 704 via an Opportunity Contact Role (OCR). For example, a lead to sell a service to a potential customer can convert into an opportunity record object 704 when the customer begins the negotiation process to purchase the service. A contact record object 706 can be generated for each of the customer's employees involved in the purchase. Each of the contact record objects 706 can be associated with the opportunity record object 704 for the sale via Opportunity Contact Roles, which contain their own metadata about involvement of specific individuals in the opportunity, such as their Role in this particular opportunity or whether they are the Primary Contact of the Account in this Opportunity.

In some embodiments, a lead record object 700 can be converted into an account record object 702, an opportunity record object 704, and/or a contact record object 706. For example, a lead record object 700 can be converted into a new contact record object 706, account record object 702, and/or opportunity record object 704 after a predetermined number and nature of electronic activities are associated with the lead record object 700. Continuing this example, the lead record object 700 can be generated based on a web inquiry from an interested party (lead) or via a cold email being sent to a potential new customer. If the customer responds and passes qualification criteria, the lead record object 700 can be converted into a new contact record object 706, account record object 702, and opportunity record object 704. In some embodiments, the lead record object 700 can be converted into a, for example, contact record object 706 that can get attached to or linked with an existing account record object 702 and an existing opportunity record via an Opportunity Contact Role.

The fields of each of the different record object types can include hierarchical data or the fields can be linked together in a hierarchical fashion. The hierarchical linking of the fields can be based on the explicit or implicit linking of record objects. For example, a contact record object can include a "Reports To" field into which an identifier of the contact can be stored. The "Reports To" field can indicate an explicit link in a hierarchy between two contact record objects (e.g., the first contact record object to the contact record object of the person identified by the "Reports To" field). In another example, the linking of the record objects can be implicit and learned by the electronic activity linking engine 328. For example, the electronic activity linking engine 328 can learn if multiple customers have the same value for a "Parent Account" field across multiple system of record sources with high trust score and derive a statistically significant probability that a specific account belongs to (e.g., is beneath the record object in the given hierarchy) another account record object.

The record object identification engine 330 can include one or more matching models (not shown). A matching model can be trained or programmed to aid in matching electronic activities to record objects to allow the electronic activity linking engine 328 to link the electronic activities to the matched record objects. For example, the record object identification engine 330 can include or use one or more matching models to assist, aid or allow the electronic activity linking engine 328 to match electronic activities to record objects. In some embodiments, each of the one or more matching models can be specific to a particular data source provider, electronic activity type, or record object type. In some embodiments, the record object identification engine 330 can include a single matching model that the record object identification engine 330 can use to match electronic activities ingested by the data processing system 100 to any number of a plurality of record objects of a plurality of systems of records. In some embodiments, the matching models can be data structures that include rules or heuristics for linking electronic activities with record objects. The matching models can include matching rules (which can be referred to as matching strategies) and can include restricting rules (which can be referred to as restricting strategies or pruning strategies). The record object identification engine 330 can use the matching strategies to select candidate record objects to which the electronic activity could be linked and use the restricting strategies to refine, discard, or select from the candidate record objects. In some embodiments, the matching models can include a data structure that includes the coefficients for a machine learning model for use in linking electronic activities with record objects.

In some embodiments, the matching model used to link electronic activities to one or more record objects can be trained using machine learning or include a plurality of heuristics. For example, as described above the feature extraction engine 314 can generate a feature vector for each electronic activity. The matching model can use neural networks, nearest neighbor classification, or other modeling approaches to classify the electronic activity based on the feature vector. In some embodiments, the record object identification engine 330 can use a subset of an electronic activity's features to match the electronic activity to a record object.

In some embodiments, the record object identification engine 330 can use matching models trained with machine learning to match, for example, the electronic activity to a record object based on a similarity of the text in and the sender of the electronic activity with the text in and sender of an electronic activity previously matched to a given electronic activity. In some embodiments, the matching model can be updated as electronic activities are matched to record objects. For example, a matching model can include one or more rules to use when matching an electronic activity to a record object. If a user matches an electronic activity to a record object other than the record object to which the electronic activity linking engine 328 matched the electronic activity, record object identification engine 330 can update the matching model to alter or remove the rule that led to the incorrect matching.

In some embodiments, once an electronic activity is matched with a record object, a user can accept or reject the linking. Additionally, the user can change or remap the linking between the electronic activity and the record object. In some embodiments, the matching model can include a plurality of heuristics with which the record object identification engine 330 can use to link an electronic activity to one or more record objects. The heuristics can include a plurality of matching algorithms that are encapsulated into matching strategies. The record object identification engine 330 can apply one or more matching strategies from the matching models to the electronic activity to select which record object (or record objects) to link with the electronic activity. In some embodiments, the record object identification engine 330 can use the matching strategies to select candidate record objects to which the electronic activity can be linked. The record object identification engine 330 can use a second set of strategies (e.g., restricting strategies) to prune the candidate record objects and select to which of the candidate record objects the electronic activity should be linked.

The application of each strategy to an electronic activity can result in the selection of one or more record objects (e.g., candidate record objects). The selection of which matching strategies to apply to an electronic activity can be performed by the policy engine 346. The policy engine 346 is described further below, but briefly, the policy engine 346 can generate, manage or provide a matching policy for each of the data source providers 122. The policy engine 346 can generate the matching policy automatically. The policy engine 346 can generate the matching policy with input or feedback from the data source provider 122 to which the matching policy is associated. For example, the data source provider (for example, an administrator at the data source provider) can provide feedback when an electronic activity is incorrectly linked and the matching policy can be updated based on the feedback.

A given matching policy can include a plurality of matching strategies and the order in which the matching strategies should be applied to identify one or more record objects to which to link the electronic activity. The record object identification engine 330 can apply one or more of the plurality of matching strategies from the matching models, in a predetermined order specified or determined via the matching policy, to identify one or more candidate record objects. The record object identification engine 330 can also determine, for each matching strategy used to identify a candidate record object, a respective weight that the record object identification engine 330 should use to determine whether or not the candidate record object is a good match to the electronic activity. The record object identification engine 330 can be configured to compute a matching score for each candidate record object based on the plurality of respective weights corresponding to the matching strategies that were used to identify the candidate record object. The matching score can indicate how closely a record object matches the electronic activity based on the one or more matching strategies used by the record object identification engine 330.

One or more of the matching strategies can be used to identify one or more candidate record objects to which the electronic activity linking engine 328 can match a given electronic activity based on one or more features (e.g., an email address) extracted from the electronic activity or tags assigned to the electronic activity. In some embodiments, the features can be tags assigned by the tagging engine 312. In some embodiments, the electronic activity can be matched to a node profile that is already matched to a record object, thereby allowing the record object identification engine 330 to match the electronic activity to a record object previously matched or linked to a node profile with which the electronic activity may be linked. In addition, the matching strategies can be designed or created to identify candidate record objects using other types of data included in the data processing system, or one or more systems of record, among others. In some embodiments, the matching strategies can be generated by analyzing how one or more electronic activities are matched to one or more record objects, including using machine learning techniques to generate matching strategies in a supervised or unsupervised learning environments.

Figure 8:
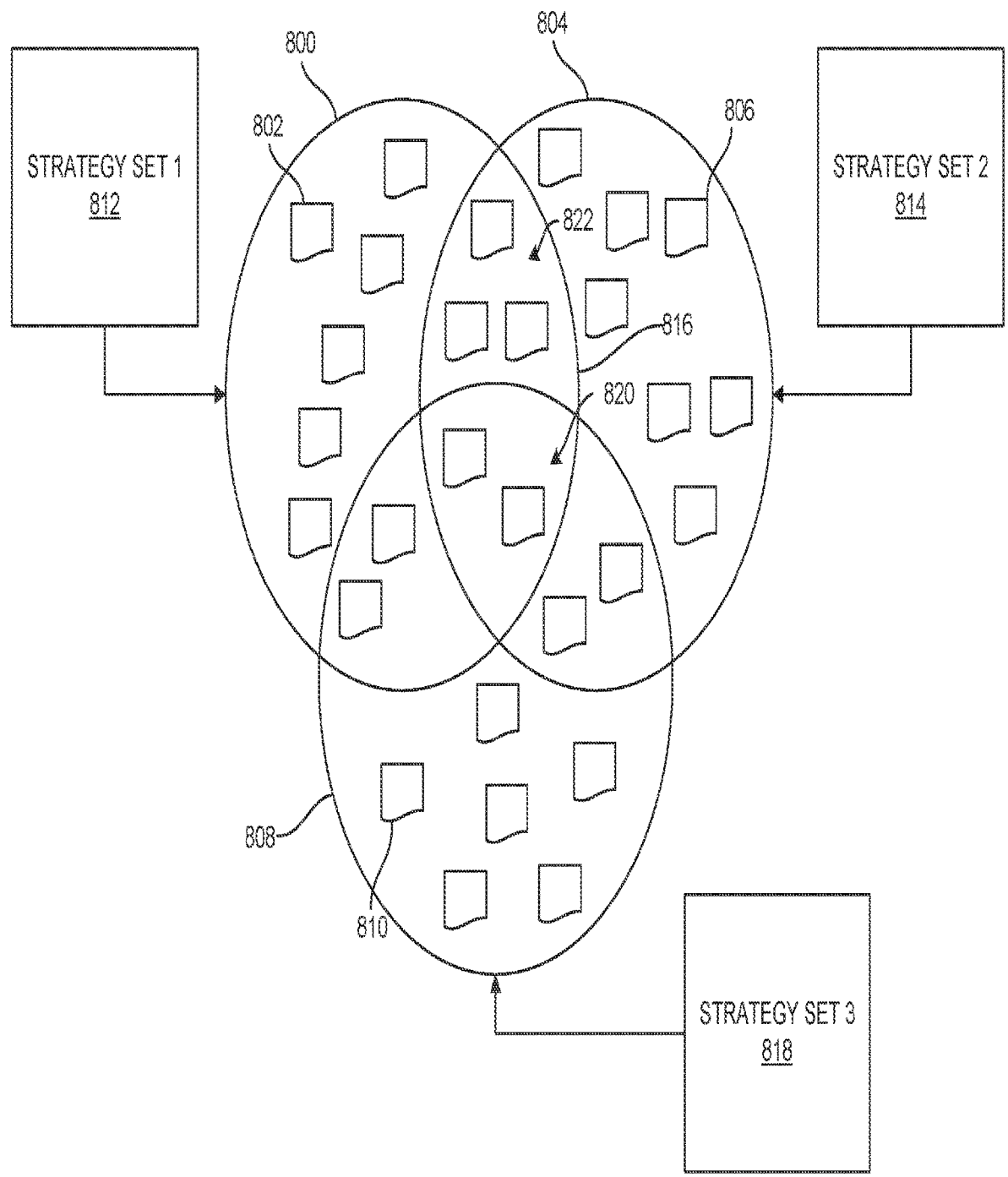
FIG. 8 illustrates the restriction of groupings of record objects according to embodiments of the present disclosure.

Subsequent strategies can be applied to prune or restrict the record objects that are selected as potential matches (e.g., candidate record objects). For example, and also referring to FIG. 8, FIG. 8 illustrates the restriction, separation, grouping, or identification of a first grouping 800 of record objects 802 with a second grouping 804 of record objects 806 and a third grouping 808 of record objects 810. The record object identification engine 330 can apply a first set of strategies 812 to identify, determine, or otherwise select the first grouping 800 of record objects 802. Similarly, the record object identification engine 330 can apply a second set of strategies 814 to select the second grouping 804 of record objects 806. The first set of strategies 812 can be or include, for instance, seller-based strategies for identifying record objects with which to match an electronic activity based on seller information. The second set of strategies 814 can similarly be or include, for instance, buyer-based strategies for identifying record object with which to match an electronic activity based on buyer information. The first and second strategies 812, 814 may be applicable to all record objects of the systems of record maintained or accessed by the data processing system 100. In other words, upon determining to match an electronic activity to a record object, the record object identification engine 330 can apply the first and second strategies 812, 814 to the electronic activity the record objects which may correspond thereto (e.g., candidate record objects). In the example shown in FIG. 8, the record object identification engine 330 can identify a subset of record objects 816 which satisfy both the first and second strategies 812,814 (e.g., the subset of record objects 816 which are included in both the first grouping 800 and second grouping 804).

In some embodiments, the record object identification engine 330 can apply a third set of strategies 818 to identify the third grouping 808 of record objects 810. Similar to the first and second set of strategies 812, 814, the third set of strategies 818 may be exclusionary strategies which are designed or configured to exclude or restrict matching electronic activities to particular record objects. The third set of strategies 818 may function as a filter of the candidate record objects which satisfy both the first and second strategies 812, 814. The record object identification engine 330 can apply the third set of strategies 818 to each of the record objects (e.g., at substantially the same time as applying the first and second set of strategies 812, 814). The record object identification engine 330 can apply the third set of strategies 818 to the subset of record objects 816. The record object identification engine 330 can apply the third set of strategies 818 to identify a number of record objects 820 from the subset 816 which are to be excluded from matching. Hence, the record object identification engine 330 can be configured to identify a set of candidate record objects 822 which satisfy both the first and second set of strategies 812, 814, and are not excluded by the third set of strategies 818.

In some embodiments, the record object identification engine 330 can group or link contact record objects on one or both sides of a business process into groups. The record object identification engine 330 can use the groups in the matching strategies. For example, the record object identification engine 330 can group users on a seller side into account teams and opportunity teams. Account teams can indicate a collection of users on the seller side that collaborate to close an initial or additional deals from a given account. Opportunity teams can be a collection of users on the seller side that collaborate to close a given deal. The record object identification engine 330 can add a user to an account or opportunity team by linking the contact record object of the user to the given account team record object or opportunity team record object. The record object identification engine 330 can use account team-based matching strategies or opportunity team-based matching strategies to select record objects with which the electronic activity can be matched.

In some embodiments, at periodic intervals, the record object identification engine 330 can process the electronic activities linked with account record objects and opportunity record objects to generate account teams and opportunity teams, respectively. For a given account record object, the record object identification engine 330 can count the number of times that a seller side user interacts with the account record object (for example, is included in an electronic activity that is linked or matched to the account record object). For example, the record object identification engine 330 can count the number of times the user was included on an email or sent an email that was linked with the account record object. If the count of the interactions is above a predetermined threshold, the record object identification engine 330 can add the user to an account team for the account record object. In some embodiments, the count can be made over a predetermined time frame, such as within the last week, month, or quarter. The record object identification engine 330 can perform a similar process for generating opportunity teams. In some embodiments, the account teams and opportunity teams can be included in the matching and restriction strategies used to match an electronic activity with a record object. Conversely, if the count of the interactions of a particular user is below a predetermined threshold within a predetermined time frame (for example, a week, a month, three months, among others), the record object identification engine 330 can remove the user from the account team or the opportunity team.

In some embodiments, the record object identification engine 330 can select record objects with which to match a first electronic activity based on a second electronic activity. The second electronic activity can be an electronic activity that is already linked to a record object. The second electronic activity can be associated with the first electronic activity. For example, the data processing system 100 can determine that the first and second electronic activities are both emails in a threaded email chain. The system can determine the emails are in the same thread using a thread detection policy. The thread detection policy can include one or more rules for detecting a thread by comparing subject lines and participants of a first email and a second email or in some embodiments, by parsing the contents of the body of the second email to determine if the body of the second email includes content that matches the first email and email header information of the first email is included in the body of the second email. If the second electronic activity is an earlier electronic activity that is already matched to a given record object, the record object identification engine 330 can match the first electronic activity to the same record object.

The tagging engine 312 can generate or add tags to electronic activities based on information generated or otherwise made available by the record object identification engine 330 and the matching engine 316. The tagging engine 312 can generate a tag array that includes each of the plurality of tags assigned or associated with a given electronic activity. By having tags assigned to electronic activities the data processing system 100 can be configured to better utilize the electronic activities to more accurately identify nodes and record objects to which the electronic activity should be linked.

In addition to the above described tags, the tagging engine 312 can assign tags to an electronic activity based on the output of the record object identification engine 330 and/or matching model, among other components of the system described herein. For example, the tagging engine 312 can add one or more tags indicating to which record objects the record object identification engine 330 returned as candidate record objects for the electronic activity.

The linking generator 334 can be any script, file, program, application, set of instructions, or computer-executable code that is configured to enable a computing device on which the linking generator 334 is executed to link electronic activities to record objects. As described above, the data processing system 100 can generate and maintain a shadow system of record for each of a data source provider's system of record. The data source provider's system of record can be referred to as a master system of record or tenant-specific system of record. The linking generator 334 can select a record object from a record object array and link the electronic activity to the selected record object in the shadow system of record. For example, the record object identification engine 330 can use the confidence scores of the record objects in the record object array to select a record object with which to match the electronic activity.

By linking the electronic activities to record objects, the system can generate metrics regarding the electronic activities. The metrics can include engagement metrics for users, employees, specific deals or opportunities, managers, companies, or other parties associated with a system of record. The engagement metrics can indicate amongst other things how likely an opportunity (or deal) is to close successfully (or unsuccessfully) or whether the number of contacts in the account are sufficiently engaged with the sales representative to prevent the account from disengaging with the company. The engagement metrics can provide an indication of an employee's productivity and can indicate whether the user should receive additional training or can indicate whether the user is on track to achieve predefined goals. The metrics can be calculated dynamically as the electronic activities are matched to nodes and record objects or the metrics can be calculated in batches, at predetermined intervals. Metrics can also be based on the content or other components of the electronic activity in addition to or in place of the linking of the electronic activity to a node and record object.

The stages of opportunity record objects can be based on the contacts present or involved on both sides of a deal. For example, as a deal advances to higher stages, more senior people may be included in the electronic activities. The stage of the deal can be based on the identification or introduction of an opportunity contact role (OCR) champion. In some embodiments, an administrator or user of the system of record can link the opportunity record object with a contact record object and designate the contact of the contact record object as an opportunity contact role. The champion can be a person on the buyer side of the deal that will support and provide guidance about the deal or opportunity to the seller side. In some embodiments, the OCR champion can be selected based on one or more rules. For example, the one or more rules can include setting the person identified as the VP of sales (or other specific role) as the OCR champion. In some embodiments, the OCR champion can be selected based on historical data. For example, the historical data can indicate that in 90% of the past deals a specific person or role was the OCR champion. Based on the historical data, when the person is added as a recipient of an electronic activity, the person can be identified as the OCR champion. The OCR champion can also be identified probabilistically based on tags associated with the electronic activities linked to the opportunity record object or content within the electronic activities.

In some embodiments, OCRs can be configurable by the company on an account by account basis. Depending on the type, size or nature of the opportunity, the customer or account involved in the opportunity may have different types and numbers of OCRs involved in the opportunity relative to other opportunities the same customer is involved in. Examples of OCRs can include "Champion," "Legal," "Decision Maker," "Executive sponsor" among others.

The data processing system 100 can be configured to assign respective opportunity contact roles to one or more contacts involved in an opportunity. The data processing system 100 can be configured to determine the opportunity contact role of a contact involved in the opportunity based on the contact's involvement. In some embodiments, system 100 can determine the contact's role based on a function the contact is serving. The function can be determined based on the contact's title, the context of electronic activities the contact is involved in, and other signals that can be derived from the electronic activities and node graph. In addition, the data processing system 100 can assign the contact a specific opportunity contact role based on analyzing past deals or opportunities in which the contact has been involved and determining which opportunity contact role the contact has been assigned in the past. Based on historical role assignments, the data processing system 100 can predict which role the contact should be assigned for the present opportunity. In this way, the data processing system 100 can make recommendations to the owner of the opportunity record object to add contacts to the opportunity or assign the contact an opportunity contact role.

In some embodiments, the data processing system 100 can determine that a contact should be assigned an opportunity contact role of "Executive Sponsor." The system may determine this by parsing electronic activities sent to and from the contact and identify, using NLP, words or a context that corresponds to the role of an Executive sponsor. In addition, the system can determine if the contact has previously been assigned an opportunity contact role of executive sponsor in previous deals or opportunities. The system can further determine the contact's title to determine if his title is senior enough to serve as the Executive sponsor.

In some embodiments, the electronic activity linking engine 328 can use a sequential occurrence of electronic activities to determine contact record objects that should be linked or associated with an opportunity record object. The electronic activity linking engine 328 can also determine the roles of people associated with the contact record objects linked to an opportunity. The identification of people associated with opportunity and account record objects (and their associated roles) can be used to determine stage classification, group of contacts on the buyer side that are responsible for the purchase, and for many other use cases. In some embodiments, the sequential occurrence of electronic activities can be used to determine the role or seniority of users involved in a business process. For example, initial emails linked with an opportunity record object can involve relatively lower-level employees. Later emails linked to the opportunity record object can include relatively higher-level employees, such as managers or Vice Presidents. The electronic activity linking engine 328 can also identify the introduction of contacts in a chain of electronic activities, such as a series of email replies or meeting invites, to determine a contact's participation and role in a business process. For example, the electronic activity linking engine 328 can use NLP and other methods to identify the introduction of a manager as a new OCR based on an email chain.

Q. Systems of Record Data Extraction

The record data extractor 332 can be any script, file, program, application, set of instructions, or computer-executable code, that is configured to enable a computing device on which the record data extractor 332 is executed to perform one or more functions of the record data extractor 332 described herein.

The record data extractor 332 can be configured to extract data from one or more records of one or more systems of record. The record data extractor 332 can identify record objects included in a system of record and extract data from each of the record objects, including values of particular fields. In some embodiments, the record data extractor 332 can be configured to extract values of fields included in the record object that are also included in the node profile maintained by the data processing system 100.

The insight engine 336 can be any script, file, program, application, set of instructions, or computer-executable code, that is configured to enable a computing device on which the insight engine 336 is executed to perform one or more functions of the insight engine 336 described herein.

The insight engine 336 can be configured to process electronic activities and record objects of one or more systems of record of a company to determine insights for the company. For instance, the insight engine 336 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others. Additional details relating to the insights are described herein.

In some embodiments, the insight engine 336 can be configured to generate performance profiles for a company. In some embodiments, the performance profile can be a performance profile of an employee of the company. In some embodiments, the performance profile can be a performance profile of a department of the company, a group within a department, or individual employees of the company. The insight engine 336 can generate the performance profiles using data accessible by the data processing system 100. In some embodiments, the insight engine 336 can generate the performance profiles using all data including electronic activities and systems of record accessible by the data processing system 100 from multiple companies. In some other embodiments, the insight engine 336 can generate the performance profiles for a company only using data provided by the company to the data processing system 100. In some embodiments, the insight engine 336 can be configured to generate certain types of performance profiles for employees, groups, departments of a company that has provided access to the data processing system 100 while generating other types of reports or insights for other node profiles of the data processing system 100 that are not employees of the company.

The insight engine 336 can be configured to predict employee success at a company or in a job role. The insight engine 336 can, based on an analysis of electronic activities as well as information stored in one or more systems of record, predict the success of the member node. For example, the insight engine 336 can generate a performance profile for the member node. The performance profile can be a statistics driven performance profile. The performance profile can be based on electronic activities and information stored in one or more systems of record. For example, the performance profile can be based on a number or amount of electronic activities associated with the member node during a time interval, a type of the electronic activities, the amount of time the member node spends generating or preparing the electronic activities (e.g., amount of time spent writing an email), the recipients of the email, natural language processing of the email, etc.

For example, the insight engine 336, using job history and performance history reconstructed from an internal member node graph, can generate a performance score, purchasing preference, decision making power, interests or other information for the member node. By syncing information associated with the systems of record and electronic activities with the member node graph, the data processing system 100 can generate or extrapolate types of opportunities or features on the public profile.

For example, the insight engine 336 can determine that a member node performs medical device sales, the member node's territory is the northeast region, the member node prefers or is more successful when doing in-person sales, the member node prefers or more successful when doing CEO level sales, or an average deal size or amount. To do so, the insight engine 336 can parse or featurize information corresponding to tasks or activities (e.g., deals) associated with the member node (e.g., a salesperson or other knowledge worker) that is derived from one or more record objects stored in the one or more systems of record (e.g., extracted by the record data extractor 332). By parsing or generating features from the record objects, the data processing system 100 can update a member node profile to reflect various performance information derived by the insight engine 336 from record objects in one or more systems of record as well from electronic activities. The insight engine 336 can generate various outputs corresponding to insights derived from record objects in one or more systems of record and electronic activities. The insights can include a performance score or performance grade indicating how well a member node has performed or may perform in general, at a type of task, in a specific job or under certain circumstances of a job or job environment, as determined by the communications metadata, extracted from the node graph.

As noted above, the automation and intelligence engine 112 may include a sync module 338, an API 340, and/or a feedback module 342. The automation and intelligence engine 112 and each of the components of the automation and intelligence engine 112 can be any script, file, program, application, set of instructions, or computer-executable code. The record object manager 306 may be implemented as described above to update record objects of systems of record and/or receive information from record objects of various systems of record. For example, the record object manager 306 can update contact record objects with updated contact information from node profiles. The sync module 338 can be any script, file, program, application, set of instructions, or computer-executable code and be configured to periodically synchronize with data source providers and/or data sources so information can be shared between the data processing system 100 and the corresponding data source providers and/or data sources. In some embodiments, the sync module 338 enables various data source providers and/or data sources to share information with each other. The API 340 can be any application programming interface that is configured to enable the data processing system 100 to communicate with one or more systems of record, electronic mail servers, telephone log servers, contact servers, and/or other types of servers and end-user applications that may receive or maintain electronic activity data or profile data relating to one or more nodes. The feedback module 342 can be any script, file, program, application, set of instructions, or computer-executable code that is configured to receive feedback from one or more client devices that can be used to update one or more systems of record. The feedback can be used to train any of the modules and/or models of the data processing system 100.

As described herein and supplemental to the description of various terms provided above, electronic activities can include emails, electronic calendar events, electronic meetings, phone call logs, instant messages, other any other electronic communications generated by a node, received by a node, exchanged between nodes or otherwise stored on an electronic server configured to provide electronic activities to the data processing system 100.

An individual or member node can be an electronic representation of a user, person, account of a person or user, an employee, a bot, or any other entity that may have an account or an identifier that the data processing system can generate a node profile for. A group node can be an electronic representation of an enterprise, a company, an organization, an employer, a team of employees or people, or a plurality of member nodes that can be treated as a single entity. A node profile can be an electronic representation of a profile of a member node or a group node. The node profile can include fields. Each field can include one or more values. An example field can be an email address. An example value can be john.smith@example.com. A value of a field can include an array of data points identifying occurrences of the value. Each value can have a confidence score. A data point can identify an electronic activity or other piece of information that contributes the value to the field. The data point can include or identify a source of the electronic activity, a trust score of the source of the data point, a time or recency of the electronic activity and a contribution score. The source of the electronic activity can be a mail server, a system of record, or any other repository of electronic activities.

A trust score of the source of the data point can indicate a trustworthiness of the source of the data point. The trust score of the source can be based on a completeness of system of record maintained by the source. The trust score can also serve as an indication of how reliable the source may be.

A contribution score of the data point can indicate how much the data point contributes towards a confidence score of the value associated with the data point. The contribution score can be based on the trust score of the source, a health score of the source, and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

A confidence score generally relates to a level of confidence that a certain piece of information is accurate. As used herein, a confidence score of a piece of information, such as an assigned tag, a value of a field of a node profile, a stage classification prediction, a record object match, can indicate a level of confidence that the piece of information is accurate. The confidence score of the piece of information can change based on a temporal basis. A node profile can include a first email address corresponding to a first job and a second email corresponding to a subsequent job. Each of the two email addresses are at respective points in time, accurate and valid. As the person switches jobs, the first email address is no longer valid but the confidence score associated with the email address can in some embodiments, remain high indicating that the first email address belongs to the node profile. Similarly, the second email address also belongs to the node profile and therefore also has a high confidence score. After the system determines that the second email address is active and functioning, the system can assign a higher confidence score to the second email address relative to the first email address since the contribution scores provided by recent data points (for example, recent electronic activities identifying the second email address) can contribute towards the higher confidence score. Similarly, any tags that are assigned to electronic activities identifying bounce back activity related to the first email address (indicating that the first email address is no longer active) can reduce the confidence score of the first electronic activity.

The health score of the source can indicate a level of health of the source. The health of the source can include a completeness of the source (for example, a system of record), an accuracy of the data included in the source, a frequency at which the data in the source is updated, among others.

A connection strength between two nodes can be based on the electronic activities associated with both the nodes. In some embodiments, each electronic activity can be used by the system to determine a connection strength between the two nodes. The contribution of each electronic activity towards the connection strength can diminish over time as older electronic activities may indicate a past connection but do not indicate a current status of the connection strength between the two nodes.

The time decaying relevancy score of an electronic activity can indicate how relevant the electronic activity is for determining a connection strength between two nodes exchanged between or otherwise associated with the two nodes. The connection strength between two nodes can be based on the time decaying relevancy scores of the electronic activities exchanged between or otherwise associated with the two nodes.

As further described herein, electronic activities can be linked to or matched to record objects. Record objects can be maintained in a shadow system of record maintained by the data processing system 100 or in some embodiments, linked or matched to record objects maintained in master system of records that are maintained by customers or enterprises.

R. Systems and Methods for Matching Electronic Activities with Whitespace Domains to Record Objects in a Multi-Tenant System The systems and methods described herein can perform whitespace domain name matching for systems of record in which electronic activities can be matched to record objects without a matching domain name value, enabling more accurate matching between electronic activities and record objects. Systems may identify a record object to match to an electronic activity based on the domain name of an electronic account identified in the electronic activity. The record object can be a record object of a CRM. However, there may be instances in which the CRM may not have a record object with a domain name value that matches the domain name of an electronic activity. In such instances, systems not implementing the methods described herein may have to determine which record object to match to the electronic activity with little or unreliable information. These systems may do so by selecting company names of record objects that have similarities (e.g., matching characters) with the domain names of the electronic activities. Studies have shown performing this method can cause 8% or more of electronic activities that the systems analyze to either be matched with incorrect record objects or not be matched with any record object at all.

However, by implementing the systems and methods described herein, a system may accurately identify record objects in a first system of record to match to electronic activities despite the record objects not having a matching domain name. For example, the system may implement matching policies in a multi-tenant system including multiple systems of record (e.g., data accessed from multiple CRMs) and identify record objects of the systems of record that have the domain name values. For a domain name identified from an electronic activity, the system can determine parameters (e.g., values of ground truth information) to use to identify a record object of the other systems of record. To do so, the system can implement matching policies to identify a record object from the systems of record that is the most characterized by the parameters (e.g., that has matching field-value pair values that correspond or match to values of the parameters). The system may identify a matching record object from the first system of record based on similarities (e.g., matching corresponding field-value pairs) between the field-value pairs of the matching record object of the first system of record and the identified record object of the other systems of record. The system may link or otherwise associate the electronic activity with the matching record object of the first system of record, causing an electronic activity that would have otherwise been mislabeled or ignored to enrich the first system of record with more data that can be extracted (e.g., activity field-value pairs) from the electronic activity. Using the systems and methods described herein to match electronic activities to record objects can improve the overall management of data of systems of record and can improve the accuracy of any data that the system generates during featurization and generation of performance data based on extracted data from such electronic activities.

The systems and methods can operate on data maintained separately from the CRM from which the record objects are accessed, reducing the need for API calls to the CRM to retrieve data and perform operations on the data, reducing network demands on the CRM (thus enabling the CRM to be used by the data source provider's users without network loads associated with API calls for accessing the data to perform the methods described herein); as such, storing the association can be performed to update the CRM with reduced network demands on the CRM, including in batch updating processes. For example, some database systems, including some CRMs (e.g., Salesforce CRMs), can have limits on API calls to the system (while this technical limitation on CRM access is described in terms of API calls, more generally, database systems such as CRMs can have various explicit or implicit limitations on data requests and other network loads or data retrieval loads, such as prioritization or queuing of requests, in order to ensure overall performance of the systems). While this can reduce network loads on the CRMs, it can also make it technically challenging to perform operations on the data of the CRMs, such as where performing the operations requires identifying specific record objects or other data of the CRMs to retrieve based on the operations being performed. For example, operations involving matching or linking electronic activities to record objects can require comparisons of data; for example, activity field-value pairs generated from the electronic activities with object field-value pairs of record objects such that numerous requests for the data (e.g., API calls) can be required in an ad hoc or random manner during the process of performing the operations. Similarly, the operations described herein for matching electronic activities with record objects can depend on identifying specific data from specific electronic activities and record objects, in a manner that can depend on which record objects are identified (and thus which electronic activities are linked with the record objects), as well as dynamic factors such as the timing of requests for the data or trigger events such as the receipt of particular electronic activities having domain names that are not able to be matched with the record objects in the CRM. As such, requesting the data from the CRMs may interfere with the API call limits or other network load and data retrieval efficiency policies for ensuring proper performance of the CRMs. Moreover, the CRM itself may lack domain name data in the record objects to enable accurate matching between the electronic activities and the record objects. The systems and methods described herein can address such technical limitations to more accurately match electronic activities with record objects by maintaining data from the CRMs (including multi-tenant CRM data) separately from the CRMs, enabling more accurate electronic activity-record object matching without interfering with CRM operation.

Figure 9:
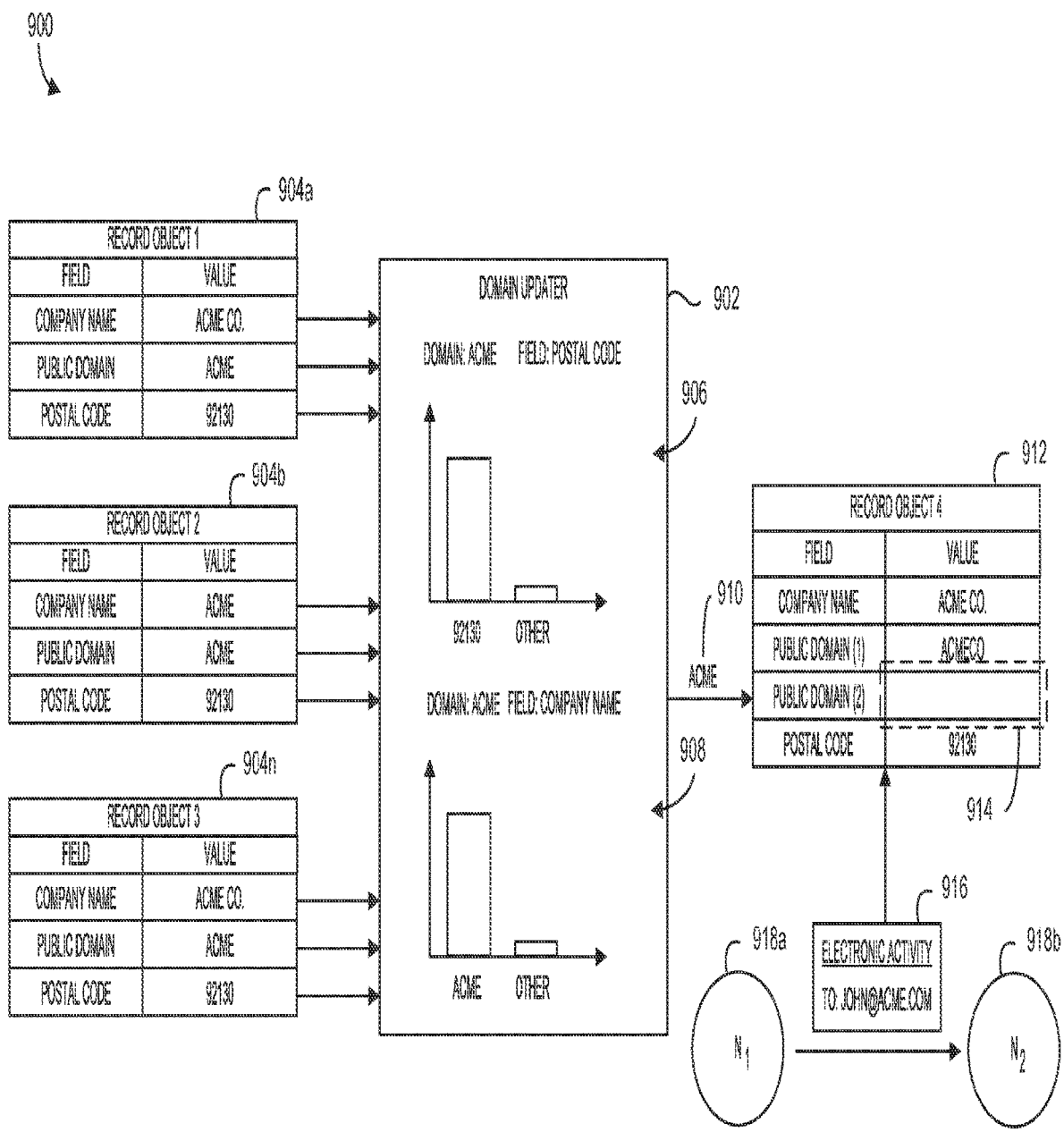
FIG. 9 illustrates a block diagram of an example system for matching electronic activities with whitespace domains to record objects in a multi-tenant system according to embodiments of the present disclosure.

Referring now to FIG. 9, a block diagram of a system 900 for matching electronic activities with whitespace domains to record objects in a multi-tenant system is shown, according to embodiments of the present disclosure. Some of the components of the system 900 may correspond to components of the data processing system 100 of FIG. 1. The system 900 is shown to include a first record object 912, a plurality of second record objects 904a-n (generally referred to herein as second record objects 904), an electronic activity 916, and nodes 918a-b (generally referred to herein as nodes 918. The first record object 912 may also be a third record object, described below. Although not shown, the first record object 912 may be stored in a first system of record of a first data source provider and the second record objects 904 may be stored in one or more second systems of record of second data source providers. The first record object 912 and the second record objects 904 may be account record objects that represent various group entities. The system 900 is also shown to include a domain updater 902. The domain updater 902 can be any script, file, program, application, set of instructions, or computer-executable code that is configured to enable a computing device on which the domain updater 902 is executed to perform one or more functions of the domain updater 902 described herein. As described in further detail below, the domain updater 902 can be configured to process account record objects of various systems of record. The domain updater 902 may process the record object 912 and/or the record objects 904 as electronic activities are received or transmitted or asynchronously upon receiving an input to a user interface.

The nodes 918 may be associated with entities that transmit and/or receive electronic activities between each other via their respective electronic accounts. Each of the nodes 918 may correspond to a node profile that is stored in the data processing system 100. The nodes 918 may transmit and/or receive electronic activities (e.g., the electronic activity 916) between each other. The electronic activities may be stored in the data processing system 100 and/or one or more systems of record that are associated with the electronic accounts. The data processing system 100 may access data sources of data source providers to access such electronic activities. For example, in the system 900, the node 918b may transmit and/or receive the electronic activity 916 from the node 918*a*. The data processing system 100 may access the data source associated with the electronic accounts of either of the nodes 918 to access the electronic activity 916. The data processing system 100 can associate electronic activities with the node profiles and/or group node profiles that correspond to the nodes that transmit and/or receive the electronic activities. Examples of electronic activities can include electronic mail messages, telephone calls, calendar invitations, social media messages, mobile application messages, instant messages, cellular messages such as SMS, MMS, among others, which may be referred to as electronic communication activities. Other examples of electronic activities include electronic records of any other activity, such as digital content, files, photographs, screenshots, browser history, internet activity, shared documents, among others.

Account record objects such as first record object 912 and second record objects 904 may be data structures that each include fields associated with an account that is held with a data source provider. The account record objects may be stored in the systems of record of the data source prover. The fields can include AccountNumber, Domain name, Postal Code, Company Name, BillingAddress, Description, Industry, Fax, DunsNumber, LastActivityDate, MasterRecordId, Name, NumberOfEmployees, Ownership, Website, YearStarted, and IsPersonAccount, among others. A system of record of a data source provider can include an account record object for each of the data provider's customers. The system of record can include multiple account record objects for a given customer. For example, the system of record can include an account record object for each division of a given customer. The account record object can be stored or linked with one or more opportunity record objects.

Opportunity record objects can be data structures that include a plurality of fields for a given opportunity. The opportunity can indicate a possible or planned deal with a customer for which an account record object is already stored in the system of record. Opportunity record objects can include fields such as AccountId, Amount, CampaignId, CloseDate, Description, ExpectedRevenue, Fiscal, HasOpenActivity, IsClosed, IsWon, LastActivityDate, Name, OwnerId, Role, StageName, Territory2Id, and Type, among others.

The domain updater 902 may identify electronic activities transmitted between nodes 918 and associate the electronic activities with account record objects based on the domain name of the electronic accounts that are identified in the data of the electronic activities. The domain updater 902 may identify the electronic activities by accessing them from data sources of data source providers of the nodes 918 that are associated with the electronic activities. In some cases, the domain updater 902 may access the electronic activities from the data sources in response to a request from an entity of a data source provider. For instance, the domain updater 902 may parse the signature block, the body, the "To:" field, the "From:" field, and/or any metadata that is associated with the electronic activity 916 to identify the electronic accounts of the nodes 918 that transmitted and/or received the electronic activity 916. The domain updater 902 may parse the data to identify the domain names that are associated with the electronic accounts of the nodes 918 associated with the electronic activity 916. For example, for an email, the domain updater 902 may parse the "From:" field of the email to identify an electronic account with the identifier "John d, ACME.com". The domain updater 902 may identify "ACME" as the domain name associated with the electronic account based on the characters following the "a," symbol of the identifier.

In some embodiments, the domain updater 902 may identify the domain names of electronic accounts responsive to the domain updater 902 determining that the electronic accounts transmitted the electronic activities. The domain updater 902 may determine which electronic accounts transmitted the electronic activities based on the fields from which the domain names of the electronic accounts were identified. For example, if the electronic activity 916 were an email, the domain updater 902 may identify the domain name of the electronic account identified in the "From:" field of the email. The domain updater 902 may not identify the domain names of electronic accounts in the "To:" or "CC:" fields of the email. By doing so, the domain updater 902 may more accurately identify the account record objects that are associated with electronic activities by not processing potential typographical errors or otherwise invalid domain names that may be present in identified domain names of the electronic accounts identified in the "To:" or "CC:" fields of the emails, saving processing resources by avoiding extra processing of data that is not verified to be accurate.

The domain updater 902 may determine whether any first record objects (e.g., account record objects) of the first system of record of a processor of the data source provider from which the electronic activity 916 was accessed has a value of a domain name field-value pair that matches the domain name that the domain updater 902 extracts from the electronic activity 916. The domain updater 902 may do so by comparing the identified domain name of the data of the electronic activity 916 to values of domain name fields of the first record objects of the first system of record. The domain updater 902 may compare the identified domain name to values of domain name fields of each first record object of the first system of record. Responsive to the domain updater 902 identifying a first record object with a matching domain name value, the domain updater 902 may associate or link the electronic activity 916 to the identified first record object, as will be described in greater detail below. However, responsive to the domain updater 902 not identifying any first record objects with a matching domain name value to the identified domain name value of the electronic activity, the domain updater 902 may determine that the electronic activity 916 does not match with any first record objects of the first system of record.

In response to determining that the electronic activity 916 does not match with any first record objects of the first system of record, the domain updater 902 may analyze a plurality of second record objects of one or more second systems of record. The second record objects may be account record objects of the one or more second systems of record. The one or more second systems of record may be systems of record that are stored by processors of one or more second data source providers. The domain updater 902 may analyze the plurality of second record objects by identifying the object field-value pairs of the second record objects. The domain updater 902 may compare the domain name field-value pairs of the second record objects to the domain name identified from the electronic activity 516. Based on the comparison, the domain updater 902 may identify any second record objects that have a matching domain name value to the identified domain name value of the electronic activity 516. The domain updater 902 may identify any number of second record objects that have a matching domain name value. The domain updater 902 may generate a subset of second record objects (e.g., a list of second record objects) that have a matching domain name value to the identified domain name value of the electronic activity 516. The subset of second record objects may include any number of second record objects. The subset of second record objects may be defined herein as fifth record objects or as at least one fifth record object.

In some embodiments, the domain updater 902 may use external sources to identify the subset of second record objects. One example of an external source is a DNS record. For instance, the domain updater 902 may perform a whois lookup in the Domain Name System (DNS) for the domain jd.com. Based on the lookup, the domain updater 902 may determine that the owner of that domain is John Doe. Accordingly, the domain updater 902 may identify the subset of second records objects as the second record objects that include the John Doe name. In some cases, the whois operation would redirect the domain updater 902 to johndoe.com to cause the domain updater 902 to identify the second subset of record objects that have johndoe.com domain names. In some embodiments, the data retrieved from the external source can be maintained by the data processing system 100, such as in one or more record objects or node profiles analogous to the data retrieved from the systems of record for the multi-tenant system. In some embodiments, the domain updater 902 determines to use the external resources responsive to determining the domain name does not satisfy a match policy with domain names in any record objects in any second systems of record (e.g., determining the domain name does not match any domain names in the second systems of record).

In some embodiments, the domain updater 902 may not match electronic activities to first record objects responsive to the electronic activity being associated with a personal domain. The domain updater 902 may identify a domain type of the identified domain name of an electronic activity. The domain updater 902 may maintain a list of domain names and their domain types in a database. Examples of domain types may include, but are not limited to, personal and business. Upon identifying the domain from an electronic activity, the domain updater 902 may compare the identified domain name to the list. The domain updater 902 may identify a domain type of the domain name based on the comparison. Responsive to the domain updater 902 determining that the domain name is of a personal domain type, the domain updater 902 may determine not to associate the electronic activity with a first record object. However, responsive to the domain updater 902 determining that the domain is of a business domain type or some other type, the domain updater 902 may process the first record objects of the first system of record to determine if there are any first record objects with a matching domain value.

In some embodiments, the domain updater 902 may evaluate the subset of second record objects according to a match policy. The match policy may include a series of rules and/or thresholds that the domain updater 902 can apply to the subset of second record objects to identify a second record object of the subset of second record objects. As will be described in greater detail below, the domain updater 902 may apply the rules and/or thresholds of the match policy to the second record objects and identify a second record object from the subset of second record objects that satisfies the match policy.

To identify the second record object that satisfies the match policy, the domain updater 902 may determine the most common values (e.g., the ground truth) of the object field-value pairs of the subset of second record objects. To do so, the domain updater 902 may identify values of each field or a portion of the fields of the subset of second record objects. The domain updater 902 may identify unique values (e.g., values that are different from the other values) and generate and/or maintain a counter for each unique value. The domain updater 902 may identify each instance of the unique value and increment the counter associated with the unique value for each instance. Accordingly, the domain updater 902 may maintain counters that indicate the number of second record objects that include each unique value. The domain updater 902 may maintain counters for unique values for each or a portion of the fields of the subset of second record objects. For instance, the domain updater 902 may maintain a counter for the company name field and a counter for the postal code field of the second record objects.

For example, the domain updater 902 may identify a subset of second record objects that include the domain name ACME in their domain name field. The domain updater 902 may identify seven second record objects of the subset of second record objects that have a company name value of ACME and one second record object of the subset of second record objects that has a company name value of ACME CO. The domain updater 902 may increment a corresponding counter for the ACME value and the ACME CO. value so the ACME value counter has a count of seven and the ACME CO. count has a value of one, as is represented in the graph 908 of FIG. 9. Continuing with the example, the domain updater 902 may identify six second record objects of the subset of second record objects that have a postal code value of 92130 and two second record objects of the subset of second record objects that have a postal code value of 46110. The domain updater 902 may maintain and increment counters for each postal code value similar to the above, as is represented in the graph 906 of FIG. 9.

The domain updater 902 may identify the most common values of the subset of second record objects based on the values of the counters. To do so, for each field of the subset of second record objects, the domain updater 902 may compare the values of the counters associated with the same field with each other. For a field, the domain updater 902 may identify the counter that is associated with the highest count and identify the value that is associated with the identified counter as the most common value for the field. For example, for the postal code field, the domain updater 902 may identify a count of eight for a counter that is associated with the 92130 value and a count of three for a counter that is associated with the 46110 value. The domain updater 902 may compare the two counts and identify the 92130 value as the value that is associated with the highest count. The domain updater 902 may compare counts of any number of counters to identify the highest counts. The domain updater 902 may repeat this process for any number of fields of the subset of second record objects to obtain the most common value for each field.

In some embodiments, the domain updater 902 may identify company name values as being associated with the same company name prefix. Consequently, the domain updater 902 may match company names of the subset of second record objects with each other despite variations between the company names. A company name prefix may be a sequential subset of letters with which a company name may begin. Company name prefixes may include any number of letters and/or words. However, the system may be configured to limit the number of letters or words that may be in a prefix. For example, the system may include a rule indicating that a company name prefix may be up to two words. As will be described below, the domain updater 902 may identify company name values that begin with the same characters as a prefix and increment and maintain a counter that is associated with the number of second record objects of the subset of second record objects that have a company name value that begins with the same characters as the prefix.

The domain updater 902 may identify company names of second record objects of the subset of second record objects that match a company name prefix by comparing or applying the values of the company name fields to a data structure, such as a trie data structure. The trie data structure may be associated with one or more prefixes. The trie data structure may include one or nodes and branches. A node may represent or be associated with a character. A branch may include a group of sequential nodes that make up a prefix. The trie data structure may have branches that are associated with any number of prefixes. The domain updater 902 may compare or apply a company name value to the trie data structure by comparing the letters of the company name value to the trie data structure sequentially. For example, the domain updater 902 may compare the first letter of the company name value to the trie data structure and identify a node that is associated with the same letter. The domain updater 902 may identify and/or compare the second letter of the company name value to the branches that are associated with the identified node and determine if there is a branch (including the node of the first letter of the company name value being evaluated) in which the next sequential node is associated with the same letter as the second letter of the company name value. The domain updater 902 may compare the letters of the company name values until the domain updater 902 determines there is not a letter that is associated with the next sequential node of a branch, the last node of a branch has been matched with a company name (e.g., the company name includes all of the letters of a prefix and, potentially, more), or the last character of the company name has been matched with the last node of a branch (e.g., the company name is the same as the prefix).

In cases in which the domain updater 902 determines that there is not a letter of a company name that is associated with a next sequential node of a branch, the domain updater 902 may determine that the company name is not associated with a company name prefix. The domain updater 902 may discard or otherwise remove the second record object of the subset of second record objects that is associated with such a company name from the subset of second record objects. The domain updater 902 may do so by not using the fields of the discarded second record object when determining the most common values (e.g., not incrementing any counters based on values of the discarded second record object) or, in some cases, not comparing the discarded second record object with first record objects of the first system of record when determining a match as described below.

However, responsive to the domain updater 902 determining that the last node of a branch matches a character of a company name or, depending on the configuration, the last node of a branch matches the last character of a company name, the domain updater 902 may identify the prefix associated with the branch and increment a counter associated with the identified prefix. The domain updater 902 may perform similar techniques for each second record object of the subset of second record objects and update counters for the identified prefixes accordingly. The domain updater 902 may update counters for any number of prefixes. Similar to the above, the domain updater 902 may compare the counters and identify the counter that is associated with the highest count. The domain updater 902 may identify the company name prefix that is associated with the highest count as the most common company name prefix.

In some embodiments, the domain updater 902 may identify index values of prefixes and the company name values and compare the corresponding index values. Each sequential character of the prefixes and company name values may be associated with an index value. The domain updater 902 may identify company name values that are associated with matching characters for each index value of the prefix and increment the counter that is associated with the identified company name value. The domain updater 902 may use any method to identify company name values that match prefixes.

Still referring to FIG. 9, the domain updater 902 may use the most common values of the subset of second record objects to identify a second record object. The domain updater 902 may compare values of the fields of each second record object of the subset of second record objects to the corresponding most common values of the subset of second record objects. The domain updater 902 may identify the values of the second record objects of the subset of second record objects that match the corresponding values of the most common values. For each second record object of the subset of second record objects, the domain updater 902 may maintain a counter. The domain updater 902 may increment the counter for each value of the second record object that matches a corresponding value of the most common values. The domain updater 902 may identify the counts of each of the counters and compare the counts to a threshold. The domain updater 902 may identify the second record object that is associated with the highest count and/or that is associated with a count that exceeds a threshold.

In some embodiments, the domain updater 902 may assign confidence scores to the second record objects of the subset of second record objects. The domain updater 902 may assign the confidence scores based on the counts of the counters with which the second record objects are associated. For example, in some embodiments, the higher the counts of the counters, the higher the confidence score. The domain updater 902 may identify the second record object that is associated with the highest confidence score and/or that is associated with a confidence score that exceeds a threshold. Consequently, the domain updater 902 may assign confidence scores to the second record objects of the subset of second record objects that are proportional to the number of object field-value pairs of the second record objects that match the most common values of the subset of second record objects.

In some embodiments, the domain updater 902 may assign weights to the fields so different fields are associated with different weights. For example, the company name field may be weighted higher than the postal code field. In such embodiments, the domain updater 902 may obtain an aggregated weight by aggregating the weights of the matching fields or values. The domain updater 902 may determine a confidence score based on the aggregated weight. For example, in some embodiments, the domain updater 902 may determine that second record objects that are associated with higher aggregated weights may be associated with higher confidence scores.

The domain updater 902 may identify the second record object that is associated with the highest confidence score by determining the confidence score of each second record object of the subset of second record objects, as described above and comparing the confidence scores with each other. The domain updater 902 may rank the second record objects of the subset of second record objects in descending order based on their confidence scores. The domain updater 902 may select or identify the second record object of the subset of second record objects that is associated with the highest ranking or that is associated with the highest confidence score. In some embodiments, the domain updater 902 may update a field-value pair or setting of the identified or selected second record object to indicate that data from the second record object may be shared with processors of data source providers that also have a second record object of the subset of second record objects that is associated with a confidence score that exceeds the threshold. The domain updater 902 may similarly update field-value pairs or settings of any number of second record objects of the subset of second record objects.

In some embodiments, the domain updater 902 may update a field-value pair or setting of such second record objects by transmitting instructions to a processor of the second system of record that stores the identified second record object. The instructions may include a flag or setting that causes the processor to update a setting or a field-value pair of the second record object indicating that information may be shared (e.g., field-value pairs of the identified second record object may be shared). Responsive to identifying the flag or setting, the processor may identify the flag or setting and update the field-value pair or setting of the second record object accordingly. In some embodiments, the domain updater 902 may update the field-value pair or setting of a second record object by updating a setting associated with the group node profile that corresponds to the second record object in the node graph 110 of the data processing system 100. The domain updater 902 may update the setting to indicate that information about the second record object from the data source provider that stores the second record object may be shared with other processors of data source providers that have the same or a similar "sharable" setting for a second record object representing the same group entity.

The domain updater 902 may match a third record object of the first record objects of the first system of record with the second record object of the subset of record objects that the domain updater 902 has identified. To do so, the domain updater 902 may process the first record objects of the first system of record by comparing the field-value pairs of the first record objects of the first system of record to the corresponding field-value pairs of the identified second record object and identifying any matching corresponding field-value pairs. The domain updater 902 may evaluate a match policy for the first record objects based on the comparison to determine if any of the first record objects satisfy the match policy.

To evaluate the match policy, the domain updater 902 may apply a series of rules and/or thresholds of the match policy to the first record objects and match a third record object of the first record objects to the second record object based on the third record object satisfying the match policy. For example, the domain updater 902 may determine that the third record object satisfies the match policy responsive to the domain updater 902 determining that enough field-value pairs of the third record object match the field-value pairs of the identified second record object to satisfy or exceed a threshold.

To do so, the domain updater 902 may maintain and increment a counter associated with each first record object of the first system of record. Counts of the counters may indicate the number of field-value pairs of the first record object associated with the counter that match a corresponding field of the identified second record. The domain updater 902 may identify and compare corresponding field-value pairs between the identified second record object and increment the counter for a first record object for each field-value pair of the first record object that matches the corresponding field-value pair of the identified second record object. The domain updater 902 may determine counts of counters for each or a portion of the first record objects and identify the first record object that is associated with the highest count as the third record object that matches the identified second record object.

In some embodiments, the domain updater 902 may determine whether a first record object has a matching company name value to a prefix of the identified second record object by determining whether the company name value has a matching company name prefix to the identified second record object. The domain updater 902 may do so similar to how the domain updater 902 determined whether the second record objects of the subset of second record objects matched a company name prefix. The company name prefix may be the first predetermined number of characters of the company name value of the identified second record object. The predetermined number of characters may be any number of characters. In one example, the domain updater 902 may do so by comparing the company name value of the third record object to a data structure such as a trie data structure that includes a branch with sequential nodes that represents a company name prefix of the company name value of the identified second record object. The domain updater 902 may determine if the beginning sequential letters of the company name value of the first record object correspond or match to sequential nodes of the branch of the company name prefix. Responsive to the domain updater 902 determining that the beginning sequential letters of the company name value of the first record object match or correspond to sequential nodes of the branch of the prefix, the domain updater 902 may determine that the company name value of the first record object matches the company name prefix of the company name value of the identified second record object. Accordingly, the domain updater 902 may increment the counter associated with the first record object based on the company name values matching.

In another example, the domain updater 902 may associate index values to characters of the company name values of the first record objects and to a prefix of the identified second record object. The domain updater 902 may assign an index value to each sequential character of the prefix and the company name values. The domain updater 902 may compare the characters of the company name value that are associated with matching index values of the prefix. The domain updater 902 may determine index values match if they are associated with the same character. Responsive to the domain updater 902 determining that each index value of the prefix is associated with a matching character to the company name value, the domain updater may determine that the company name values of the first record object and the identified second record object match. The domain updater 902 may increment the counter associated with the first record object accordingly.

In some embodiments, the domain updater 902 may determine confidence scores for the first record objects based on the counts that are associated with the first record objects. The confidence score may indicate a likelihood that the first record object is associated with the same group entity as the identified second record object. The domain updater 902 may determine the confidence scores based on the number of field-value pairs of the first record objects that match corresponding field value pairs of the identified second record object. In some embodiments, for example, the domain updater 902 may determine higher confidence scores for first record objects that are associated with higher counter counts. The domain updater 902 may compare the confidence score to the threshold and, if the confidence score exceeds the threshold, determine that a third record object of the first record object satisfies the match policy by which the first record objects are being evaluated.

In some embodiments, the domain updater 902 may determine confidence scores by assigning weights to specific field-value pairs. The domain updater 902 may assign weights to matching field-value pairs. The domain updater 902 may assign weights to the matching field-value pairs based on the field of the field-value pair. For example, the domain updater 902 may assign a higher weight to a matching company name field-value pair than to a matching postal code field-value pair. The domain updater 902 obtain an aggregated weight by identifying and aggregating the assigned weights of the matching field-value pairs for each of the first record objects. The domain updater 902 may determine a confidence score based on the aggregated weight similar to the above. In some embodiments, for example, the domain updater 902 may determine higher confidence scores for first record objects that are associated with higher aggregated weights. The domain updater may identify the confidence scores and compare the confidence scores of the first record objects to a threshold of the match policy and determine if any of the confidence scores exceed or satisfy the threshold. In some embodiments, the domain updater 902 may select or identify the third record object as satisfying the match policy based on the third record object having a highest confidence score of the first record objects, which the domain updater 902 may determine by comparing the confidence scores of the first record objects with each other an identifying the first record object with the highest confidence score, and/or a confidence score that satisfies or exceeds a threshold.

Responsive to the domain updater 902 determining that the confidence score of a third record object of the first record objects exceeds the threshold, the domain updater 902 may determine that the third record object satisfies the match policy. For example, the domain updater 902 may identify one or more field-value pairs (e.g., field value pairs for the company name, postal code, etc.) of the identified second record object and compare the one or more field-value pairs to corresponding field-value pairs of the first record objects of the first system of record. The domain updater 902 may maintain a counter associated with each first record object and increment the counter for each matching field-value pair. The domain updater 902 may determine confidence scores for the first record objects using the techniques described above and compare the confidence scores to a threshold. Responsive to the domain updater 902 determining that the confidence score of a third record object of the first record objects exceeds or satisfies the threshold, the domain updater 902 may determine that the third record object satisfies the match policy.

In some embodiments, the domain updater 902 may determine that the third record object satisfies a match policy by comparing the third record object to the most common values of the subset of the second record objects. For example, the domain updater 902 may compare the object field-value pairs of the third record object (and each or a portion of the first record objects) to the corresponding values of the most common values and determine that the third record object satisfies the match policy using similar or the same techniques to those described above with reference to the comparison between the third record object and the identified second record object. In some embodiments, the domain updater 902 may select or identify the third record object based on the third record object having a highest confidence score of the first record objects and/or a confidence score that satisfies or exceeds a threshold.

In another example, in some embodiments, the domain updater 902 may determine that the third record object satisfies a match policy by determining that particular field-value pairs of the third record object match corresponding field-value pairs of the second record object. For example, the domain updater 902 may determine that the third record object satisfies the match policy by determining that the third record object and the identified second record object have matching company name values. In another example, the domain updater 902 may determine that the third record object satisfies the match policy by determining that the third record object and the identified second record object have both matching company name values and postal code values. The domain updater 902 may use any field-value pairs or combination of field-value pairs to determine whether the third record objects satisfies the match policy.

In some embodiments, the domain updater 902 may match the electronic activity 516 that is associated with the identified domain name to the third record object. The domain updater 902 may match the electronic activity 516 to the third record object responsive to the domain updater 902 determining that the third record object satisfies the match policy. The domain updater 902 may match the electronic activity 516 to the third record object and store an association between the third record object and the electronic activity 516 in one or more data structures. The domain updater 902 may do so by transmitting instructions to the processor of the first system of record including a flag or setting that causes the processor of the first system of record to link or otherwise associate the electronic activity 516 with the third record object. The processor of the first system of record may receive the instructions, identify the flag or setting of the instructions, and store an association between the electronic activity 516 and the third record object in a database of the first system of record based on the flag or setting. In some embodiments, the processor of the first system of record may update a field-value pair that includes a list (e.g., an array) of the electronic activities that have been associated with the third record object to include the electronic activity 516.

In some embodiments, the domain updater 902 may store an association between the electronic activity 516 and the third record object in one or more data structures of the data processing system 100. The domain updater 902 may identify the group node profile that represents the same group entity as the identified second record object from the node graph 110. The domain updater 902 may identify the group node profile by identifying the company name or other values of field-value pairs of the identified second record object and comparing the company name or other values to corresponding values of group node profiles of the node graph 110. The domain updater 902 may identify the group node profile that has matching values to the company name and/or the other values of the field-value pairs. The domain updater 902 may store an association between the electronic activity 516 and the identified group node profile in one or more data structures of the node graph 112.

In some embodiments, the domain updater 902 may store the association between the electronic activity 516 and the third record object in one or more data structures of a shadow system of record that corresponds to the first system of record. The domain updater 902 may identify the shadow system of record that corresponds to the first system of record and a corresponding record object of the identified shadow system of record to the third record object. The domain updater 902 may store an association between the electronic activity 516 and the corresponding record object of the shadow system of record.

In some embodiments, the domain updater 902 may match the electronic activity 516 to a fourth record object (e.g., an opportunity record object that has a field-value pair identifying a stage of a process). The domain updater 902 may identify the fourth record object by analyzing fourth record objects that are linked to the third record object. The domain updater 902 may determine which fourth record object to identify by identifying the electronic accounts that are associated with the electronic activity 516. The domain updater 902 may identify the activity field-value pairs of the electronic activity 516 and compare the activity field-value pairs to the corresponding object field-value pairs of the fourth record objects. For example, the domain updater 902 may identify the electronic accounts of an email by parsing the electronic account identifiers (e.g., email addresses) in the "To:" field, the "From:" and/or the "CC:" field. In some embodiments, the domain updater 902 may also extract other activity field-value pairs from the electronic activity 516. The domain updater 902 may compare the extracted activity field-value pairs of the electronic activity 516 to the object field-value pairs of the fourth record objects. The domain updater 902 may maintain and increment a counter associated with each fourth record object for each matching field-value pair. The domain updater 902 may compare the counts of the counters with each other and identify the counter that is associated with the highest count. The domain updater 902 may identify the fourth record object and link the electronic activity 516 to the identified fourth record object. The domain updater 902 may link the electronic activity 516 to the identified fourth record object in a similar manner to how the domain updater 902 linked the electronic activity 516 to the third record object as described above.

In some embodiments, the domain updater 902 may update the third record object and/or a fourth record object linked to the third record object to include the domain name identified from the electronic activity 916 and/or the identified second record object as a domain name value of the domain name field of the third record object and/or the fourth record object. The domain updater 902 may do so responsive to the domain updater 902 determining that the third record object matches the identified second record object. The domain updater 902 may update the third record object and/or the fourth record object by transmitting instructions to the processor of the first system of record including a flag or setting that causes the processor to update the domain name field of the third record object or the fourth record object to include the domain name of the electronic activity 516 or identified second record object as a value. Responsive to receiving the instructions, the processor of the first system of record may update the third record object and/or the fourth record object by including the domain name in the domain name field of the third record object. In some embodiments, the processor may add the domain name to a data structure (e.g., an array) that contains a list of domain names that are associated with the third record object. For example, the processor of the first system of record may receive instructions to update the public domain field 914 of the first record object 912 and place the domain name ACME in the public domain field 914 accordingly.

In some instances, the domain updater 902 may not identify a first record object that satisfies the match policy with the identified second record object or the most common values of the subset of the second record objects. The domain updater 902 may determine that there is not a third record object that satisfies the match policy by comparing the field-value pairs of each or a portion of the first record objects of the first system of record to the identified second record object or the most common values and determine that there is not a first record object that satisfies the match policy. The domain updater 902 may make such a determination, for example, by determining that there is not a first record object that is associated with a confidence score or count that exceeds a threshold of the match policy.

Responsive to the domain updater 902 not identifying a first record object that satisfies the match policy with the identified second record object or the most common values of the subset of the second record objects, the domain updater 902 may generate a sixth record object that includes the domain name of the electronic activity 516 and/or the second record object as a value of the domain name field of the generated record object. The domain updater 902 may generate the record object by transmitting instructions to the processor of the first system of record including a flag or setting that causes the processor to generate the sixth record object in the first system of record. For example, the domain updater 902 may identify a second domain name from data of a second electronic activity accessed from a processor of the data source provider that provided the electronic activity 916. The domain updater 902 may compare the second domain name with domain names of the first record objects of the first system of record. The domain updater 902 may determine that there are not any first record objects with domain names that match the second domain name (e.g., there are not any first record objects that satisfy a match policy with the second domain name). Responsive to the determination that the second electronic activity does not match with any first record objects, the domain updater 902 may identify at least one fifth record object (e.g., a subset of fifth record objects) that is an account record object that has a matching domain name value to the second domain name. The at least one fifth record object may be stored in third systems of record of other data source providers. The domain updater 902 may perform the techniques described above to identify a fifth record object that satisfies a match policy with the most common values of the at least one fifth record object. The domain updater 902 may compare the first record objects of the first system of record with the identified fifth record object or the common values of the at least one fifth record object and determine that there are not any first record objects that match or satisfy a match policy with the identified fifth record object or the most common values. Accordingly, the domain updater 902 may generate the sixth record object or transmit instructions including a flag or a setting to the processor of the first system of record indicating for the processor to generate the sixth record object. The sixth record object may be generated in the first system of record and include the second domain name. The domain updater 902 may link the second electronic activity to the sixth record object similar to how the domain updater 902 linked the electronic activity 916 to the third record object, as described above.

The domain updater 902 may display the most common values for the fields on a user interface. The domain updater 902 may generate a list of the most common values of the subset of second record objects. The domain updater 902 may do so in response to an input to the user interface that causes the domain updater 902 to analyze electronic activities to associate the electronic activities with first record objects of the first system of record. In response to receiving the input, the domain updater 902 may access the electronic activities from the data sources of the data source provider associated with the first system of record. For each or a portion of the electronic activities that the domain updater 902 accesses, the domain updater 902 may identify the domains of the electronic accounts that transmitted the electronic activities and, for each electronic activity that the domain updater 902 does not match to a first record object, the domain updater 902 may perform the process described above to generate a list of the most common values for the fields of first record objects. The domain updater 902 may cause the list to display on the user interface.

In some embodiments, in addition to or instead of the list of the most common values, the domain updater 902 may display first record objects of the first system of record in a second list. The second list may include the first record object rankings of the first record objects. The domain updater 902 may determine the rankings based on the confidence score that the domain updater 902 determines for each first record object. A confidence score may indicate a likelihood that the first record object is the correct record object to be matched with an electronic activity, which the domain updater 902 determines as described above. The domain updater 902 may rank the first record objects in descending order based on the confidence scores of the first record objects. The domain updater 902 may place the list on the user interface and receive a user selection indicating for which first record object for the domain updater 902 to link or store an association with an electronic activity. In some embodiments, the user can select a first record object to associate with the electronic activity from the list on the interface. The list may be presented on the user interface and the domain updater 902 may receive a first record object selection from the list. The domain updater 902 may receive the selection and update the selected first record object of the first system of record in response to the selection (e.g., by updating the node graph 112 or transmitting instructions to update the account record object to the processor of the first system of record). In other embodiments, the domain updater 902 may display the list and automatically select and/or update a second record object from the list per the above.

Figure 10:
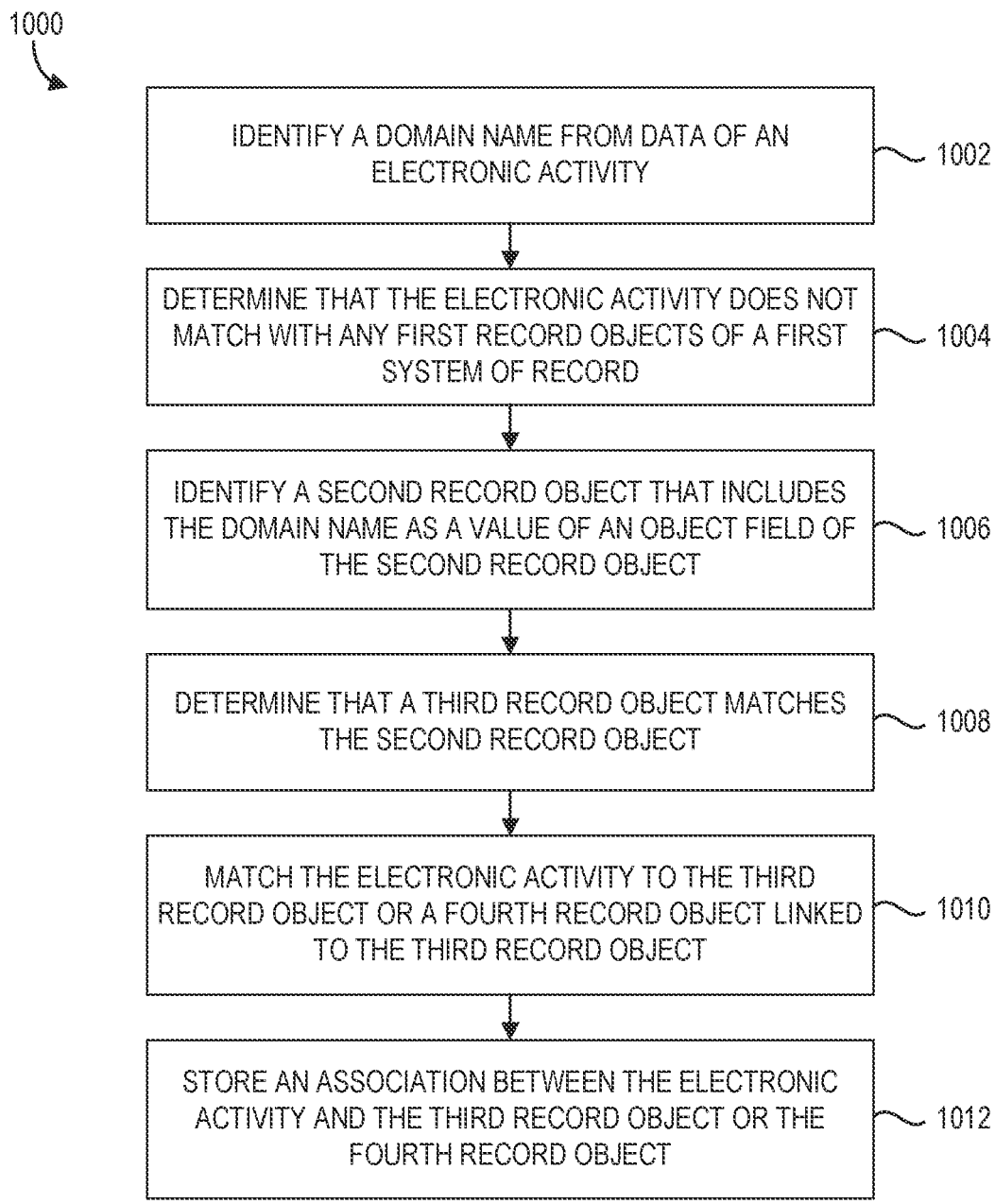
FIG. 10 illustrates a flow diagram of an example method for matching electronic activities with whitespace domains to record objects in a multi-tenant system according to embodiments of the present disclosure.

Referring now to FIG. 10, a flow diagram of an example method 1000 for matching electronic activities with whitespace domains to record objects in a multi-tenant system is shown according to embodiments of the present disclosure. The method 1000 can be implemented or performed using any of the components described above in conjunction with FIGS. 1-9 (e.g., the data processing system 100) or the server system 1100 detailed below in conjunction with FIG. 11. In brief overview, a data processing system can identify a domain name from data of an electronic activity (1002). The data processing system can determine that the electronic activity does not match with any first record objects of a first system of record (1004). The data processing system can identify a second record object that includes the domain name as a value of an object field of the second record object (1006). The data processing system can determine that a third record object matches the second record object (1008). The data processing system can match the electronic activity to the third record object or a fourth record object linked to the third record object (1010). The data processing system can store an association between the electronic activity and the third record object or the fourth record object (1012).

In further detail, a data processing system (e.g., the data processing system 100) can identify a domain name from data of an electronic activity (1002). The data processing system can access the electronic activity from a data source of a data source provider. For example, the data processing system can access an email database of a data source provider to access each of the emails that the data source provider has stored through a processor. The data processing system can parse the electronic activity to extract activity field-value pairs from the electronic activity. For example, the data processing system may extract activity field-value pairs from the signature block, the greeting block, the body, the "To:" field, or the "From:" field of an electronic activity to identify which entities transmitted or received the electronic activity. In some instances, the data processing system may identify the electronic accounts that are associated with the electronic activity from the extracted activity field-value pairs. The electronic accounts may be associated with domain names. The data processing system may use natural language processing to identify the domain names that are associated with the electronic accounts of the electronic activity. For example, for an email address, the data processing system may identify the domain name of an electronic account of the email address from the language following the "@" symbol of the email address.

The data processing system can determine that the electronic activity does not match with any first record objects of a first system of record (1004). The data processing system can compare the identified domain name with domain name values or domain name object field-value pairs of the first record objects (e.g., account record objects) of the first system of record. Responsive to the data processing system identifying a first record object in the first system of record that has a matching value, the data processing system may link or otherwise associate the electronic activity with the identified first record object. In some embodiments, the data processing system may identify one or more record objects (e.g., opportunity record objects) that are linked to the identified first record object. In such embodiments, the data processing system may link the electronic activity to the first record object and/or a linked record object with which the electronic activity is associated. Responsive to the data processing system not identifying any first record objects of the first system of record that have a matching domain name value, the data processing system may determine that the electronic activity does not match with any first record object of the first system of record.

The data processing system may identify a second record object that includes the domain name as a value of an object field of the second record object (1006). In some cases, the data processing system may identify the second record object responsive to determining the domain name does not match with a first record object in the first system of record. Second record objects may be account record objects that are stored in one or more second systems of record. The data processing system can identify such second record objects by comparing the identified domain name of the electronic activity to the domain name object field-value pairs of the second record objects. Responsive to the data processing system not identifying a match, the data processing system may generate an alert and transmit the alert to a user interface of a client device to indicate no match could be found. Responsive to the data processing system identifying a match, the data processing system may identify and/or select the second record object that is associated with the matching domain name value. In some embodiments, the data processing system may identify a subset (e.g., one or more) of second record objects that have a matching domain name value to the identified domain name of the electronic activity. The data processing system may identify each second record object of the subset based on the matching domain name values.

In embodiments in which the data processing system identifies a subset of second record objects, the data processing system may maintain counters for the values of the fields of the subset of second record objects. The data processing system may identify the values of the object field-value pairs of the subset of second record objects. For example, the data processing system may identify values of the postal code, group entity name, and/or domain name object field-value pairs of each second record object of the subset of second record objects with matching domain name values. The data processing system may increment and maintain a count for each unique value that the data processing system identifies. For example, the data processing system may identify the value 92130 in the postal code field of five second record objects. Accordingly, the data processing system may increment a counter associated with the value 92130 five times. The data processing system may also identify the value 99911 in the postal code field of three second record objects. The data processing system may increment a counter associated with the value 99911 three times. The data processing system may increment and maintain counters for any number of values of any field or fields of second record objects.

In some embodiments, the data processing system can determine the most common values for a number of fields of the second record objects. The data processing system can determine the most common values by comparing the values of the counters for the values of the object field-value pairs to each other. Based on the comparison, the data processing system may identify the value that is associated with the highest counter value (e.g., count) for each of the fields (e.g., domain name, group entity name, postal code, etc.) of the second record objects. Accordingly, the data processing system may identify the most common value for each of the fields. In some embodiments, the data processing system may generate a list identifying the most common values for such fields.

The data processing system can identify a second record object that has a highest number of fields that match the identified most common values of the fields. The data processing system can compare the values of the fields for each of the second record objects to the identified most common values. The data processing system may increment and/or maintain a counter associated with each second record object for each value that matches (e.g., is the same as) a corresponding most common value. The data processing system may compare the values of the counters associated with the second record objects and identify the second record object that is associated with the highest value.

The data processing system can determine that a third record object matches the second record object (1008). The data processing system can access the first system of record. The data processing system can identify the first record objects of the first system of record. The data processing system can identify the values of the object field-value pairs of the identified first record objects. The data processing system can compare the identified values of the object field-value pairs to the second record object and/or the identified most common values. The data processing system may increment and maintain a counter associated with each first record object for each match between the object field-value pairs of the first record object and the second record object and/or the most common value. The data processing system may determine the first record object of the first system of record that is associated with the highest counter as the third record object that matches the identified second record object.

The data processing system can match the electronic activity to the third record object or a fourth record object linked to the third record object (1010). The data processing system can match the electronic activity to the third record object by determining that the electronic activity is associated with the second record object or the subset of second record objects and identifying the matched third record object. The data processing system can determine that the electronic activity matches the third record object based on the electronic activity having a matching domain name value to the domain name value of the second record object (or subset of second record objects in embodiments in which the third record object is identified based on a comparison to the most common values of the subset of second record objects) that matches the third record object. In some embodiments, the data processing system can update the domain name field-value pair of the third record object to include the domain name of the electronic activity. In some instances, the data processing system can match the electronic activity to a fourth record object (e.g., an opportunity record) linked to the third record object.

The data processing system can store an association between the electronic activity and the third record object or the fourth record object (1012). The data processing system can store the association between the electronic activity and the third record object by transmitting instructions to a processor of the first system of record including the electronic activity and/or instructions to link the electronic activity to the third record object. The instructions may include a flag or setting that causes the first system of record to link the electronic activity to the third record object. In some instances, the data processing system may send instructions to link the electronic activity to the fourth record object in addition to or instead of the third record object. In some embodiments, the data processing system can store the association between the electronic activity and the third record object by identifying a group node profile associated with the third record object in the node graph of the data processing system. The data processing system may link the electronic activity to the identified group node profile.

S. Computer System

Figure 11:
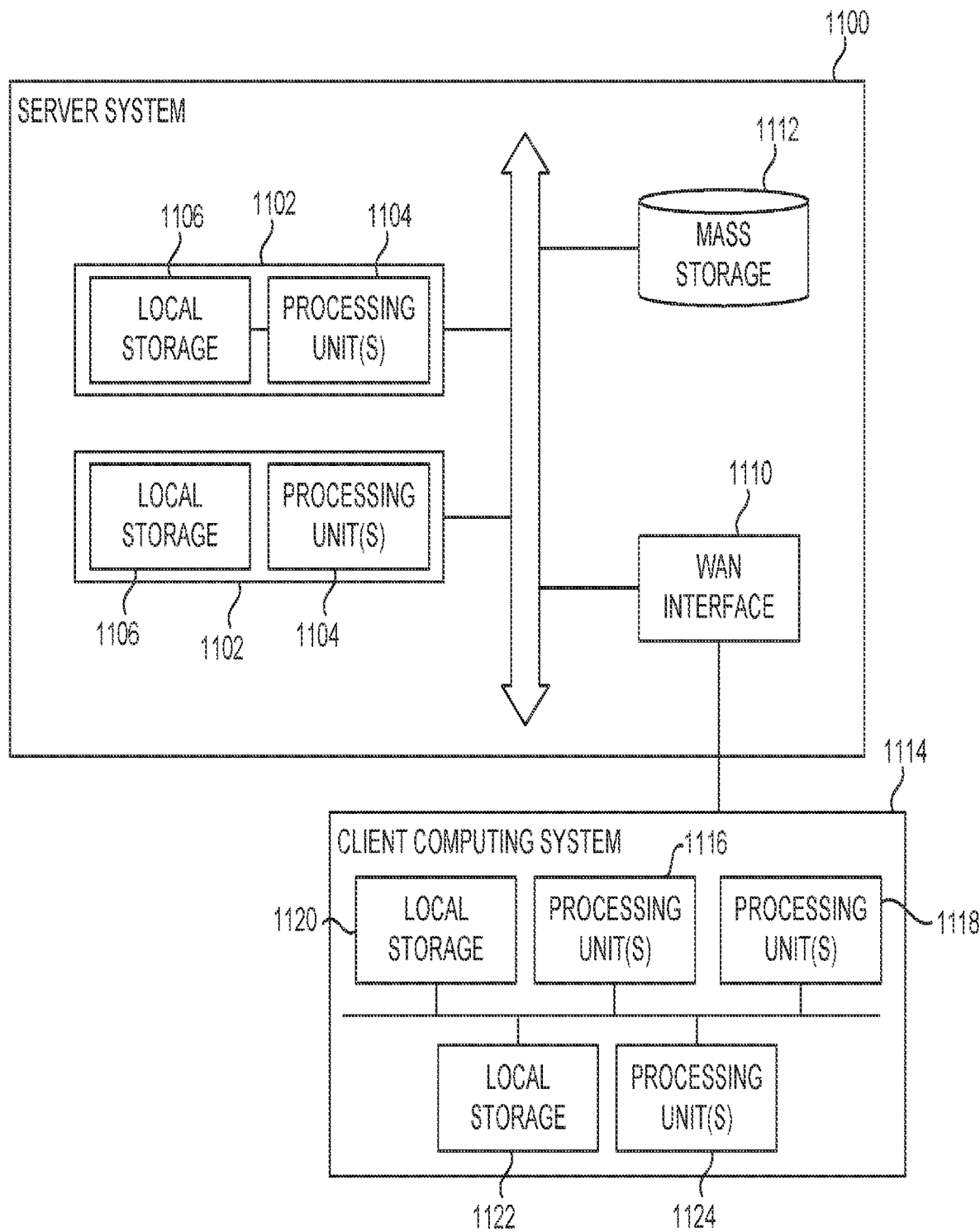
FIG. 11 illustrates a simplified block diagram of a representative server system and client computer system according to embodiments of the present disclosure.

Various operations described herein can be implemented on computer systems, which can be of generally conventional design. FIG. 11 shows a simplified block diagram of a representative server system 1100 and client computing system 1114 usable to implement certain embodiments of the present disclosure. In various embodiments, server system 1100 or similar systems can implement services or servers described herein or portions thereof. Client computing system 1114 or similar systems can implement clients described herein. The data processing system 100 and others described herein can be similar to the server system 1100.

Server system 1100 can have a modular design that incorporates a number of modules 1102 (e.g., blades in a blade server embodiment); while two modules 1102 are shown, any number can be provided. Each module 1102 can include processing unit(s) 1104 and local storage 1106.

Processing unit(s) 1104 can include a single processor, which can have one or more cores, or multiple processors.

In some embodiments, processing unit(s) 1104 can include a general-purpose primary processor as well as one or more special-purpose co-processors such as graphics processors, digital signal processors, or the like. In some embodiments, some or all processing units 1104 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1104 can execute instructions stored in local storage 1106. Any type of processors in any combination can be included in processing unit(s) 1104.

Local storage 1106 can include volatile storage media (e.g., conventional DRAM, SRAM, SDRAM, or the like) and/or non-volatile storage media (e.g., magnetic or optical disk, flash memory, or the like). Storage media incorporated in local storage 1106 can be fixed, removable or upgradeable as desired. Local storage 1106 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1104 need at runtime. The ROM can store static data and instructions that are needed by processing unit(s) 1104. The permanent storage device can be a non-volatile read-and-write memory device that can store instructions and data even when module 1102 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1106 can store one or more software programs to be executed by processing unit(s) 1104, such as an operating system and/or programs implementing various server functions such as functions of the data processing system 100 of FIG. 1 or any other system described herein, or any other server(s) or system associated with data processing system 100 of FIG. 1.

"Software" refers generally to sequences of instructions that, when executed by processing unit(s) 1104 cause server system 1100 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1104. Software can be implemented as a single program or a collection of separate programs or program modules that interact as desired. From local storage 1106 (or non-local storage described below), processing unit(s) 1104 can retrieve program instructions to execute and data to process in order to execute various operations described above.

In some server systems 1100, multiple modules 1102 can be interconnected via a bus or other interconnect 1108, forming a local area network that supports communication between modules 1102 and other components of server system 1100. Interconnect 1108 can be implemented using various technologies including server racks, hubs, routers, etc.

A wide area network (WAN) interface 1110 can provide data communication capability between the local area network (interconnect 1108) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 1106 is intended to provide working memory for processing unit(s) 1104, providing fast access to programs and/or data to be processed while reducing traffic on interconnect 1108. Storage for larger quantities of data can be provided on the local area network by one or more mass storage subsystems 1112 that can be connected to interconnect 1108. Mass storage subsystem 1112 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1112. In some embodiments, additional data storage resources may be accessible via WAN interface 1110 (potentially with increased latency).

Server system 1100 can operate in response to requests received via WAN interface 1110. For example, one of modules 1102 can implement a supervisory function and assign discrete tasks to other modules 1102 in response to received requests. Conventional work allocation techniques can be used. As requests are processed, results can be returned to the requester via WAN interface 1110. Such operation can generally be automated. Further, in some embodiments, WAN interface 1110 can connect multiple server systems 1100 to each other, providing scalable systems capable of managing high volumes of activity. Conventional or other techniques for managing server systems and server farms (collections of server systems that cooperate) can be used, including dynamic resource allocation and reallocation.

Server system 1100 can interact with various user-owned or user-operated devices via a wide-area network such as the Internet. An example of a user-operated device is shown in FIG. 11 as client computing system 1114. Client computing system 1114 can be implemented, for example, as a consumer device such as a smartphone, other mobile phone, tablet computer, wearable computing device (e.g., smart watch, eyeglasses), desktop computer, laptop computer, and so on.

For example, client computing system 1114 can communicate via WAN interface 1110. Client computing system 1114 can include conventional computer components such as processing unit(s) 1116, storage device 1118, network interface 1120, user input device 1122, and user output device 1124. Client computing system 1114 can be a computing device implemented in a variety of form factors, such as a desktop computer, laptop computer, tablet computer, smartphone, other mobile computing device, wearable computing device, or the like.

Processor 1116 and storage device 1118 can be similar to processing unit(s) 1104 and local storage 1106 described above. Suitable devices can be selected based on the demands to be placed on client computing system 1114; for example, client computing system 1114 can be implemented as a "thin" client with limited processing capability or as a high-powered computing device. Client computing system 1114 can be provisioned with program code executable by processing unit(s) 1116 to enable various interactions with server system 1100 of a message management service such as accessing messages, performing actions on messages, and other interactions described above. Some client computing systems 1114 can also interact with a messaging service independently of the message management service.

Network interface 1120 can provide a connection to a wide area network (e.g., the Internet) to which WAN interface 1110 of server system 1100 is also connected. In various embodiments, network interface 1120 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1122 can include any device (or devices) via which a user can provide signals to client computing system 1114; client computing system 1114 can interpret the signals as indicative of particular user requests or information. In various embodiments, user input device 1122 can include any or all of a keyboard, touch pad, touch screen, mouse or other pointing device, scroll wheel, click wheel, dial, button, switch, keypad, microphone, and so on.

User output device 1124 can include any device via which client computing system 1114 can provide information to a user. For example, user output device 1124 can include a display to display images generated by or delivered to client computing system 1114. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1124 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1104 and 1116 can provide various functionality for server system 1100 and client computing system 1114, including any of the functionality described herein as being performed by a server or client, or other functionality associated with message management services.

It will be appreciated that server system 1100 and client computing system 1114 are illustrative and that variations and modifications are possible. Computer systems used in connection with embodiments of the present disclosure can have other capabilities not specifically described here. Further, while server system 1100 and client computing system 1114 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method comprising:
   identifying, by one or more processors, a domain name from data of an electronic activity accessed from a data source provider;
   determining, by the one or more processors, that the electronic activity fails to match to any first record objects of a first system of record corresponding to the data source provider responsive to a determination that the electronic activity fails to satisfy a first match policy based on the domain name;
   executing a search by performing a lookup in a second system of record of a second data source provider accessible to the one or more processors using the domain name to identify, by the one or more processors, responsive to the determination that the electronic activity fails to match to any first record objects, a second record object included in the second system of record, the second record object of the second system of record including the domain name as a value of an object field of the second record object;

matching, by the one or more processors, a third record object from the first system of record to the second record object of the second system of record, responsive to the third record object satisfying a second match policy based on comparing one or more third object field-value pairs of the third record object with corresponding one or more second object field-value pairs of the second record object;

matching, by the one or more processors, the electronic activity to the third record object, responsive to the determination that the third record object of the first system of record matches to the second record object of the second system of record; and transmitting via one or more application programming interface (API) calls, by the one or more processors, responsive to matching the electronic activity to the third record object, a request to cause the first system of record to link the electronic activity to the third record object.

2. The method of claim 1, wherein the one or more second object field-value pairs comprise a company name object field-value pair.

3. The method of claim 1, wherein the third record object is of a first record object type.

4. The method of claim 1, further comprising:
identifying, by the one or more processors, a second domain name from data of a second electronic activity accessed from the data source provider;
determining, by the one or more processors, that the second electronic activity fails to match to any first record objects of the first system of record corresponding to the data source provider, responsive to a determination that the second electronic activity fails to satisfy the first match policy;
identifying, by the one or more processors, responsive to the determination that the second electronic activity fails to match to any first record objects, a fourth record object included in a third system of record of a third data source provider accessible to the one or more processors, the fourth record object including the second domain name as a value of an object field of the fourth record object;
determining, by the one or more processors, that there are not any first record objects from the first system of record that satisfy the second match policy for the fourth record object of the third system of record based on comparing one or more fourth object field-value pairs of the fourth record object with corresponding one or more object field-value pairs of first record objects of the first system of record; and
generating, by the one or more processors, responsive to the determination that there are not any first record objects that satisfy the second match policy for the fourth record object, a fifth record object that includes the second domain name as a value of a domain name field of the fifth record object.

5. The method of claim 1, further comprising:
determining, by the one or more processors, a domain type of the domain name, wherein determining, by the one or more processors, that the electronic activity fails to match to any first record objects of the first system of record is performed responsive to the determination, by the one or more processors, that the domain type for the domain name is not a personal domain type.

6. The method of claim 1, wherein identifying, by the one or more processors, the second record object included in the second system of record of the second data source provider accessible to the one or more processors, the second record object including the domain name as the value of the object field of the second record object comprises:
determining, by the one or more processors, that the second record object satisfies a third match policy; and
identifying, by the one or more processors, the second record object based on the second record object satisfying the third match policy.

7. The method of claim 1, wherein identifying, by the one or more processors, the second record object included in the second system of record of the second data source provider accessible to the one or more processors, the second record object including the domain name as the value of the object field of the second record object comprises:
comparing, by the one or more processors, one or more fourth object field-value pairs of the second record object with corresponding one or more fifth object field-value pairs of a fifth record object of the second system of record that have matching domain name values to the domain name of the electronic activity;
determining, by the one or more processors, a matching confidence score based on the comparison;
determining, by the one or more processors, that the matching confidence score satisfies a threshold; and
identifying, by the one or more processors, the second record object based on the determination that the matching confidence score satisfies the threshold.

8. The method of claim 1, wherein identifying, by the one or more processors, the second record object included in the second system of record of the second data source provider accessible to the one or more processors, the second record object including the domain name as the value of the object field of the second record object comprises:
determining, by the one or more processors, most common values of corresponding fifth object field-value pairs of a fifth record object of the second system of record that have matching domain name values to the domain name of the electronic activity;
comparing, by the one or more processors, one or more fourth object field-value pairs of the second record object with the most common values of the corresponding one or more fifth object field-value pairs;
determining, by the one or more processors, a matching confidence score that is proportional to a number of the one or more fourth object field-value pairs that match the most common values of the corresponding one or more fifth object field-value pairs; and
identifying, by the one or more processors, the second record object based on the matching confidence score.

9. The method of claim 8, wherein the one or more fourth object field-value pairs are associated with one or more of a postal code or a company name.

10. The method of claim 1, wherein identifying, by the one or more processors, the second record object included in the second system of record of the second data source provider accessible to the one or more processors, the second record object including the domain name as the value of the object field of the second record object comprises:
determining, by the one or more processors, most common values of corresponding fifth object field-value pairs of at least one fifth record object of the second system of record that have matching domain name values to the domain name of the electronic activity by:
  determining, by the one or more processors, a fifth record object that has a matching value to a company name prefix by:
    applying, by the one or more processors, characters of the value of the company name field of the fifth record object to a data structure; and
    determining, by the one or more processors, that the fifth record object has a matching value to the company name prefix based on a portion of the characters of the company name field of the fifth record object matching each character of the company name prefix; and
  responsive to the determination that the fifth record object has a matching value to the company name prefix, incrementing, by the one or more processors, a counter associated with the company name prefix.

11. The method of claim 10, wherein the portion of the characters has a number of characters that is equal to the number of characters of the value of the company name field of the fifth record object.

12. The method of claim 1, wherein identifying, by the one or more processors, the second record object included in the second system of record of the second data source provider accessible to the one or more processors, the second record object including the domain name as the value of the object field of the second record object comprises:
  determining, by the one or more processors, most common values of corresponding fourth object field-value pairs of a fourth record object of the second system of record that have matching values for a company name field by:
    applying, by the one or more processors, the value of the company name field of the second record object and the values of the company name fields of fifth record objects to a data structure; and
    excluding, by the one or more processors, the fifth record objects from the fourth record object based on the value of the company name field of the second record object ending on a different node than the values of the company name fields of the fifth record objects.

13. The method of claim 1, further comprising:
  updating, by the one or more processors, the third record object to include the domain name as a domain name value of a domain name field of the third record object.

14. A system comprising:
  one or more processors configured to execute machine-readable instructions to:
  identify a domain name from data of an electronic activity accessed from a data source provider;
  determine that the electronic activity fails to match to any first record objects of a first system of record corresponding to the data source provider responsive to a determination that the electronic activity fails to satisfy a first match policy based on the domain name;
  execute a search by performing a lookup in a second system of record of a second data source provider accessible to the one or more processors using the domain name to identify, responsive to the determination that the electronic activity fails to match to any first record objects, a second record object included in the second system of record, the second record object including the domain name as a value of an object field of the second record object;
  match a third record object from the first system of record to the second record object of the second system of record, responsive to the third record object satisfying a second match policy based on comparing one or more third object field-value pairs of the third record object with corresponding one or more second object field-value pairs of the second record object;
  match the electronic activity to the third record object, responsive to the determination that the third record object of the first system of record matches to the second record object of the second system of record; and
  transmit via one or more application programming interface (API) calls, responsive to matching the electronic activity to the third record object, a request to cause the first system of record to link the electronic activity to the third record object.

15. The system of claim 14, wherein the one or more second object field-value pairs of the second record object comprise a company name object field-value pair.

16. The system of claim 14, wherein the third record object is of a first record object type.

17. The system of claim 14, wherein the one or more processors are further configured to:
  identify a second domain name from data of a second electronic activity accessed from the data source provider;
  determine that the second electronic activity fails to match to any first record objects of the first system of record corresponding to the data source provider, responsive to a determination that the second electronic activity fails to satisfy the first match policy;
  identify, responsive to the determination that the second electronic activity fails to match to any first record objects, a fourth record object included in a third system of record of a third data source provider accessible to the one or more processors, the fourth record object including the second domain name as a value of an object field of the fourth record object;
  determine that there are not any first record objects from the first system of record that satisfy the second match policy for the fourth record object of the third system of record based on comparing one or more fourth object field-value pairs of the fourth record object with corresponding one or more object field-value pairs of first record objects of the first system of record; and
  generate, responsive to the determination that there are not any first record objects that satisfy the second match policy for the fourth record object, a fifth record object that includes the second domain name as a value of a domain name field of the fifth record object.

18. The system of claim 14, wherein the one or more processors are further configured to:
  determine a domain type of the domain name, wherein determining, by the one or more processors, that the electronic activity fails to match to any first record objects of the first system of record is performed responsive to the determination, by the one or more processors, that the domain type for the domain name is not a personal domain type.

19. The system of claim 14, wherein the one or more processors are configured to identify, the second record object included in the second system of record of the second data source provider accessible to the one or more processors, the second record object including the domain name as the value of the object field of the second record object by:

determining that the second record object satisfies a third match policy; and identifying the second record object based on the second record object satisfying the third match policy.

20. A non-transitory computer-readable storage medium having instructions embodied thereon, the instructions being executable by one or more processors to:

identify a domain name from data of an electronic activity accessed from a data source provider;

determine that the electronic activity fails to match to any first record objects of a first system of record corresponding to the data source provider responsive to a determination that the electronic activity fails to satisfy a first match policy based on the domain name;

execute a search by performing a lookup in a second system of record of a second data source provider accessible to the one or more processors using the domain name to identify, responsive to the determination that the electronic activity fails to match to any first record objects, a second record object included in the second system of record, the second record object including the domain name as a value of an object field of the second record object;

match a third record object from the first system of record to the second record object of the second system of record, responsive to the third record object satisfying a second match policy based on comparing one or more third object field-value pairs of the third record object with corresponding one or more second object field-value pairs of the second record object;

match the electronic activity to the third record object, responsive to the determination that the third record object of the first system of record matches to the second record object of the second system of record; and transmit via one or more application programming interface (API) calls, responsive to matching the electronic activity to the third record object, a request to cause the first system of record to link the electronic activity to the third record object.

* * * * *